US011181898B2

(12) United States Patent
Akkaram et al.

(10) Patent No.: US 11,181,898 B2
(45) Date of Patent: Nov. 23, 2021

(54) METHODS AND APPARATUS TO GENERATE A PREDICTIVE ASSET HEALTH QUANTIFIER OF A TURBINE ENGINE

(71) Applicant: General Electric Company, Schenectady, NY (US)

(72) Inventors: Srikanth Akkaram, West Chester, OH (US); Mariusz Wiklo, Warsaw (PL); Youngwon Shin, Niskayuna, NY (US); Ricardo Cuevas, Queretaro (MX); William Keith Kincaid, West Chester, OH (US); Jesus Miguel Valenzuela, Queretaro (MX); Gregory Jon Chiaramonte, West Chester, OH (US); Vasanth Muralidharan, Bangalore (IN); Charles Larry Abernathy, West Chester, OH (US); Venkata Vamsi Bhagavan, Bangalore (IN); Andrew Scott Kessie, Springboro, OH (US)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 15/809,768

(22) Filed: Nov. 10, 2017

(65) Prior Publication Data

US 2019/0146470 A1    May 16, 2019

(51) Int. Cl.
*G05B 23/02* (2006.01)
*G06Q 10/06* (2012.01)

(52) U.S. Cl.
CPC ..... *G05B 23/0254* (2013.01); *G05B 23/0289* (2013.01); *G05B 23/0294* (2013.01);
(Continued)

(58) Field of Classification Search
CPC ............ G05B 23/0254; G05B 23/0289; G05B 23/0294; G05B 23/0267;
(Continued)

(56) References Cited

U.S. PATENT DOCUMENTS

| 6,067,486 A | 5/2000 | Aragones et al. |
| 6,732,040 B2 | 5/2004 | Sangeeta et al. |

(Continued)

OTHER PUBLICATIONS

S. Leader and R. Friend, "A probabilistic, diagnostic and prognostic system for engine health and usage management," 2000 IEEE Aerospace Conference. Proceedings (Cat. No. 00TH8484), Big Sky, MT, USA, 2000, pp. 185-192 vol. 6. (Year: 2000).*

(Continued)

*Primary Examiner* — Justin C Mikowski
(74) *Attorney, Agent, or Firm* — Dority & Manning, P.A.

(57) ABSTRACT

Methods, apparatus, systems, and articles of manufacture are disclosed to generate a predictive asset health quantifier of a turbine engine. An example apparatus includes a performance model analyzer to determine a fleet behavior parameter by generating a reference performance model using historical information for a fleet of operators using turbine engines, generate a residual performance model based on calculating a difference between the fleet behavior parameter and a plurality of operator behavior parameters, identify an operator as a candidate improvement target based on comparing the operator behavior parameters corresponding to the operator to the fleet in the residual performance model, and determine an adjusted operator behavior parameter for the candidate improvement target. The example apparatus further includes a system updater to update a computer-based model to replace the operator behavior parameter with the adjusted operator behavior parameter, and a task optimizer to determine a workscope for the turbine engine.

18 Claims, 18 Drawing Sheets

(52) U.S. Cl.
CPC ...... *F05B 2260/80* (2013.01); *G05B 23/0267* (2013.01); *G05B 2219/45071* (2013.01); *G06Q 10/06375* (2013.01)

(58) Field of Classification Search
CPC ...... G05B 2119/45071; F05B 2260/80; G06Q 10/06375
USPC ............................................................ 703/7
See application file for complete search history.

(56) References Cited

U.S. PATENT DOCUMENTS

| | | | |
|---|---|---|---|
| 6,832,205 B1 | 12/2004 | Aragones et al. | |
| 6,871,160 B2 | 3/2005 | Jaw | |
| 7,020,595 B1* | 3/2006 | Adibhatla | G05B 23/0275 703/7 |
| 7,203,554 B2* | 4/2007 | Fuller | G05B 13/048 700/121 |
| 8,126,574 B2* | 2/2012 | Discenzo | G05B 13/024 700/28 |
| 8,868,287 B2 | 10/2014 | Delaye et al. | |
| 9,477,224 B2 | 10/2016 | Khan et al. | |
| 2002/0123870 A1* | 9/2002 | Chan | G05B 13/024 703/7 |
| 2006/0010152 A1 | 1/2006 | Catalano et al. | |
| 2006/0212281 A1* | 9/2006 | Mathews, Jr. | G06F 30/15 703/7 |
| 2008/0172268 A1 | 7/2008 | Wingenter | |
| 2009/0037013 A1* | 2/2009 | Hendler | G05B 19/41875 700/103 |
| 2009/0048730 A1 | 2/2009 | Akkaram et al. | |
| 2009/0150131 A1* | 6/2009 | Parthasarathy | G05B 23/0281 703/7 |
| 2010/0023307 A1* | 1/2010 | Lee | G05B 23/0254 703/7 |
| 2010/0262442 A1 | 10/2010 | Wingenter | |
| 2011/0137575 A1* | 6/2011 | Koul | G05B 23/0245 702/34 |
| 2011/0313726 A1* | 12/2011 | Parthasarathy | G05B 23/024 702/179 |
| 2012/0029892 A1* | 2/2012 | Thulke | F03D 7/045 703/7 |
| 2012/0166249 A1 | 6/2012 | Jackson | |
| 2013/0110587 A1 | 5/2013 | Nowicki et al. | |
| 2013/0179388 A1 | 7/2013 | Agarwal et al. | |
| 2014/0257526 A1* | 9/2014 | Tiwari | F01K 13/02 700/29 |
| 2015/0059355 A1* | 3/2015 | Feigl | F02C 9/18 60/782 |
| 2015/0192499 A1* | 7/2015 | Piol | G01M 15/14 73/112.01 |
| 2015/0269490 A1* | 9/2015 | Stillinger | G06N 7/005 706/52 |
| 2016/0063384 A1* | 3/2016 | Green | G06N 20/00 706/12 |
| 2018/0283200 A1* | 10/2018 | Gill | F01D 21/003 |

OTHER PUBLICATIONS

M. J. Ashby and W. J. Scheuren, "Intelligent maintenance advisor for turbine engines," 2000 IEEE Aerospace Conference. Proceedings (Cat. No. 00TH8484), Big Sky, MT, USA, 2000, pp. 211-219 vol. 6. (Year: 2000).*

D. E. Viassolo et al., "Advanced Estimation for Aircraft Engines," 2007 American Control Conference, New York, NY, 2007, pp. 2807-2821. (Year: 2007).*

IP-Shing Fan and Ian Jennions, Asset Health Management System Design, Proceedings of the 2011 17th International Conference on Concurrent Enterprising (ICE 2011), pp. 1-8. (Year: 2011).*

Donaldson et al., "Economic Impact of Derated Climb on Large Commercial Engines", 2007 Performance and Flight Operations Engineering Conference, 14 pages.

James et al., "Derated Climb Performance in Large Civil Aircraft", 2005 Performance and Flight Operations Engineering Conference, 14 Pages.

* cited by examiner

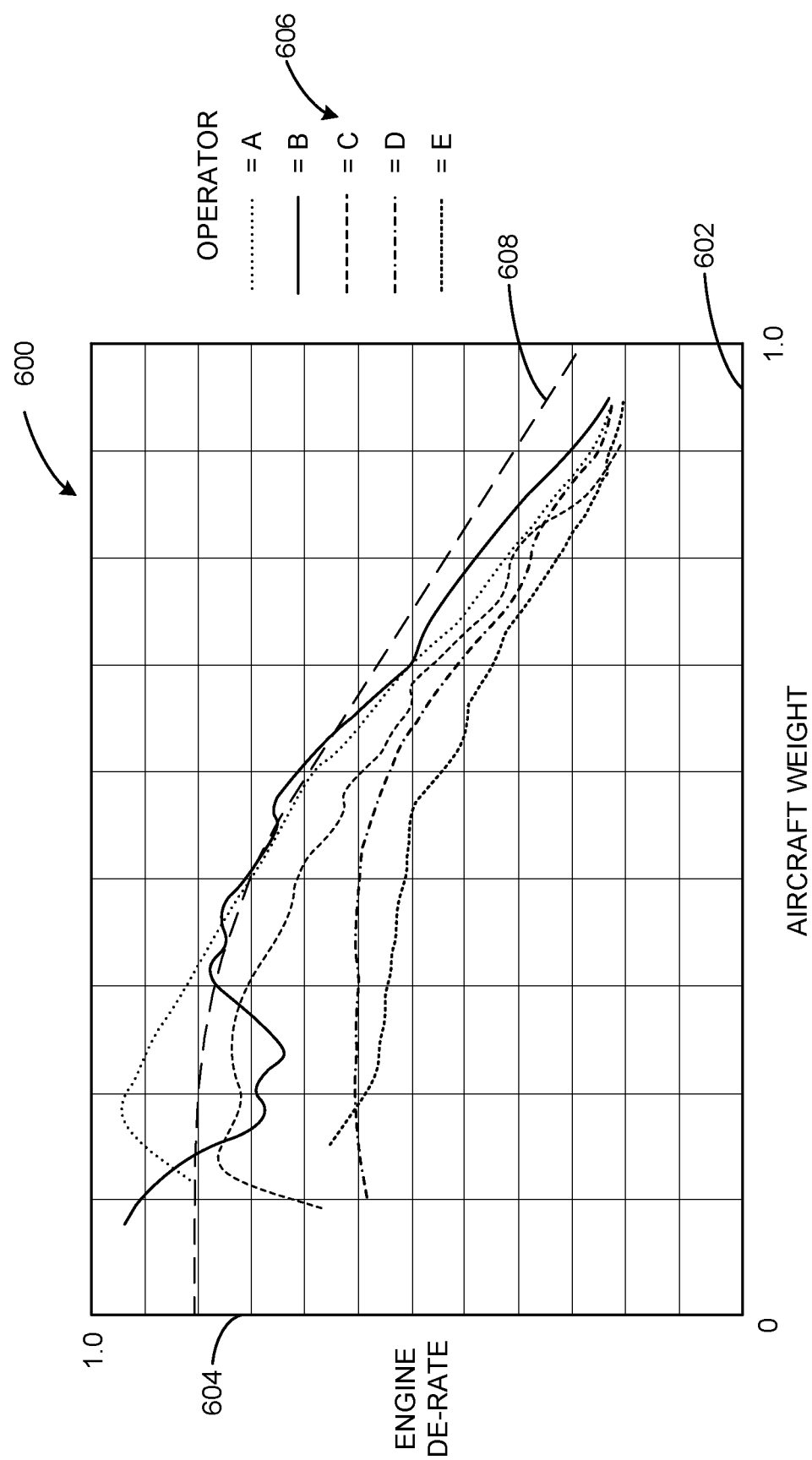

METHODS AND APPARATUS TO GENERATE A PREDICTIVE ASSET HEALTH QUANTIFIER OF A TURBINE ENGINE

FIELD OF THE DISCLOSURE

This disclosure relates generally to turbine engines and, more particularly, to methods and apparatus to generate a predictive asset health quantifier of a turbine engine.

BACKGROUND

In recent years, turbine engines have been increasingly utilized in a variety of applications and fields. Turbine engines are intricate machines with extensive availability, reliability, and serviceability requirements. Traditionally, maintaining turbine engines incur steep costs. Costs generally include having exceptionally skilled and trained maintenance personnel service the turbine engines. In some instances, costs are driven by replacing expensive components or by repairing complex sub-assemblies.

The pursuit of increasing turbine engine availability while reducing premature maintenance costs requires enhanced insight. Such insight is needed to determine when to perform typical maintenance tasks at generally appropriate service intervals. Traditionally, availability, reliability, and serviceability increase as enhanced insight is deployed.

The market for long-term contractual agreements has grown at high rates over recent years for many service organizations. As the service organizations establish long-term contractual agreements with their customers, it becomes important to understand the expected scope of work (also referred to as "workscope") including product, service, and/or other project result. In addition, the service organizations need to have an understanding of the planning of repairs (e.g., shop workload and/or workscope planning) and how the maintenance of components will affect management of their service contracts including time, cost, risk, etc.

BRIEF DESCRIPTION OF THE DRAWINGS

FIG. 6A is a schematic illustration of an example performance reference model.

The figures are not to scale. Wherever possible, the same reference numbers will be used throughout the drawing(s) and accompanying written description to refer to the same or like parts.

BRIEF SUMMARY

Figure 1:
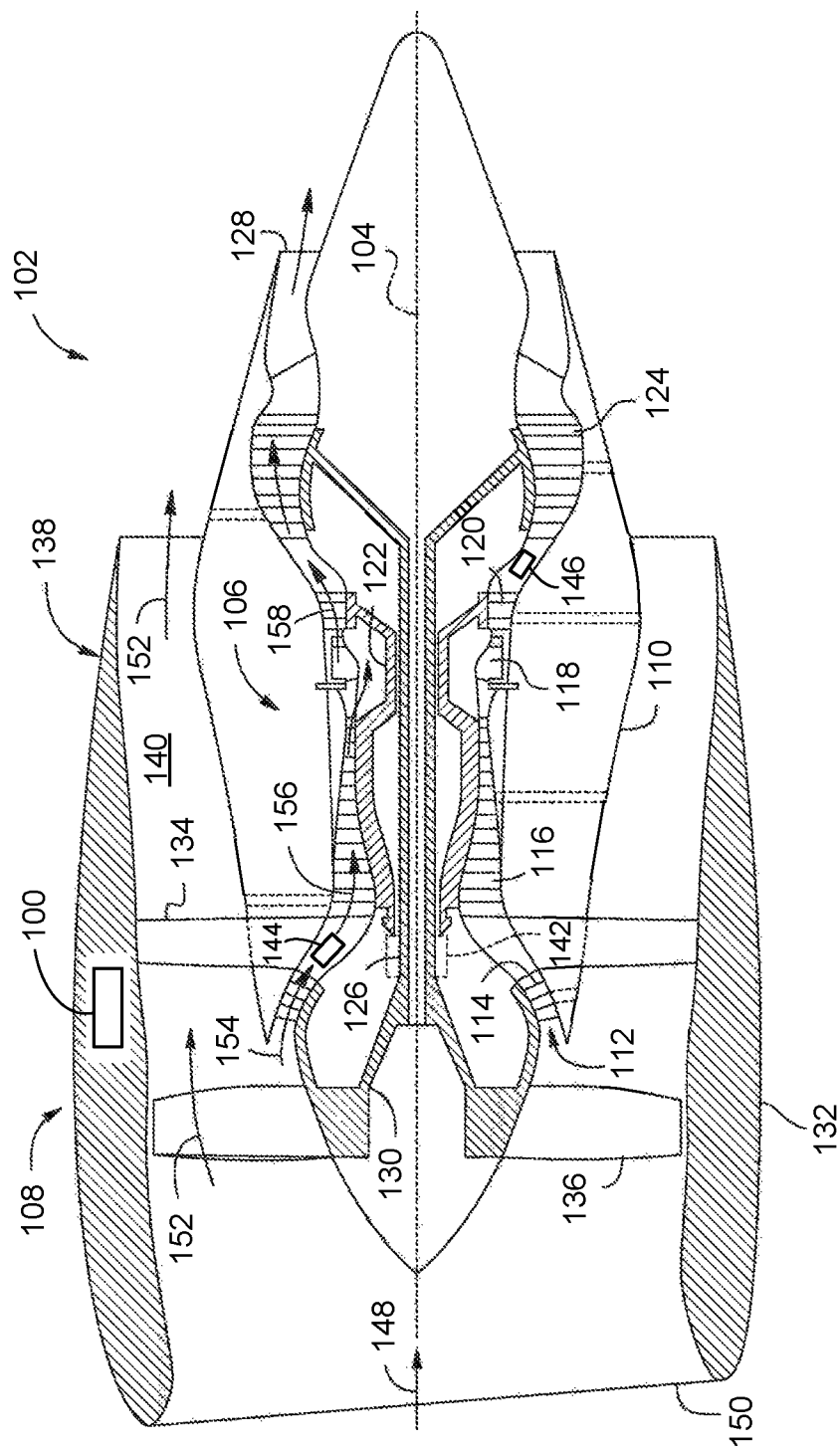
FIG. 1 illustrates an example gas turbine engine that can be utilized within an aircraft in which the examples disclosed herein can be implemented.

Methods, apparatus, systems, and articles of manufacture to generate a predictive asset health quantifier of a turbine engine are disclosed.

Certain examples provide an example apparatus to generate a predictive asset health quantifier of a turbine engine. The example apparatus includes a performance model analyzer to determine a fleet behavior parameter as a function of an engine performance characteristic by generating a reference performance model using historical information for a fleet of operators using turbine engines, generate a residual performance model based on calculating a difference between the fleet behavior parameter and a plurality of operator behavior parameters corresponding to an operation of turbine engines operated by the fleet, identify an operator as a candidate improvement target based on comparing the operator behavior parameters corresponding to the operator to the fleet in the residual performance model, and determine an adjusted operator behavior parameter for the candidate improvement target. The example apparatus further includes a system updater to update a computer-based model to replace the operator behavior parameter with the adjusted operator behavior parameter to calculate an asset health quantifier of a turbine engine operated by the candidate improvement target, and a task optimizer to determine a workscope for the turbine engine based on calculating the asset health quantifier using the adjusted operator behavior parameter, the workscope to be performed on the turbine engine to improve an operation of the turbine engine.

Certain examples provide an example method to generate a predictive asset health quantifier of a turbine engine. The example method includes determining a fleet behavior parameter as a function of an engine performance characteristic by generating a reference performance model using historical information for a fleet of operators using turbine engines, generating a residual performance model based on calculating a difference between the fleet behavior parameter and a plurality of operator behavior parameters corresponding to an operation of turbine engines operated by the fleet, identifying an operator as a candidate improvement target based on comparing the operator behavior parameters corresponding to the operator to the fleet in the residual performance model, and determining an adjusted operator behavior parameter for the candidate improvement target. The example method further includes updating a computer-based model to replace the operator behavior parameter with the adjusted operator behavior parameter to calculate an asset health quantifier of a turbine engine operated by the candidate improvement target, determining a workscope for the turbine engine based on calculating the asset health quantifier using the adjusted operator behavior parameter, and performing the workscope on the turbine engine to improve an operation of the turbine engine.

Certain examples provide an example non-transitory computer readable storage medium including instructions that, when executed, cause a machine to at least generate a predictive asset health quantifier of a turbine engine. The example instructions, when executed, cause the machine to at least determine a fleet behavior parameter as a function of an engine performance characteristic by generating a reference performance model using historical information for a fleet of operators using turbine engines, generate a residual performance model based on calculating a difference between the fleet behavior parameter and a plurality of operator behavior parameters corresponding to an operation of turbine engines operated by the fleet, identify an operator as a candidate improvement target based on comparing the operator behavior parameters corresponding to the operator to the fleet in the residual performance model, and determine an adjusted operator behavior parameter for the candidate improvement target. The example instructions further cause the machine to at least update a computer-based model to replace the operator behavior parameter with the adjusted operator behavior parameter to calculate an asset health quantifier of a turbine engine operated by the candidate improvement target, and determine a workscope for the turbine engine based on calculating the asset health quantifier using the adjusted operator behavior parameter, the workscope to be performed on the turbine engine to improve an operation of the turbine engine.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

A turbine engine (e.g., an aircraft turbine engine) typically includes components (e.g., asset components, etc.) or modules (e.g., asset modules or assemblies including one or more components, etc.) for operation such as a fan (e.g., a fan section), a booster compressor, a high-pressure compressor, a high-pressure turbine, and a low-pressure turbine. The components can degrade over time due to demanding operating conditions such as extreme temperature and vibration. In some instances, debris or other objects enter the turbine engine via the fan and cause damage to one or more components. Routine maintenance intervals and service checks can be implemented to inspect for degradation and/or damage. However, in some instances, taking the turbine engine offline or off wing to perform maintenance includes taking an entire system, such as an aircraft, offline. In addition to prematurely replacing expensive components, aircraft non-operation can incur additional costs such as lost revenue, labor costs, etc. Monitoring components for degradation can provide actionable information for maintenance personnel to replace a component of the turbine engine when necessary, to optimally schedule maintenance tasks of the turbine engine based on contractual and/or maintenance resources, etc.

Examples disclosed herein include an example asset workscope generation system (AWGS) to combine field data, statistical analytic tools, engineering physics-based models, prediction simulators integrated with forecasted mission requirements, etc., to develop a recommended modular workscope and a timing to perform the recommended modular workscope for an asset such as a turbine engine to satisfy customer contractual and field personnel expectations. As used herein, the term "workscope" refers to a set of tasks (e.g., one or more maintenance tasks, service tasks, etc.) executed by maintenance personnel to improve an operating condition of an asset, where the operating condition is determined based on requirements such as contractual requirements, environmental requirements, regulatory requirements, utilization requirements, etc., and/or a combination thereof. In some examples, the AWGS obtains asset monitoring information from one or more assets, a network, a server, etc. As used herein, the term asset monitoring information refers to information corresponding to one or more assets such as asset sensor information, asset environmental information, asset utilization information, asset configuration information, asset history information, asset class history information, asset workscope quantifiers, etc.

In some examples, the AWGS identifies target assets for removal from service (e.g., removal from an aircraft, removal from a facility, removal from use, etc.) based on calculating an asset health quantifier. As used herein, the term "asset health quantifier" refers to a numerical representation corresponding to a health status, an operational status, etc., of an asset, an asset component, etc. For example, the asset health quantifier can be represented by a percentage of useful life remaining, a number of flight cycles (e.g., a number of flight cycles to be executed before service is performed, etc.), a quantity of time-on-wing (TOW) hours (e.g., a number of time-on-wing hours before service is performed, etc.), etc. For example, an asset health quantifier of 75% for a turbine engine booster compressor can correspond to the booster compressor having 75% of useful life remaining before the booster compressor may become non-responsive or requires a maintenance action. In another example, an asset health quantifier of 500 cycles for a turbine engine fan section can correspond to the turbine engine fan section executing 500 cycles before the fan section can be serviced to satisfy a contractual requirement.

In some examples, the AWGS can execute one or more engineering physics-based models, historical information-based models, statistical models, etc., and/or a combination thereof to generate an actual asset health quantifier for an asset, an asset component, an asset module, etc. In some examples, the AWGS can generate a projected asset health quantifier based on forecasted mission requirements of the asset (e.g., forecasted contractual requirements, forecasted environmental information, etc.).

In some examples, the AWGS can identify one or more target assets for removal based on comparing one or more asset health quantifiers (e.g., an actual asset health quantifier, a projected asset health quantifier, etc.) to a threshold, determine whether the one or more asset health quantifiers satisfy the threshold, and identify the one or more target assets for removal based on the comparison.

In some examples, the AWGS generates a workscope task for the target asset. For example, the AWGS can identify a set of tasks (e.g., maintenance tasks, service tasks, etc.) to perform maintenance on a fan section (e.g., one or more fan blades, etc.) of a turbine engine. For example, the AWGS can identify maintenance costs corresponding to each task in the set of tasks. For example, the AWGS can calculate a cost based on a quantity of maintenance personnel and corresponding man-hours to perform a maintenance task, a quantity of components (e.g., a quantity of replacement parts, spare parts, shop-supplied parts, etc., and/or a combination thereof) to perform the maintenance task, a monetary cost for each of the components, etc.

In some examples, the AWGS optimizes and/or otherwise improves a workscope based on the generated workscope tasks for the target asset. For example, the AWGS can generate a plurality of workscopes in which each workscope includes a combination of one or more of the generated workscope tasks. The example AWGS can calculate an estimate asset health quantifier for the target asset based on estimating what the asset health quantifier for the target asset can be in response to performing a specified workscope on the target asset. The example AWGS can calculate an estimate asset health quantifier for each one of the generated workscopes. The example AWGS can identify a workscope for the target asset based on one or more factors such as comparing the calculated estimate asset health quantifiers to contractual requirements, customer requirements, operational constraints, etc., and/or a combination thereof.

In some examples, the AWGS calculates a workscope quantifier based on comparing a first asset health quantifier for a target asset to a second asset health quantifier for the target asset. For example, the first asset health quantifier can be an asset health quantifier (e.g., an actual asset health quantifier, a projected asset health quantifier, etc.) of the target asset prior to completing a workscope on the target asset. The second asset health quantifier can be an asset health quantifier (e.g., an actual asset health quantifier, a projected asset health quantifier, etc.) of the target asset after completing the workscope on the target asset. For example, the AWGS can calculate a workscope quantifier by calculating a difference between the first and the second asset health quantifiers.

In some examples, the AWGS can compare the workscope quantifier to a workscope quantifier threshold and determine whether the workscope quantifier threshold has been satisfied based on the comparison. In some examples, the AWGS can modify one or more components of the AWGS in response to the workscope quantifier threshold being satisfied. For example, the AWGS can update one or more models, one or more parameters corresponding to a maintenance task, improve an optimization parameter for evaluating generated workscopes, etc., and/or a combination thereof in response to the workscope quantifier threshold being satisfied. While example assets described herein have been illustrated in terms of engines, such as a turbine engine, diesel engine, etc., the systems and methods disclosed and described herein can also apply to assets such as wind turbines, additive printing machines, locomotive engines, health imaging equipment such as computed tomography scanners, etc., or any other type of mechanical, electrical, or electro-mechanical device. Additionally or alternatively, the systems and methods disclosed and described herein can also apply to any asset that has modular elements that require maintenance planning and scheduling a removal within requirement constraints such as contractual constraints corresponding to a management of spare assets.

Examples disclosed herein include a workscope effect calculator (WEC) apparatus to generate a predictive asset health quantifier of a turbine engine. In some examples, the WEC apparatus identifies leading indicator signals or trends that improve operator behavior corresponding to operating a turbine engine. As used herein, the term "operator" refers to a manager, an owner, a user, etc., of one or more turbine engines (e.g., aircraft turbine engines, land-based turbine engines, etc.). For example, an operator can be an airline operator. Alternatively, the operator can be a wind turbine operator.

As used herein, the terms "operator behavior" and "operator asset behavior" are used interchangeably and refer to quantifications corresponding to how an operator deploys and/or otherwise uses an asset while in operation. For example, an operator asset behavior can refer to an airline operator using a climb de-rate parameter for a turbine engine while the turbine engine is operating in a climb flight segment in a flight cycle. In another example, an operator asset behavior can refer to a land-based turbine engine operator using a de-rate parameter for a turbine engine while the turbine engine is operating in an environment with a specific ambient temperature, an elevation, airborne particulate matter exposure (e.g., an amount of dust present in an airport environment, etc.), etc. As used herein, the term "de-rate" refers to an operation of a turbine engine at less than a rated maximum capacity of the turbine engine to prolong a useful life, reduce a maintenance cost, etc., of the turbine engine. For example, a de-rate value of 20% can refer to operating a turbine engine at 80% of the maximum capacity of the turbine engine.

In some examples, the WEC apparatus obtains asset monitoring information to determine a de-rate value of the turbine engine during a duty cycle (e.g., an airline flight cycle, a duty cycle for a land-based operation gas turbine, etc.). In some examples, the WEC apparatus obtains asset monitoring information to determine a de-rate value of the turbine engine during a specific flight stage. As used herein, the terms "flight segment" or "flight stage" are used interchangeably and refer to a point in an aircraft flight cycle or aircraft operation cycle in which the turbine engine is operating when installed on an aircraft. For example, the flight stage can be a parked stage (e.g., the aircraft is parked at a gate, etc.), a taxi stage (e.g., the aircraft is taxiing to a runway for takeoff, etc.), a takeoff stage, a climb stage, a cruise stage, a descent stage, an approach stage, a landing stage, etc.

In some examples, the WEC apparatus functions as an early warning system that identifies shifts in operator behavior (e.g., de-rate behavior, takeoff de-rate behavior, etc.) leading to reduced time-on-wing and higher maintenance costs based on evaluating a de-rate parameter. For example, the WEC apparatus can identify that an operator is using a non-optimized and/or otherwise unfavorable de-rate parameter value when performing an aircraft operation such as taking off or climbing. In some examples, the WEC apparatus determines one or more de-rate parameters of the turbine engine based on the asset monitoring information. For example, the WEC apparatus can determine a value for a takeoff de-rate parameter, a climb de-rate parameter, etc., based on obtaining information from a turbine engine controller, information from an aircraft control system, etc. The example WEC apparatus can analyze the de-rate parameters to identify opportunities for increasing TOW, lowering turbine engine maintenance cost, etc., while respecting operator metrics (e.g., fuel burn, mission times, etc.).

In some examples, the WEC apparatus generates predictive asset health quantifiers by identifying leading indicators by comparing asset monitoring information (e.g., asset sensor data, etc.) to data obtained from executing one or more models (e.g., physics-based models, fleet average regression models, historical trend models, etc.) and identifying deviations of specific engines and/or operators based on the comparison. For example, the WEC apparatus can execute a physics-based model of the turbine engine to determine an asset health quantifier of the turbine engine as a function of operator behavior (e.g., de-rate behavior, takeoff de-rate behavior, etc.) and aircraft weight to predict anticipated maintenance costs, estimated turbine engine health, etc., of the turbine engine. In some examples, a physics-based model is used to simulate a new asset when historical data is not available. In some examples, a physics-based model is used to simulate an existing asset including a new or an upgraded asset component that can change a performance, an AHQ, etc., of the asset when historical data may not include data corresponding to the new or upgraded asset component.

In some examples, the WEC apparatus generates asset and/or asset component performance and severity models based on the deviations. For example, the WEC apparatus can translate the impact of severity factors (e.g., environmental factors, operational factors, etc.), to asset and/or asset component health factors that drive maintenance operations of the asset and/or the asset components. In some examples, the WEC apparatus generates a performance model using a physics-based model, historical information, etc. In some examples, the WEC apparatus generates a performance model based on comparing a first asset health quantifier for an asset or a collection of assets owned by an operator to a plurality of asset health quantifiers calculated for a plurality of other operators. For example, the WEC apparatus can compare an exhaust gas-path temperature (EGT) rate of change value for assets owned by the operator and compare the EGT rate of change value to EGT rate of change values calculated for other operators to identify opportunities of improvement for the operator.

In some examples, the WEC apparatus generates a severity model using historical information. For example, the WEC apparatus can generate an asset health quantifier of an asset component as a function of TOW and an environmental or an operational condition. For example, the WEC apparatus can generate a severity model that maps TOW of an asset component such as a high-pressure turbine to a severity factor input (e.g., an ambient temperature, an exposure to an airborne particulate matter, etc.) for a region in which the asset operates. In some examples, the WEC apparatus incorporates multiple severity models per turbine engine that enable a quantification (e.g., an accurate quantification, an improved quantification, etc.) of competition among failure modes (e.g., potential failure modes, etc.) as a function of the turbine engine operating conditions (e.g., a booster compressor shows a higher sensitivity to ambient temperature than a high-pressure compressor, etc.) in the maintenance cost model. For example, the WEC apparatus can generate a severity model that maps TOW of a high-pressure compressor, a high-pressure turbine nozzle, a low-pressure turbine nozzle, etc., of an asset to a takeoff temperature (e.g., an average takeoff temperature, a peak takeoff temperature, etc.), a climb temperature (e.g., an average climb temperature, a peak climb temperature, etc.), etc., for a region in which the asset operates.

In some examples, the WEC apparatus generates recommendations to optimize and/or otherwise improve operator behavior corresponding to de-rate parameters when the asset is installed on an aircraft. For example, the WEC apparatus can identify an operator as a candidate improvement target based on the performance models, the severity models, etc., and/or a combination thereof. For example, the WEC apparatus can identify an operator for improvement and generate a recommendation to adjust operator behavior to increase TOW and/or improve turbine engine performance. For example, the WEC apparatus can generate a recommendation to change a climb time, a taper schedule, a de-rate parameter, etc., of the asset when installed on an aircraft. In some examples, the WEC apparatus generates a report including the recommendations. For example, the WEC apparatus can generate a report including a candidate improvement plan such as adjusting an engine de-rate parameter, adjusting a taper schedule, etc. In some examples, the WEC apparatus generates an alert dashboard (e.g., an alert dashboard in a report, an alert dashboard in a web-based software application, etc.) indicating areas of improvement for an operator to improve TOW and to reduce maintenance cost of an asset.

In some examples, the WEC apparatus can direct the AWGS to modify one or more components of the AWGS to optimize and/or otherwise improve workscope recommendations based on the operator behavior. For example, the WEC apparatus can direct the AWGS to update one or more models, one or more parameters corresponding to a maintenance task, improve an optimization parameter for evaluating generated workscopes, etc., and/or a combination thereof to meet a current operator behavior (e.g., an instant operator behavior, an observed operator behavior, etc.), a forecasted operator behavior, etc. For example, the WEC apparatus can direct the AWGS to update a physics-based model to be based on a takeoff de-rate parameter used by the operator. In such an example, the AWGS can generate asset health parameters of assets owned by the operator based on the takeoff de-rate parameter and/or other significant operating parameters used by the operator to generate improved workscope recommendations.

In some examples, the WEC apparatus can direct the AWGS to modify one or more components of the AWGS to optimize and/or otherwise improve workscope recommendations based on a comparison of pre-workscope asset related data (e.g., asset health quantifiers, asset monitoring information, inspection results, etc.), to post-workscope asset related data. For example, the WEC apparatus can compare a first asset health quantifier of an asset prior to a workscope being completed on the asset (e.g., when the asset is installed on the aircraft, removed from service but prior to completing an inspection, etc.) to a second asset health quantifier of the asset after the workscope has been completed on the asset.

For example, the WEC apparatus can calculate a workscope quantifier based on calculating a difference between a pre-workscope asset health quantifier and a post-workscope asset health quantifier. For example, the WEC apparatus can be used to optimize and/or otherwise improve a predictability of turbine engine maintenance management recommendations of the AWGS based on the workscope quantifier. For example, the WEC apparatus can direct a modification of one or more components of the AWGS based on comparing the workscope quantifier to a workscope quantifier threshold, and determining whether the workscope quantifier threshold has been satisfied based on the comparison. For example, the WEC apparatus can direct the AWGS to update one or more models, one or more parameters corresponding to a maintenance task, improve an optimization parameter for evaluating generated workscopes, etc., and/or a combination thereof based on the workscope quantifier satisfying the workscope quantifier threshold.

FIG. 1 is a schematic illustration of an example turbine engine controller 100 monitoring an example gas turbine engine 102. In the illustrated example, the turbine engine controller 100 is a full-authority digital engine control (FADEC) unit. For example, the turbine engine controller 100 can include a closed loop control module to generate a control input (e.g., a thrust command, a de-rate parameter, etc.) to the engine 102 based on an engine input (e.g., a pilot command, an aircraft control system command, etc.). Alternatively, the turbine engine controller 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the turbine engine controller 100. Alternatively, the sensors 144, 146 can be communicatively coupled to a control system of an aircraft coupled to the engine 102, in which the control system is communicatively coupled to the example turbine engine controller 100. In the illustrated example, the sensors 144, 146 are gas-path temperature sensors (e.g., exhaust gas-path temperature sensors, etc.). For example, the sensors 144, 146 can be monitoring a compressor inlet temperature and a temperature of gas exiting the high-pressure turbine 120. Alternatively, the sensors 144, 146 can be chip detector sensors (e.g., magnetic chip detector sensors, etc.), dust sensors, flow sensors, gas-path pressure sensors, rotor speed sensors, vibration sensors, position sensors (e.g., actuator position sensors, sensors detailing variable geometry, etc.), etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example turbine engine controller 100 coupled to the engine 102. Although the example turbine engine controller 100 is depicted in FIG. 1 as being proximate the fan section 108, the turbine engine controller 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
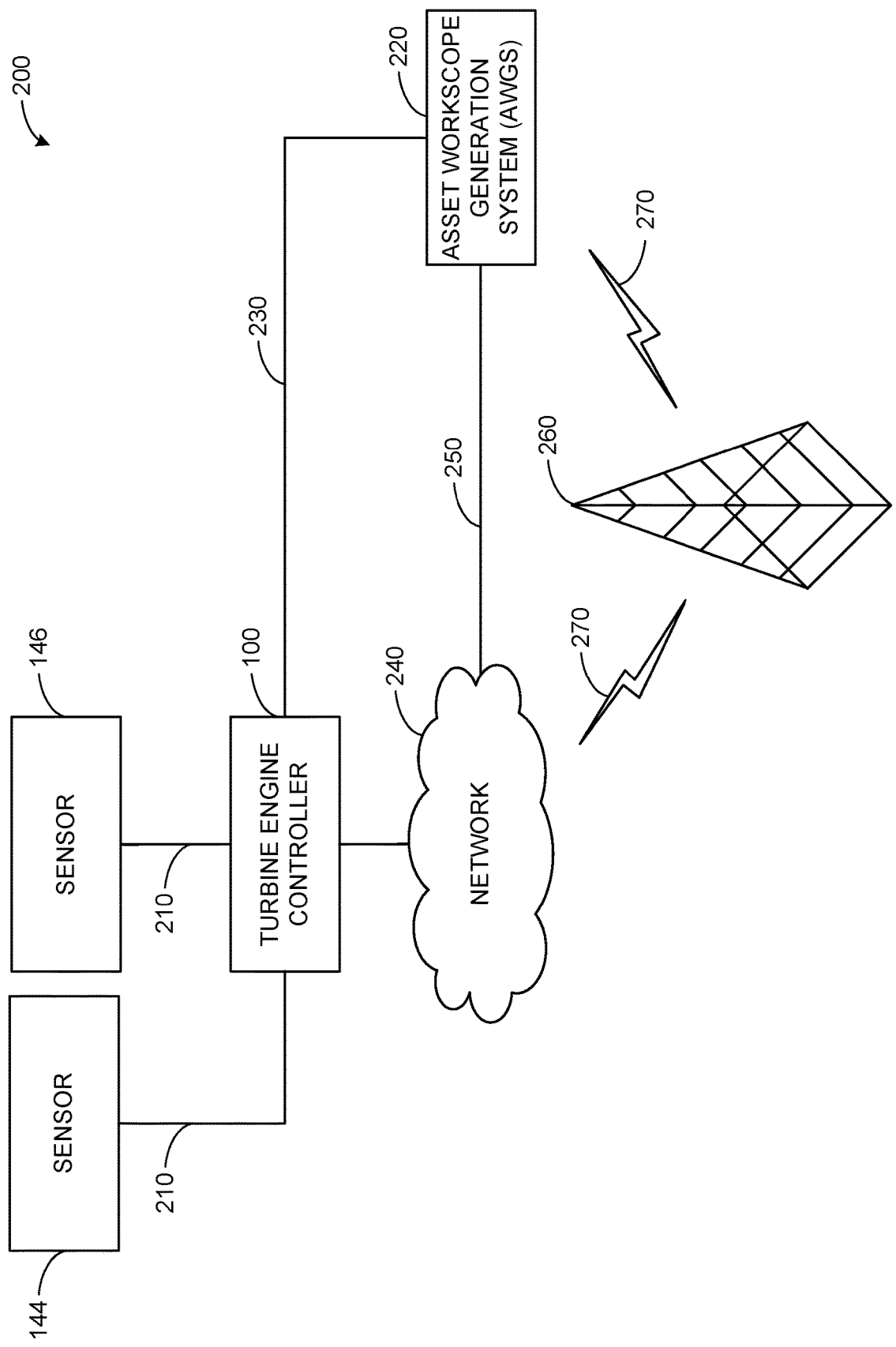
FIG. 2 is a block diagram of an example environment in which an example asset workscope generation system monitors the example gas turbine engine of FIG. 1.

FIG. 2 is a schematic illustration of an example asset monitoring system 200 for the gas turbine engine 102 of FIG. 1. In the illustrated example of FIG. 2, the sensors 144, 146 of FIG. 1 are communicatively coupled to the turbine engine controller 100 via sensor connections 210. The example turbine engine controller 100 obtains asset sensor information (e.g., a pressure, a temperature, a speed of a rotor, etc.) from the sensors 144, 146 to monitor an operation of the gas turbine engine 102. The sensor connections 210 can include direct wired or direct wireless connections. For example, a direct wired connection can involve a direct connection using wires in a harness connecting the sensors to the turbine engine controller 100, or a bus such as the Engine Area Distributed Interconnect Network (EADIN) bus. In another example, the direct wireless connections can implement a Bluetooth® connection, a Wi-Fi Direct® connection, or any other wireless communication protocol. Further shown in FIG. 2 are an example asset workscope generation system (AWGS) 220, an example AWGS direct connection 230, an example network 240, an example AWGS network connection 250, an example wireless communication system 260, and an example wireless communication links 270.

In the illustrated example of FIG. 2, the example turbine engine controller 100 is shown to be communicatively coupled to the AWGS 220 via the AWGS direct connection 230. For example, the AWGS 220 can obtain asset operation information such as flight data (e.g., altitudes, turbine engine speeds, engine exhaust temperatures, etc.), asset sensor information, etc., from the turbine engine controller 100 via the AWGS direct connection 230. The example AWGS direct connection 230 can be a direct wired or a direct wireless connection. For example, the AWGS 220 can download asset information (e.g., asset operation information, asset sensor information, etc.) of the engine 102 via a manual download of the data from the turbine engine controller 100 to a computing device such as a laptop, a server, etc., followed by a subsequent upload to the AWGS 220. Alternatively, the example AWGS 220 can be directly connected to the turbine engine controller 100 to obtain asset information.

The AWGS 220 of the illustrated example is a server that collects and processes asset information of the engine 102. Alternatively or in addition, the example AWGS 220 can be a laptop, a desktop computer, a tablet, or any type of computing device or a network including any number of computing devices. The example AWGS 220 analyzes the asset information of the engine 102 to determine an asset workscope. For example, the AWGS 220 can determine that the high-pressure compressor 116 of FIG. 1 requires a water-wash based on a comparison of an asset health quantifier of the high-pressure compressor 116 to an asset health quantifier threshold corresponding to the high-pressure compressor 116, an elapsing of a time interval specified in a contract, etc.

Additionally or alternatively, the example AWGS 220 can obtain asset information from the example turbine engine controller 100 via the network 240. For example, the AWGS 220 can obtain asset information of the engine 102 from the turbine engine controller 100 by connecting to the network 240 via the AWGS network connection 250. The example AWGS network connection 250 can be a direct wired or a direct wireless connection. For example, the turbine engine controller 100 can transmit asset information to a control system of an aircraft coupled to the engine 102. The aircraft control system can subsequently transmit the asset information to the example AWGS 220 via the network 240 (e.g., via the AWGS network connection 250, the wireless communication links 270, etc.).

The example network 240 of the illustrated example of FIG. 2 is the Internet. However, the example network 240 can be implemented using any suitable wired and/or wireless network(s) including, for example, one or more data buses, one or more Local Area Networks (LANs), one or more wireless LANs, one or more cellular networks, one or more private networks, one or more public networks, etc. The example network 240 enables the example turbine engine controller 100 to be in communication with the example AWGS 220. As used herein, the phrase "in communication," including variances therefore, encompasses direct communication and/or indirect communication through one or more intermediary components and does not require direct physical (e.g., wired) communication and/or constant communication, but rather includes selective communication at periodic and/or aperiodic intervals, as well as one-time events.

In some examples, the turbine engine controller 100 is unable to transmit asset information to the AWGS 220 via the AWGS direct connection 230, the AWGS network connection 250, etc. For example, a routing device upstream of the AWGS 220 can stop providing functional routing capabilities to the AWGS 220. In the illustrated example, the turbine engine health monitoring system 200 includes additional capabilities to enable communication (e.g., data transfer) between the AWGS 220 and the network 240. As shown in FIG. 2, the example AWGS 220 and the example network 240 include the capabilities to transmit and/or receive asset information through the example wireless communication system 260 (e.g., the cellular communication system, the satellite communication system, the air band radio communication system, the Aircraft Communications Addressing and Reporting System (ACARS), etc.) via the example wireless communication links 270.

The wireless communication links 270 of the illustrated example of FIG. 2 are cellular communication links. However, any other method and/or system of communication can additionally or alternatively be used such as an Ethernet connection, a Bluetooth connection, a Wi-Fi connection, a satellite connection, etc. Further, the example wireless communication links 270 of FIG. 2 can implement cellular connections via a Global System for Mobile Communications (GSM). However, any other systems and/or protocols for communications can be used such as Time Division Multiple Access (TDMA), Code Division Multiple Access (CDMA), Worldwide Interoperability for Microwave Access (WiMAX), Long Term Evolution (LTE), etc.

Figure 3:
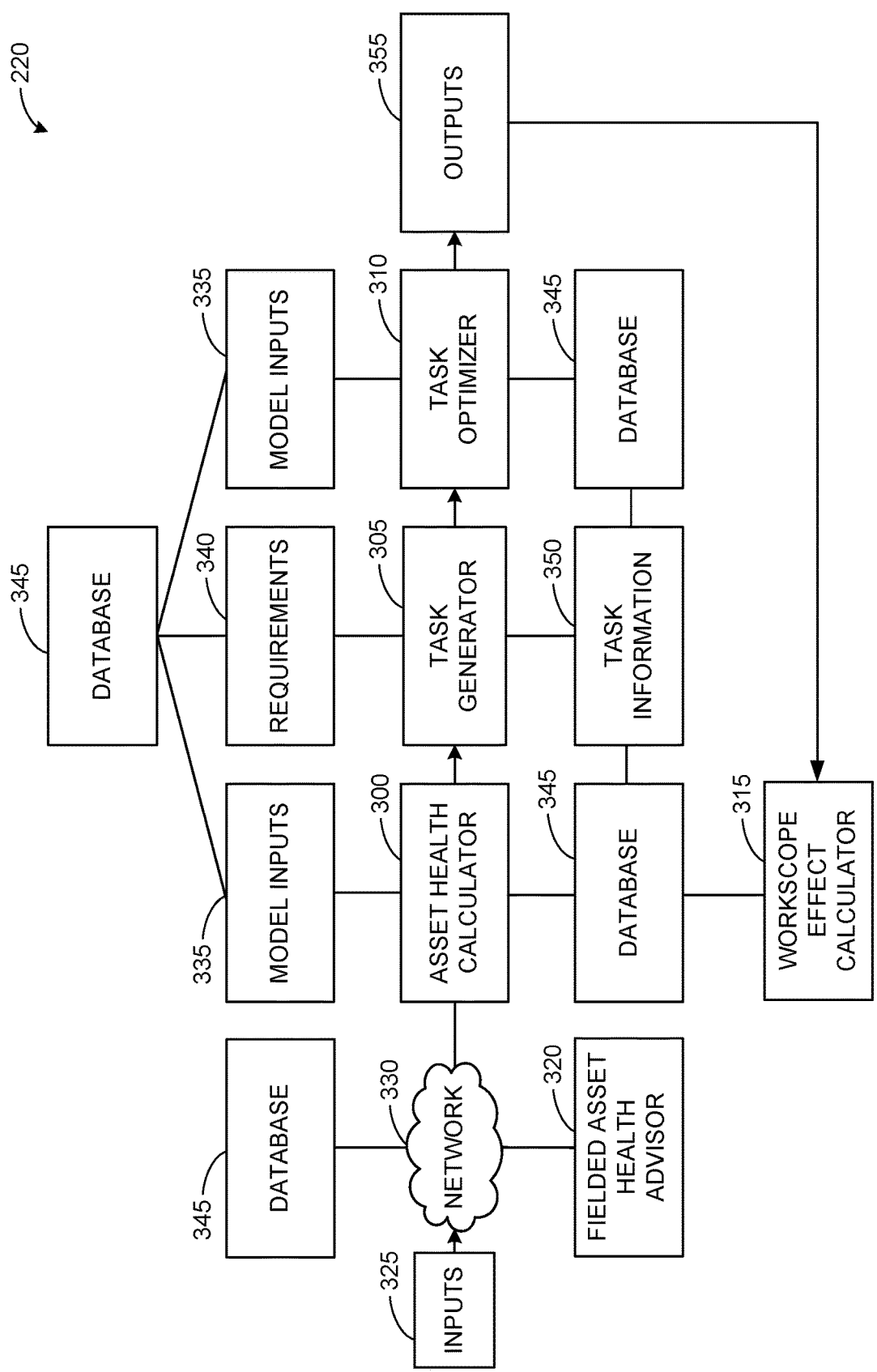
FIG. 3 is a block diagram of an example implementation of the example asset workscope generation system of FIG. 2.

FIG. 3 is a block diagram of an example implementation of the example AWGS 220 of FIG. 2. The example AWGS 220 includes an example asset health calculator 300, an example task generator 305, an example task optimizer 310, an example workscope effect calculator 315, an example fielded asset health advisor (FAHA) 320, example inputs 325, an example network 330, example model inputs 335, example requirements 340, an example database 345, example task information 350, and example outputs 355.

In the illustrated example of FIG. 3, the AWGS 220 includes the example asset health calculator 300 to identify a target asset such as the engine 102 of FIG. 1 for removal to perform a task to improve an operating condition of the target asset. In some examples, the asset health calculator 300 calculates an actual asset health quantifier (AHQ) of an asset based on the inputs 325 (e.g., asset sensor data, engine control inputs, etc.) obtained via the network 330. The example network 330 can implement or correspond to the example network 240 of FIG. 2. For example, the asset health calculator 300 can obtain inputs based on an inspection of the asset by an asset maintenance technician. In another example, the asset health calculator 300 can obtain asset information from the turbine engine controller 100 of the engine 102 of FIGS. 1-2 via the AWGS direct connection 230 of FIG. 2, the AWGS network connection 250 of FIG. 2, the wireless communication links 270 of FIG. 2, etc.

In some examples, the asset health calculator 300 calculates a projected AHQ based on the model inputs 335. For example, the asset health calculator 300 can estimate an operating condition of the engine 102 after the engine 102 completes a specified number of cycles (e.g., flight cycles, operation cycles, etc.). For example, the asset health calculator 300 can simulate the engine 102 completing the specified number of flight cycles by executing a digital twin model of the engine 102 for the specified number of flight cycles. As used herein, the term "flight cycle" refers to a complete operation cycle of an aircraft flight executed by an asset including a take-off operation and a landing operation.

In some examples, the asset health calculator 300 identifies a target asset for removal based on comparing an actual AHQ to an actual AHQ threshold and identifying the target asset for removal based on the comparison. In some examples, the asset health calculator identifies a target asset for removal based on comparing a projected AHQ to a projected AHQ threshold and identifying the target asset for removal based on the comparison. In some examples, the asset health calculator 300 generates a removal schedule for one or more target assets based on requirements such as contractual requirements, maintenance resources, spare part inventory, etc., and/or a combination thereof.

In some examples, the AHQ threshold (e.g., the actual AHQ threshold, the projected AHQ threshold, etc.) of an asset, an asset component, etc., represents an indicator, which when satisfied, corresponds to the asset, the asset component, etc., being identified as a candidate for removal to perform maintenance, service, etc. For example, the asset health calculator 300 can compare an actual AHQ of 50 cycles (e.g., flight cycles, flight operations, etc.) remaining (e.g., until service can be performed, until the asset component is taken off-wing, etc.) for the booster compressor 114 of FIG. 1 to an actual AHQ threshold of 100 cycles remaining and identify the booster compressor 114 of FIG. 1 as a candidate for removal based on the actual AHQ being less than the actual AHQ threshold. In another example, the asset health calculator 300 can compare an actual AHQ of 200 hours operating remaining for the booster compressor 114 of FIG. 1 to an actual AHQ threshold of 250 hours operating remaining and identify the booster compressor 114 of FIG. 1 as a candidate for removal based on the actual AHQ being less than the actual AHQ threshold. For example, the actual AHQ threshold, the projected AHQ threshold, etc., can be determined based on a contractual requirement, historical-based information of previously repaired assets and/or asset components, etc.

In the illustrated example of FIG. 3, the AWGS 220 includes the task generator 305 to generate a workscope task for the target asset based on obtaining an AHQ from the asset health calculator 300. For example, the task generator 305 can obtain an AHQ for the engine 102, an AHQ for the booster compressor 114 of the engine 102, etc. In some examples, the task generator 305 identifies an asset component to be processed based on comparing an AHQ to an AHQ threshold and identifying the asset component based on the comparison. For example, the task generator 305 can compare an actual AHQ of 30% useful life remaining for the booster compressor 114 to an actual AHQ threshold of 50% useful life remaining and identify the booster compressor 114 for replacement based on the actual AHQ being less than the actual AHQ threshold.

In some examples, the task generator 305 identifies an asset component to be processed based on the requirements 340 obtained from the database 345. For example, the task generator 305 can compare an actual AHQ of 100 cycles for the booster compressor 114 to an actual AHQ threshold of 200 cycles for the booster compressor 114 based on contractual requirements (e.g., a contract specifies that a booster compressor must be serviced when the actual AHQ goes below 200 cycles). In such an example, the task generator 305 can identify the booster compressor 114 for processing based on the actual AHQ being less than the actual AHQ threshold.

In response to identifying one or more asset components to be processed, the example task generator 305 can generate a set of workscope tasks that can be performed on the one or more asset components. For example, the task generator 305 can determine the set of tasks based on obtaining the task information 350 from the database 345. For example, the task generator 305 can query the database 345 with the identified component for processing (e.g., the booster compressor 114) and the actual AHQ of the component, and the database 345 can return task information including a list of tasks that can be performed with corresponding costs (e.g., labor costs, monetary costs, etc.), spare parts, tools, etc., for each task in the list.

In the illustrated example of FIG. 3, the AWGS 220 includes the task optimizer 310 to identify an optimized workscope for a target asset based on the generated workscope tasks for the target asset and the model inputs 335. For example, the task optimizer 310 can generate a plurality of workscopes in which each workscope includes a combination of one or more of the workscope tasks obtained from the task generator 305. In such an example, the task optimizer 310 can store the plurality of workscopes in the database 345.

In some examples, the task optimizer 310 calculates an estimate asset health quantifier for the target asset to generate quantifiable metrics to evaluate an accuracy or an efficiency of the AWGS 220 in improving an operating condition of the engine 102. For example, the task optimizer 310 can calculate an asset health quantifier for the target asset in response to performing a specified workscope on the target asset. For example, the task optimizer 310 can obtain an actual AHQ of the target asset calculated by the asset health calculator 300, select a workscope of interest for the target asset, and calculate an estimate AHQ of the target asset if the selected workscope were to be performed on the target asset. In some examples, the workscope effect calculator 315 calculates an actual AHQ of the target asset after the selected workscope is completed on the target asset and compares the actual AHQ to the estimate asset health quantifier calculated by the task optimizer 310 to determine an accuracy of the AWGS 220 based on the comparison.

In some examples, the task optimizer 310 calculates an estimate AHQ by executing one or models such as a digital twin model of the target asset to generate the model inputs 335. For example, a digital twin model can be implemented using an artificial neural network and/or other machine learning/artificial intelligence to form connections between inputs and outputs and drive evaluation and behavior through patterns, feedback, optimization, etc. As used herein, the term "digital twin" refers to a digital representation, a digital model, or a digital "shadow" corresponding to a digital informational construct about a physical system. That is, digital information can be implemented as a "twin" of a physical device/system (e.g., the engine 102, etc.) and information associated with and/or embedded within the physical device/system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces. The links for data flow or information flow correspond to a digital thread that represents a communication framework between sources of data and the digital twin model. The digital thread can enable an integrated view of asset data throughout a lifecycle of the asset. For example, the digital twin model can correspond to the virtual model of the asset and the digital thread can represent the connected data flow between an asset data source and the virtual model.

In some examples, the task optimizer 310 calculates an estimate asset health quantifier for each one of the generated workscopes. In some examples, the task optimizer 310 selects a workscope to be performed on the target asset based on one or more factors such as comparisons of the calculated estimate asset health quantifiers to contractual requirements, customer requirements, operational constraints, etc., and/or a combination thereof. In such examples, the outputs 355 correspond to the selected workscope including a set of tasks to be performed on the target asset and corresponding workscope information. For example, the workscope information can include an assignment of maintenance personnel, a service facility, spare parts, tools, etc., to the workscope based on a removal schedule identified by the asset health calculator 300.

In the illustrated example of FIG. 3, the AWGS 220 includes the workscope effect calculator 315 to generate a predictive asset health quantifier of a turbine engine. For example, the workscope effect calculator 315 can determine one or more de-rate parameters of the turbine engine based on the inputs 325. For example, the workscope effect calculator 315 can determine a value for a takeoff de-rate parameter, a climb de-rate parameter, etc., of the engine 102. The example workscope effect calculator 315 can analyze the de-rate parameters to identify opportunities for increasing TOW, lowering turbine engine maintenance cost, etc., of the engine 102 while respecting operator metrics (e.g., fuel burn, mission times, etc.).

In some examples, the workscope effect calculator 315 generates asset and/or asset component performance and severity models based on the deviations. For example, the workscope effect calculator 315 can translate the impact of environmental factors, operational factors, etc., to asset and/or asset component health factors that drive maintenance operations of the asset and/or the asset components. In some examples, the workscope effect calculator 315 generates a severity model using historical information. For example, the workscope effect calculator 315 can generate an asset health quantifier of an asset component as a function of TOW and an environmental or an operational condition. For example, the workscope effect calculator 315 can generate a severity model that maps TOW of an asset component such as a high-pressure compressor to one or more environmental parameters of significance to component life (e.g., TOW, etc.).

In some examples, the workscope effect calculator 315 generates recommendations to optimize and/or otherwise improve operator behavior corresponding to takeoff de-rate parameters, climb de-rate parameters, etc., when the asset is on-wing of an aircraft. For example, the workscope effect calculator 315 can generate a recommendation to adjust the operator behavior to increase TOW and improve turbine engine performance. For example, the workscope effect calculator 315 can generate a recommendation to change a climb time, a taper schedule (e.g., a turbine engine de-rate taper schedule, etc.), a de-rate parameter, etc., of the asset when on-wing of the aircraft. As used herein, the term "taper schedule" refers to a scheduled de-rating operation of a turbine engine as the turbine engine transitions between flight segments of a flight cycle. For example, the taper schedule can include instructions to operate the turbine engine at 5% de-rate during a takeoff and departure flight segment, at 15% de-rate during a climb flight segment, and at 40% de-rate during a cruise flight segment.

In some examples, the workscope effect calculator 315 generates a report including the recommendations. For example, the workscope effect calculator 315 can generate a report including a candidate improvement plan for identified operators as candidate improvement targets. For example, the candidate improvement plan can include a recommendation to change the climb time, the taper schedule, the de-rate parameter, etc., of the asset when on-wing of the aircraft. In some examples, the workscope effect calculator 315 generates an alert dashboard (e.g., an alert dashboard in a report, an alert dashboard in a web-based software application, etc.) indicating areas of improvement for an operator to improve TOW and to reduce maintenance cost of an asset.

In some examples, the workscope effect calculator 315 calculates an effect of performing a workscope on a target asset. In some examples, the workscope effect calculator 315 calculates a workscope quantifier which represents an accuracy or an efficiency of the AWGS 220 in improving an operating condition of the engine 102. In some examples, the workscope effect calculator 315 calculates an actual AHQ of the target asset in response to the selected workscope being performed on the target asset. In some examples, the workscope effect calculator 315 calculates the actual AHQ based on an inspection (e.g., a visual inspection, etc.) from maintenance personnel, sensor data from the sensors 144, 146 of FIG. 2, etc., and/or a combination thereof. For example, the workscope effect calculator 315 can calculate an actual AHQ of the high-pressure turbine 120 based on comparing (1) a first pressure value and/or a first temperature value of the high-pressure turbine 120 obtained from the sensors 144, 146 of FIG. 2 prior to the selected workscope being performed to (2) a second pressure value and/or a second temperature value of the high-pressure turbine 120 obtained from the sensors 144, 146 after the selected workscope being performed. In such an example, the workscope effect calculator 315 can calculate the actual AHQ based on the comparison.

In some examples, the workscope effect calculator 315 calculates a workscope quantifier based on comparing a first asset health quantifier of a target asset to a second asset health quantifier of the target asset. For example, the workscope effect calculator 315 can calculate a workscope quantifier based on a first actual AHQ calculated by the task optimizer 310 prior to a workscope being performed on the engine 102 and a second actual AHQ calculated by the workscope effect calculator 315 after a completion of the workscope. For example, the workscope quantifier can be a difference between the first and the second actual AHQ, a ratio of the first and the second actual AHQ, etc. For example, the workscope effect calculator 315 can calculate a workscope quantifier of 10% based on a difference between a first actual AHQ of 90% calculated by the task optimizer 310 and a second actual AHQ of 80% calculated by the workscope effect calculator 315 (e.g., 10%=90%−80%, etc.). In such an example, the workscope effect calculator 315 can determine that the AWGS 220 can be improved because the selected workscope did not improve an operating condition of the engine 102 to a level anticipated by the AWGS 220.

In some examples, the workscope effect calculator 315 modifies one or more components of the AWGS 220 based on the operator behavior (e.g., a de-rating behavior of owner assets, etc.). In some examples, the workscope effect calculator 315 modifies the one or more components of the AWGS 220 by calculating a workscope quantifier, comparing the workscope quantifier to a workscope quantifier threshold, and determining whether the workscope quantifier satisfies the workscope quantifier threshold based on the comparison. In some examples, the workscope quantifier threshold represents an indicator, when satisfied, identifies that the AWGS 220 can be improved by updating one or more components of the AWGS 220. For example, the workscope effect calculator 315 can obtain a first actual AHQ for the booster compressor 114 from the database 345 corresponding to an actual AHQ of 90% useful life remaining calculated by the task optimizer 310. The example workscope effect calculator 315 can generate a second actual AHQ of 70% useful life remaining based on an inspection of the booster compressor 114, the sensor data from the sensors 144, 146, etc.

The example workscope effect calculator 315 can calculate a workscope quantifier of 20% based on calculating a difference between the first and the second actual AHQ (e.g., 20%=90%−70%, etc.). In another example, the workscope effect calculator 315 can calculate a workscope quantifier of 0.78 based on calculating a ratio of the first and the second actual AHQ (e.g., 0.78=0.70÷0.90, etc.). In such an example, the workscope effect calculator 315 can compare the workscope quantifier of 0.78 to a workscope quantifier threshold of 0.85 and determine whether the workscope quantifier satisfies the workscope quantifier threshold. For example, the workscope effect calculator 315 can determine to modify a component of the AWGS 220 based on the workscope quantifier being less than the workscope quantifier threshold.

In response to determining that the workscope quantifier satisfies the workscope quantifier threshold, the example workscope effect calculator 315 can regenerate the example asset health calculator 300, the example task generator 305, the example task optimizer 310, the example model inputs 335, the example requirements 340, the example database 345, the example task information 350, etc., and/or a combination thereof. For example, the workscope effect calculator 315 can direct a digital twin model of the engine 102 to update to a latest version of the digital twin model incorporating up-to-date historical trend information, model parameters, model algorithms, etc. In another example, the workscope effect calculator 315 can direct the database 345 to update to include a latest version of the task information 350. In yet another example, the workscope effect calculator 315 can direct the task optimizer 310 to update one or more algorithms, calculation parameters, etc., used by the task optimizer 310 to a latest version.

In the illustrated example of FIG. 3, the AWGS 220 includes the FAHA 320 to generate a recommendation to improve operational usage of an asset. In some examples, the FAHA 320 obtains sensor data from the sensors 144, 146 of FIG. 2, model information (e.g., outputs from a physics-based model of an asset, a stochastic model of an asset, etc.), etc., to generate analytics and diagnostics corresponding to a health of the asset. For example, the FAHA 320 can be a software application executing on a computing device (e.g., a desktop computer, a tablet, a smartphone, etc.) to generate asset health information (e.g., an actual AHQ, a projected AHQ, etc.), asset usage recommendations, etc. In other examples, the FAHA 320 can be implemented as a dedicated hardware device (e.g., an application-specific integrated circuit, firmware device, etc.) to monitor asset operation and generate asset health information, asset usage recommendation, etc.

In the illustrated example, the FAHA 320 is communicatively coupled to the network 330. For example, the FAHA 320 can obtain sensor data from the sensors 144, 146, obtain an up-to-date version of one or more models, obtain an up-to-date version of an algorithm or a calculation parameter used by the asset health calculator 300, etc., via the network 330. Alternatively, the example FAHA 320 may not be communicatively coupled to the network 330 (e.g., the FAHA 320 is executing on a standalone device not communicatively coupled to the network 330, etc.).

In the illustrated example of FIG. 3, the AWGS 220 includes the database 345 to record data (e.g., asset health quantifiers, workscope quantifiers, the inputs 325, the model inputs 335, the requirements 340, the task information 350, etc.). In the illustrated example, the database 345 is communicatively coupled to the asset health calculator 300, the task generator 305, the task optimizer 310, the workscope effect calculator 315, and the FAHA 320 (e.g., when communicatively coupled to the network 330, etc.). The example database 345 can respond to queries for information related to data in the database 345. For example, the database 345 can respond to queries for additional data by providing the additional data (e.g., the one or more data points), by providing an index associated with the additional data in the database 345, etc. The example database 345 can additionally or alternatively respond to queries when there is no additional data in the database 345 by providing a null index, an end of database identifier, etc. For example, the asset health calculator 300 can query the database 345 for asset sensor data, asset environmental data, utilization data, etc., corresponding to the engine 102. In response to the query, the example database 345 can transmit the data and corresponding information such as data logs, maintenance history, etc., to the example asset health calculator 300.

The example database 345 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 345 can additionally or alternatively be implemented by one or more double data rate (DDR) memories, such as DDR, DDR2, DDR3, DDR4, mobile DDR (mDDR), etc. The example database 345 can additionally or alternatively be implemented by one or more mass storage devices such as hard disk drive(s), compact disk drive(s) digital versatile disk drive(s), solid-state drives, etc. While in the illustrated example the database 345 is illustrated as a single database, the database 345 can be implemented by any number and/or type(s) of databases.

While an example implementation of the AWGS 220 of FIG. 2 is illustrated in FIG. 3, one or more of the elements, processes and/or devices illustrated in FIG. 3 may be combined, divided, re-arranged, omitted, eliminated and/or implemented in any other way. Further, the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 of FIG. 3 may be implemented by hardware, software, firmware and/or any combination of hardware, software and/or firmware. Thus, for example, any of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, and/or the example outputs 355 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AWGS 220 of FIG. 2 may include one or more elements, processes and/or devices in addition to, or instead of, those illustrated in FIG. 3, and/or may include more than one of any or all of the illustrated elements, processes and devices.

Figure 4:
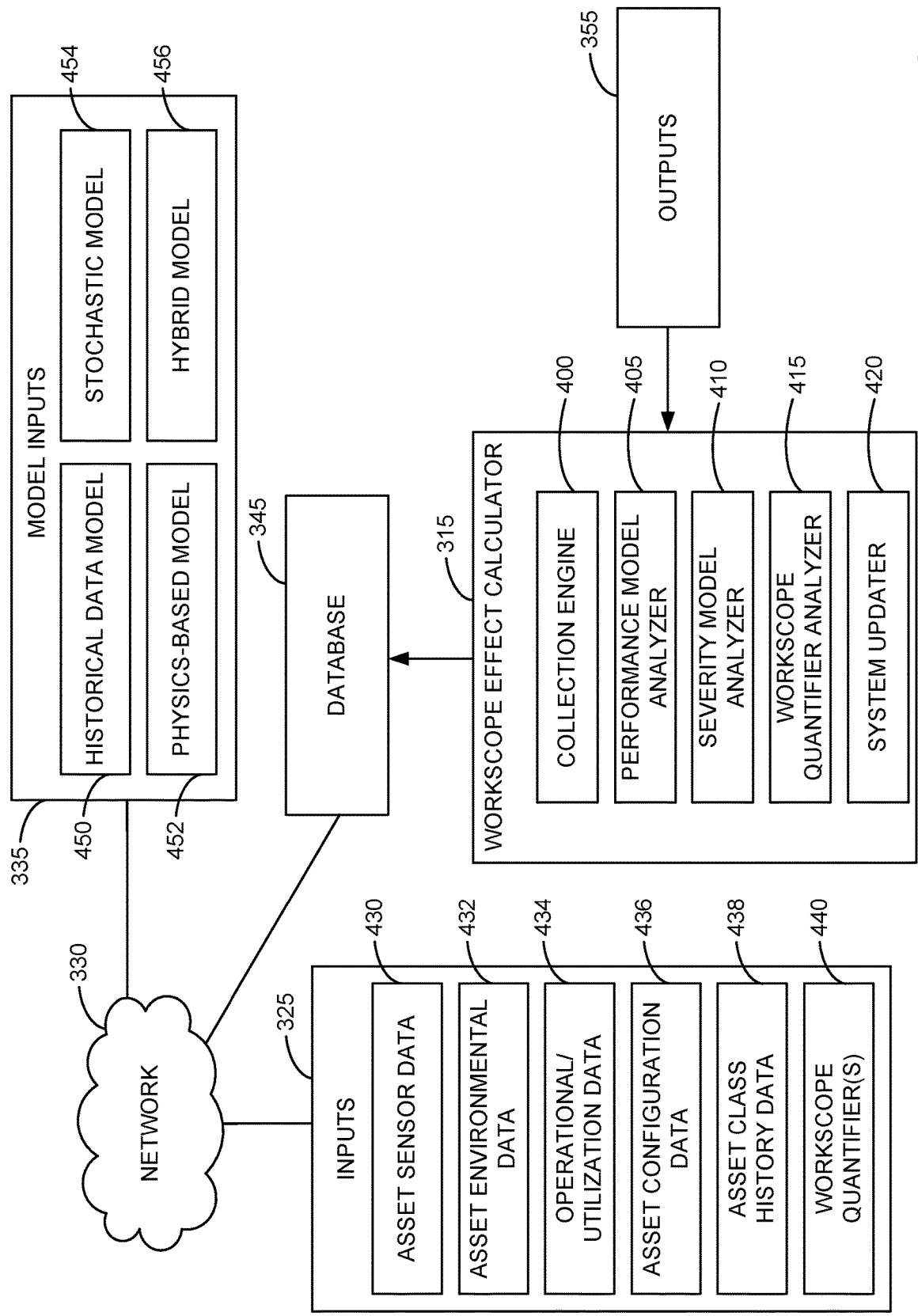
FIG. 4 is a block diagram of an example implementation of an example workscope effect calculator apparatus.

FIG. 4 is a block diagram of an example implementation of the example workscope effect calculator (WEC) 315 of FIG. 3. The WEC 315 of the illustrated example obtains operator behavior corresponding to assets and generates and analyzes performance and/or severity models based on the operator behavior. In some examples, the WEC 315 determines an impact of the operator behavior on health of an asset (e.g., actual AHQ, projected AHQ, etc.) and recommended workscopes for the asset based on the asset health. In some examples, the WEC 315 determines a workscope effect of the asset corresponding to a comparison of pre-workscope asset information (e.g., pre-workscope actual AHQ, pre-workscope projected AHQ, etc.) to post-workscope asset information (e.g., post-workscope actual AHQ, post-workscope projected AHQ, etc.). In some examples, the WEC 315 updates one or more components of the AWGS 220 based on the operator behavior, the workscope effect, etc. In the illustrated example of FIG. 4, the WEC 315 includes a collection engine 400, a performance model analyzer 405, a severity model analyzer 410, a workscope quantifier analyzer 415, and a system updater 420.

In the illustrated example of FIG. 4, the example WEC 315 includes the collection engine 400 to obtain information of interest to process. In the illustrated example, the collection engine 400 obtains the inputs 325 to process via the network 330 and the database 345 of FIG. 3. For example, the inputs 325 can be stored in the database 345 via the network 330. The example collection engine 400 can obtain the inputs 325 from the database 345. The inputs 325 of the illustrated example include example asset sensor data 430, example asset environmental data 432, example operational/utilization data 434, example asset configuration data 436, example asset class history data 438, and example workscope quantifier(s) 440.

In the illustrated example, the collection engine 400 obtains the asset sensor data 430 to determine operating conditions experienced by the engine 102 of FIG. 1. In some examples, the asset sensor data 430 corresponds to inputs to the engine 102. For example, the asset sensor data 430 can include an engine command (e.g., a thrust control input, a de-rate control input, etc.), an engine input, etc. For example, the asset sensor data 430 can correspond to information obtained from a closed loop control module included in the turbine engine controller 100 of FIGS. 1-2. For example, the asset sensor data 430 can include parameters generated by an algorithm executed by the turbine engine controller 100 in response to an engine control input, an environmental factor, etc.

In some examples, the collection engine 400 obtains the asset sensor data 430 from the database 345 of FIG. 3. In some examples, the asset sensor data 430 corresponds to sensor data obtained from the sensors 144, 146 of FIG. 2. For example, the asset sensor data 430 can include sensor measurements such as a speed of a rotor, a pressure, a temperature, a vibration, etc., experienced by the engine 102 of FIG. 1. In some examples, the asset sensor data 430 includes a range of sensor measurements for an environmental parameter (e.g., a pressure, a temperature, etc.) measured by an environmental parameter sensor (e.g., a pressure sensor, a temperature sensor, etc.).

In some examples, the asset sensor data 430 includes a duration of sensor measurements such as an amount of time the sensors 144, 146 measured a specific sensor measurement (e.g., an amount of time the sensors 144, 146 measured a pressure value of 100 PSI, an amount of time the sensors 144, 146 measured a temperature value of 2400 Rankine, etc.). In some examples, the asset sensor data 430 includes information corresponding to a current or an instant flight segment of the asset. For example, the asset sensor data 430 can include information from an aircraft control system, the turbine engine controller 100 of FIG. 2, etc., indicating that the engine 102 of FIG. 1 is on-wing of an aircraft currently taking off, climbing, cruising, etc.

In the illustrated example, the collection engine 400 obtains the asset environmental data 432 to determine environmental conditions experienced by the engine 102. In some examples, the collection engine 400 obtains the asset environmental data 432 from the database 345 of FIG. 3. In some examples, the asset environmental data 432 includes a range of environmental condition parameters experienced by the engine 102. For example, the asset environmental data 432 can include a range of ambient temperatures (e.g., a range of 10-40 degrees Celsius, etc.), precipitation amounts, salt atmosphere percentages (e.g., a range of 5-55% salt atmosphere, etc.), a range of airborne particulate matter sizes (e.g., a size of a man-made airborne particulate matter, a size of a naturally occurring airborne particulate matter, etc.), humidity percentages (e.g., a range of 40-95% humidity, etc.), etc., experienced by the engine 102. In some examples, the asset environmental data 432 includes a duration of environmental condition parameters experienced by the engine 102. For example, the asset environmental data 432 can include an amount of time the engine 102 experienced a salt atmosphere of 30%, 40%, 50%, etc.

In the illustrated example of FIG. 4, the collection engine 400 obtains the operational/utilization data 434 to determine a usage of the engine 102. In some examples, the collection engine 400 obtains the operational/utilization data 434 from the database 345 of FIG. 3. In some examples, the operational/utilization data 434 includes a utilization plan of the engine 102. For example, the operational/utilization data 434 can include a number of cycles (e.g., flight cycles, operation cycles, etc.), a number of hours in operation, types of flight routes (e.g., flights from a first destination to a second destination, etc.), a number of flight legs (e.g., a number of hours from a first destination to a second destination, etc.), etc., completed by the engine 102. In some examples, the operational/utilization data 434 includes operating behavior of one or more assets by one or more airline operators. For example, the operational/utilization data 434 can include operating rating information corresponding to an operation of the engine 102 compared to a rated maximum capacity of the turbine engine. For example, the operational/utilization data 434 can include average takeoff de-rate information, average climb de-rate information, etc. In another example, the operational/utilization data 434 can include an average thrust parameter of the engine 102, a percentage indicating how often the engine 102 is at full power during one or more flight cycles, etc.

In the illustrated example of FIG. 4, the collection engine 400 obtains the asset configuration data 436 to determine a current or an instant configuration of the engine 102. In some examples, the collection engine 400 obtains the asset configuration data 436 from the database 345 of FIG. 3. In some examples, a physical and/or software configuration of the engine 102 can be updated, upgraded, etc., over time as maintenance is performed on the engine 102. For example, the engine 102 can be refurbished with new components, upgraded components, etc. In another example, software of the turbine engine controller 100 of the engine 102 can be upgraded to adjust or control a variable geometry of the engine 102 when in operation. In such examples, the asset configuration data 436 can include a current list of components in the engine 102, a current software version of the turbine engine controller 100, etc.

In the illustrated example of FIG. 4, the collection engine 400 obtains the asset class history data 438 to determine a baseline operation parameter, performance parameter, reliability parameter, etc., of an asset in response to upgrading a hardware and/or a software component of the asset. For example, an asset class can correspond to a fleet of substantially similar assets used to generate a baseline durability parameter or a baseline reliability parameter by analyzing durability parameters, reliability parameters, etc., for the fleet. For example, the engine 102 can belong to a first asset class corresponding to a first baseline durability parameter, a first baseline reliability parameter, etc.

In such an example, an upgrade in a hardware and/or a software component of the engine 102 can cause the engine 102 to correspond to a second asset class corresponding to a second baseline durability parameter, a second baseline reliability parameter, etc., where the second parameters can be an improvement compared to the first parameters. In some examples, the collection engine 400 obtains the asset class history data 438 to ensure that the performance model analyzer 405, the severity model analyzer 410, etc., uses the model inputs 335 based on the current asset class of the engine 102 compared to a previous asset class of the engine 102 (e.g., an asset class of the engine 102 prior to an upgrade, etc.).

In the illustrated example of FIG. 4, the collection engine 400 obtains the one or more workscope quantifiers 440 to determine an accuracy of AHQ generated by the asset health calculator 300, the task optimizer 310, and/or, more generally, the AWGS 220 of FIGS. 2-3. In some examples, the collection engine 400 obtains the workscope quantifiers 440 from the database 345 of FIG. 3. For example, the collection engine 400 can obtain a workscope quantifier of 10%, 20%, 30%, etc., calculated by the asset health calculator 300, the task optimizer 310, etc. For example, the WEC 315 can determine to update one or more parameters of the AWGS 220 based on the workscope quantifier. For example, the WEC 315 can update the model inputs 335 of FIG. 3 by updating (e.g., directing an updating, etc.) a historical data model 450, a physics-based model 452, a stochastic model 454, a hybrid model 456, etc., and/or a combination thereof to incorporate a latest version of information, parameter values, etc.

In the illustrated example of FIG. 4, the WEC 315 includes the performance model analyzer 405 to generate a performance model of an asset based on operator behavior corresponding to the asset. In some examples, the performance model analyzer 405 calculates asset parameters (e.g., operator-level assets, fleet-level assets, etc.) based on engine de-rate information (e.g., takeoff de-rate parameters, climb de-rate parameters, etc.) corresponding to one or more assets operated by an operator (e.g., an airline operator, a turbine engine operator, etc.). In some examples, the performance model analyzer 405 generates a reference model, compares asset information and/or operator behavior to the reference model, and calculate deviations from the reference model based on the comparison. In some examples, the performance model analyzer 405 generates recommendations to improve operator behavior corresponding to one or more assets based on determining the deviations from the reference model.

In some examples, the performance model analyzer 405 generates the reference model based on determining operator-level and fleet-level asset parameters. For example, an operator-level takeoff de-rate parameter can be a takeoff de-rate parameter (e.g., an average takeoff de-rate parameter, a median takeoff de-rate parameter, etc.) corresponding to a plurality or an entirety of assets operated by an operator. In another example, a fleet-level takeoff de-rate parameter can be a takeoff de-rate parameter (e.g., an average takeoff de-rate parameter, a median takeoff de-rate parameter, etc.) corresponding to a plurality or an entirety of assets operated by a plurality or an entirety of operators in a fleet maintained or serviced by a turbine engine maintenance provider.

In some examples, the performance model analyzer 405 generates the operator-level asset parameters and/or the fleet-level asset parameters by executing one or more models. For example, the performance model analyzer 405 can direct an execution of the historical data model 450, the physics-based model 452, etc., of FIG. 4 to generate the asset parameters (e.g., operator-level takeoff de-rate parameters, fleet-level climb de-rate parameters, etc.) based on the inputs 325 of FIGS. 3-4.

In some examples, the performance model analyzer 405 directs the historical data model 450 to generate operator-level and/or fleet-level takeoff de-rate parameters, climb de-rate parameters, etc., using historical information included in the database 345 of FIGS. 3-4 based on the inputs 325 of FIGS. 3-4. In some examples, the performance model analyzer 405 generates a regression reference model (e.g., a multi-variable regression reference model, etc.) using regression analysis (e.g., generating a linear regression model, an exponential regression model, etc.) based on the asset parameters generated by the historical data model 450.

In some examples, the performance model analyzer 405 generates the multi-variable regression reference model by selecting a first parameter of interest. For example, the performance model analyzer 405 can select a takeoff de-rate parameter to process where the takeoff de-rate parameter values are based on the information generated by the historical data model 450. The example performance model analyzer 405 can map the first parameter of interest to a plurality of parameters of interest using regression analysis to determine a correlation between the first parameter and one or more of the plurality of parameters. For example, the performance model analyzer 405 can generate regression parameters for the reference regression model such as an rsquare value and/or a mean of response value to determine a correlation between the first parameter and one or more of the plurality of parameters. For example, the performance model analyzer 405 can generate a multi-variable regression reference model based on determining a correlation between the takeoff de-rate parameter and an airport elevation, an ambient temperature, etc., to determine an effect of an airline operator behavior as a function of environmental or operational constraints, factors, parameters, etc.

In some examples, the performance model analyzer 405 directs the physics-based model 452 to generate operator-level and/or fleet-level engine de-rate parameters (e.g., takeoff de-rate parameters, climb de-rate parameters, etc.) based on executing a digital twin model of an asset using the inputs 325. In some examples, the performance model analyzer 405 generates the reference model by mapping the asset parameters to an engine performance characteristic such as an aircraft weight of an aircraft to which an asset is on-wing, an asset class, an asset configuration, etc. In some examples, the performance model analyzer 405 generates a physics-based reference model by mapping the asset parameters as a function of the engine performance characteristic based on the model inputs 335 from the physics-based model 452.

In some examples, the performance model analyzer 405 compares operator behavior to a reference model to calculate a difference and generate a recommendation for operator behavior improvement based on the difference. For example, the performance model analyzer 405 can calculate a difference between an operator-level takeoff de-rate parameter and a fleet-level takeoff de-rate parameter generated by the historical data model 450, the physics-based model 452, etc. In some examples, the performance model analyzer 405 generates a residual performance model to analyze differences between operator behavior of an individual operator compared to a fleet of operators to generate a recommendation for improvement. For example, the performance model analyzer 405 can determine that a first operator is better than an asset fleet average, worse than an asset fleet average, etc. In another example, the performance model analyzer 405 can identify a second operator as a candidate improvement target because the second operator is worse than the asset fleet average.

In some examples, the performance model analyzer 405 determines a recommendation to optimize and/or otherwise improve the operator behavior based on analyzing the performance model. In some examples, the performance model analyzer 405 generates a report including the recommendation. In some examples, the performance model analyzer 405 can identify one or more operators as candidate improvement targets for operator behavior improvement based on the performance model. For example, the performance model analyzer 405 can generate a recommendation for an operator to optimize and/or otherwise improve the behavior of the operator by recommending a change in a de-rate parameter, a taper schedule, a water-washing technique, etc., and/or a combination thereof based on analyzing a comparison of the operator behavior to the asset fleet. In some examples, the performance model analyzer 405 generates an alert dashboard (e.g., an alert dashboard in a report, an alert dashboard in a web-based software application, etc.) indicating areas of improvement for an operator to improve TOW and to reduce maintenance cost of an asset based on analyzing the performance model.

In the illustrated example of FIG. 4, the WEC 315 includes the severity model analyzer 410 to generate a severity model to estimate and/or otherwise predict asset health as a function of a severity factor (e.g., an environmental factor, an operator behavior factor, etc.). For example, a severity model can be a model based on mapping an effect of an environmental factor, an operator behavior, etc., on an AHQ of an asset to determine how severe, significant, etc., the effect of the environmental factor, the operator behavior, etc., has on the AHQ. In some examples, the severity model analyzer 410 generates an asset component level severity model. For example, the severity model analyzer 410 can generate a severity model that maps an effect of a severity factor on an AHQ such as TOW for an asset component such as a fan blade, a booster compressor, etc. In some examples, the severity model analyzer 410 generates a fleet-level severity model. For example, the severity model analyzer 410 can generate a severity model that maps a mean time to failure parameter to one or more asset components based on fleet-level asset parameters.

In some examples, the severity model analyzer 410 generates the severity model based on one or more environmental factors such as temperature (e.g., engine temperature, average ambient temperature, etc.), a time duration during which the asset operates at the temperature, an exposure to an airborne particulate matter, etc. For example, the severity model analyzer 410 can generate a severity model corresponding to the engine 102 that maps a quantity of TOW hours of the high-pressure turbine 120 of the engine 102 to a frequency of dusty departures experienced by the engine 102.

In some examples, the severity model analyzer 410 generates a severity model corresponding to an asset including one or more severity models corresponding to the asset. For example, the severity model analyzer 410 can map a severity factor such as takeoff thrust to an AHQ such as TOW of one or more asset components such as the fan section 108, the booster compressor 114, the high-pressure turbine 120, etc., of the engine 102. For example, the severity model analyzer 410 can map the takeoff thrust operator behavior for the one or more asset components to determine a sensitivity of the TOW of the asset components as a function of the takeoff thrust.

In some examples, the severity model analyzer 410 determines whether an AHQ of one or more asset components of an asset satisfies a threshold based on the mapping. In some examples, the severity model analyzer 410 determines whether an AHQ of an asset component satisfies an anticipated AHQ threshold. In some examples, the anticipated AHQ threshold corresponds to an anticipated AHQ as a function of a severity factor. For example, the severity model analyzer 410 can calculate an anticipated AHQ threshold value of 0.63 scaled TOW hours based on the asset component level severity model 900 of FIG. 9. For example, the severity model analyzer 410 can map a severity factor value of 0.5 corresponding to Asset Component C to approximately 0.63 scaled TOW hours (e.g., a number of TOW hours scaled to a range of 0-1, etc.) using the asset component level severity model 900 of FIG. 9.

In some examples, the severity model analyzer 410 determines that an actual AHQ of an asset satisfies the anticipated AHQ threshold based on the actual AHQ being greater than the anticipated AHQ threshold. For example, the severity model analyzer 410 can map a severity factor value of 0.375 currently or previously experienced by the Asset Component C of the engine 102 to the severity factor value of the asset component level severity model 900 of FIG. 9 to determine an anticipated TOW of the Asset Component C of approximately 0.63 scaled TOW hours. In such an example, the severity model analyzer 410 can compare the anticipated TOW of 0.63 scaled TOW hours to an example actual TOW of the Asset Component C of 0.6 scaled TOW hours. In such an example, the severity model analyzer 410 can determine that the actual TOW of the Asset Component C does not satisfy the anticipated AHQ threshold based on the actual TOW being less than the anticipated AHQ threshold.

In some examples, the severity model analyzer 410 determines that an AHQ difference satisfies an AHQ difference threshold. For example, the severity model analyzer 410 can determine an AHQ difference by calculating a difference between an actual AHQ and an anticipated AHQ. For example, the severity model analyzer 410 can calculate an AHQ difference of 0.1 scaled TOW hours by calculating a difference between an actual AHQ of 0.6 scaled TOW hours and an anticipated AHQ of 0.7 scaled TOW hours (e.g., 0.1 scaled TOW hours=0.7 scaled TOW hours−0.6 scaled TOW hours, etc.). For example, the severity model analyzer 410 can determine that an AHQ difference of 0.1 scaled TOW hours satisfies an AHQ difference threshold of 0.15 scaled TOW hours based on the AHQ difference being less than the AHQ difference threshold.

In response to determining that an AHQ satisfies an anticipated AHQ threshold, an AHQ difference satisfies an AHQ difference threshold, etc., the severity model analyzer 410 can identify the asset component as a candidate for maintenance. For example, the severity model analyzer 410 can estimate and/or otherwise predict that an asset component is a candidate for a maintenance operation based on the actual AHQ of the asset component being within a tolerance threshold of an anticipated AHQ of the asset component based on an environmental factor, an operator asset behavior, etc., and/or a combination thereof.

In some examples, the severity model analyzer 410 determines a recommendation to optimize and/or otherwise improve operator behavior corresponding to the asset based on analyzing the severity model. In some examples, the severity model analyzer 410 determines a workscope recommendation based on determining a sensitivity for each of the asset components and/or the asset. For example, the severity model analyzer 410 can generate a first recommendation to perform maintenance on the high-pressure turbine 120 at 25,000 TOW hours, a second recommendation to perform maintenance on the fan section 108 at 27,500 TOW hours, etc., based on the sensitivity of the high-pressure turbine 120, the fan section 108, etc., to an example severity factor value of 0.1. In some examples, the severity model analyzer 410 generates a report including the severity factor values, the actual AHQ, the anticipated AHQ threshold, the workscope recommendation to improve operator behavior, etc.

In the illustrated example of FIG. 4, the WEC 315 includes the workscope quantifier analyzer 415 to calculate an actual AHQ, a projected AHQ, etc., based on workscope results from an inspection (e.g., a visual inspection, a regularly scheduled inspection, etc.), a validation test (e.g., an operator acceptance test, a service validation test, etc.). In some examples, the WEC 315 deploys an automated imaging system to inspect the engine 102. For example, the WEC 315 can use an imaging system including one or more cameras (e.g., digital cameras, video cameras, etc.) to capture one or more images of an asset component of the engine 102. For example, the WEC 315 can use an object-recognition system (e.g., a machine-learning system, a deep-learning system, etc.) to compare an image of the booster compressor 114 to an image in an object-recognition database. The example WEC 315 can calculate an AHQ of the booster compressor 114 based on the comparison of the image of the booster compressor 114 to the image in the object-recognition database. In some examples, the WEC 315 performs an automated transfer of inspection or workscope results from a shop system to the database 345.

In some examples, the WEC 315 performs an automated validation test of the engine 102 in response to the workscope being completed on the engine 102. For example, the WEC 315 can (1) perform an exhaust gas-path temperature hot day margin (EGTHDM) test on the engine 102 after the workscope has been completed on the engine 102, (2) compare the EGTHDM test results to EGTHDM data corresponding to the engine 102 prior to the workscope being completed, and (3) calculate an AHQ based on the comparison. In such an example, the WEC 315 can transmit (e.g., automatically transmit, etc.) the results of the EGTHDM test to the database 345 to be used to improve one or more components of the AWGS 220.

In some examples, the workscope results are based on the outputs 355. For example, the workscope quantifier analyzer 415 can perform an inspection, a validation test, etc., based on the outputs 355 including a selected workscope to be performed including a set of tasks to be performed on the engine 102 and corresponding workscope information. In response to calculating a post-workscope AHQ (e.g., an actual AHQ, a projected AHQ, etc., of an asset after a workscope has been completed on the asset, etc.), the example workscope quantifier analyzer 415 can calculate a workscope quantifier by calculating a difference between the post-workscope AHQ and a pre-workscope AHQ, and compare the workscope quantifier to a workscope quantifier threshold.

In some examples, the workscope quantifier analyzer 415 generates an AHQ based on the workscope results by directing one or more models to calculate the AHQ based on the workscope results. For example, the workscope quantifier analyzer 415 can record the workscope results and transmit the workscope results to the database 345 of FIG. 3. The example workscope quantifier analyzer 415 can direct one or more of a historical data model 450, a physics-based model 452, a stochastic model 454, or a hybrid model 456 to use the workscope results from the database 345 to calculate an AHQ of the engine 102 of FIG. 1. In response to the one or more models 450, 452, 454, 456 being directed to use the results from the database 345, the one or more models 450, 452, 454, 456 can generate the model inputs 335. For example, the workscope quantifier analyzer 415 can obtain the model inputs 335 based on executing one or more of the historical data model 450, the physics-based model 452, the stochastic model 454, the hybrid model 456, etc., using the workscope results. In such an example, the workscope quantifier analyzer 415 can use the model inputs 335 that are the most restrictive or the workscope quantifier analyzer 415 can use an average of one or more of the model inputs 335 to generate an AHQ of an asset.

In some examples, the workscope quantifier analyzer 415 directs or uses the historical data model 450 to generate the model inputs 335. For example, the workscope quantifier analyzer 415 can use the historical data model 450 to generate the model inputs 335 prior to the engine 102 being returned to service. For example, the historical data model 450 can be a regression model or any other type of statistical model using asset monitoring information (e.g., historical asset monitoring information, etc.) based on the inputs 325, information stored in the database 345, the workscope results from the workscope quantifier analyzer 415, etc. For example, the historical data model 450 can generate the model inputs 335 by performing a statistical analysis on previous workscope operations.

In some examples, the historical data model 450 obtains information corresponding to assets similar in asset configuration, asset class, environment, utilization, etc., to the engine 102. For example, the historical data model 450 can generate metrics and quantifiers that can be applied to the engine 102. For example, the historical data model 450 can calculate a percentage of useful life remaining, a quantity of flight cycles remaining, a quantity of TOW hours remaining, etc., for the engine 102 based on how similar assets (e.g., assets with a substantially similar asset configuration, asset class history, etc.) have previously performed (e.g., previously performed after completing a similar workscope, etc.). For example, the historical data model 450 can be a regression model (e.g., a linear regression model, an exponential regression model, etc.) corresponding to a correlation or a relationship between an AHQ of the engine 102 such as a quantity of TOW hours and a severity factor, where the regression model is determined based on previously collected data on substantially similar turbine engines.

In some examples, the workscope quantifier analyzer 415 uses the physics-based model 452 to generate the model inputs 335 using the workscope results. For example, the physics-based model 452 of the engine 102 can include one or more vibration models, stress models, thermo-mechanical models, aero-thermal models, aero-mechanical models, etc., of one or more sensors, asset components, etc., of the engine 102. For example, the workscope quantifier analyzer 415 can use the physics-based model 452 to generate the model inputs 335 prior to the engine 102 being returned to service.

In some examples, the physics-based model 452 is a digital twin model of the engine 102. For example, the digital twin model can simulate physics behavior, a thermo-dynamic health, a performance health, etc., of the engine 102 using asset monitoring information based on the inputs 325, information stored in the database 345, the workscope results from the workscope quantifier analyzer 415, etc. For example, the physics-based model 452 can simulate inputs and outputs of the sensors 144, 146 of FIGS. 1-2 of the engine 102 to generate an AHQ based on the workscope results. For example, the physics-based model 452 can be a digital twin model of the engine 102 of FIG. 1 that can calculate an AHQ of the booster compressor 114 of FIG. 1 such as a quantity of TOW hours based on (1) a completed workscope on the booster compressor 114 (e.g., one or more components of the booster compressor 114 have been replaced, serviced, etc.) and (2) a severity factor. For example, the digital twin model can generate the AHQ with improved accuracy based on more accurately characterizing a health of the booster compressor 114 as a result of the completed workscope on the booster compressor 114.

In some examples, the physics-based model 452 can simulate an operability of the engine 102 (e.g., an efficiency of the engine 102, etc.), a durability of the engine 102 (e.g., a mechanical stress on the fan section 108, the booster compressor 114, etc.), etc., based on simulating the engine 102 executing one or more flight cycles, flight legs, flight operations, etc. Thus, by evaluating and extrapolating from the physics-based model 452, engine performance characteristics can be identified and evaluated, and behavior and other outcomes associated with the asset (e.g., the engine 102, etc.) can be modeled and predicted, for example. For example, the workscope quantifier analyzer 415 can extrapolate the model inputs 335 of FIG. 3 obtained from the physics-based model 452 to forecast and/or otherwise predict future issues likely to arise corresponding to the engine 102 because of the characteristics of the engine 102, a utilization of the engine 102, an operating environment of the engine 102, etc., after a completion of the workscope.

For example, the physics-based model 452 can be a digital twin model of the engine 102 of FIG. 1 that can calculate a forecast or a predictive AHQ of the booster compressor 114 of FIG. 1 such as a quantity of TOW hours based on (1) a completed workscope on the booster compressor 114 (e.g., one or more components of the booster compressor 114 have been replaced, serviced, etc.) and (2) an environmental factor such as an airborne particulate matter size. For example, the physics-based model 452 can generate a predictive quantity of TOW hours for the recently serviced booster compressor 114 based on an upcoming schedule of flight cycles in an environment with an airborne particulate matter size of 0.1 micrometers, an average ambient temperature of 30 degrees Celsius, etc., and/or a combination thereof. By determining the predictive quantity of TOW hours based on an effect of a forecast utilization or environmental plan on the degradation of the booster compressor 114, the workscope quantifier analyzer 415 can generate a recommended workscope including the next maintenance operation of the booster compressor 114 as the number of actual TOW hours approaches the predictive quantity of TOW hours.

In some examples, the workscope quantifier analyzer 415 uses the stochastic model 454 to generate metrics based on estimating probability distributions of potential outcomes by allowing for random variation in one or more inputs over time. For example, the workscope quantifier analyzer 415 can use the stochastic model 454 to generate the model inputs 335 prior to the engine 102 being returned to service. In some examples, the stochastic model 454 generates the random variation based on fluctuations observed in historical data (e.g., the model inputs 335 based on the historical data model 450, etc.), the asset monitoring information based on the inputs 325, the workscope results from the workscope quantifier analyzer 415, etc., for a selected time period using time-series techniques. For example, the stochastic model 454 can calibrate the random variation to be within limits set forth by the outputs from the historical data model 450. In some examples, the stochastic model 454 includes generating continuous probability distributions (e.g., Weibull distributions, reliability curves, etc.) to determine a distribution of failure rates over time due to one or more asset components. For example, the stochastic model 454 can generate a failure rate of the engine 102 based on determining failure rates for the fan section 108, the booster compressor 114, etc., of the engine 102.

For example, the stochastic model 454 can be a Weibull distribution corresponding to the engine 102 of FIG. 1 that can calculate an unreliability value or a failure rate as a function of time for the fan section 108, the booster compressor 114, the combustor 118, etc. For example, the stochastic model 454 can map an instant TOW of the combustor 118 to the Weibull distribution to generate a predictive failure rate at the instant TOW. By determining the predictive failure rate at the instant TOW of the combustor 118, the workscope quantifier analyzer 415 can generate a recommended workscope including the next maintenance operation of the combustor 118 as the failure rate increases as the instant TOW increases.

In some examples, the workscope quantifier analyzer 415 uses the hybrid model 456 to generate the model inputs 335 using one or more of the historical data model 450, the physics-based model 452, and the stochastic model 454 of FIG. 4 based on the workscope results. For example, the workscope quantifier analyzer 415 can use the hybrid model 456 to generate the model inputs 335 prior to the engine 102 being returned to service. For example, the hybrid model 456 can be the stochastic model 454 in which the outputs from the stochastic model 454 are compared to the physics-based model 452 and the outputs are adjusted based on the comparison. In another example, the hybrid model 456 can be the stochastic model 454 in which the outputs from the stochastic model 454 can be compared to the historical data model 450 and the outputs are adjusted or calibrated based on the comparison.

In some examples, the workscope quantifier analyzer 415 calculates an actual AHQ of an asset component based on actual AHQ of sub-components of the asset component prior to the engine 102 being returned to service. For example, the workscope quantifier analyzer 415 can calculate an actual AHQ for the fan section 108 of FIG. 1 based on calculating an actual AHQ for sub-components of the fan section 108 based on the model inputs 335. For example, the workscope quantifier analyzer 415 can calculate an actual AHQ of sub-components such as a fan blade, a bearing, a speed sensor, etc., of the fan section 108 by executing the physics-based model 452 of the engine 102. In such an example, the workscope quantifier analyzer 415 can generate an actual AHQ of the fan section 108 based on calculating an average (e.g., a weighted average, etc.) of the actual AHQ of the fan blade, the bearing, the speed sensor, etc., of the fan section 108. In some examples, the workscope quantifier analyzer 415 can rank the actual AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the workscope quantifier analyzer 415 calculates projected AHQ based on the model inputs 335. In some examples, the projected AHQ represents what an actual AHQ of an asset component can be based on forecast operating conditions. For example, the workscope quantifier analyzer 415 can calculate a projected AHQ for the booster compressor 114 of FIG. 1 based on an actual AHQ for the booster compressor 114 and generating the model inputs 335 based on a forecast utilization and environment plan obtained from the database 345. In some examples, the forecast utilization and environment plan corresponds to future utilization (e.g., a number of flight cycles, flight legs, operation hours, etc.) and environmental parameters (e.g., an ambient temperature range of 25-40 degrees Celsius, a salt atmosphere percentage range of 15-35%, etc.) to be endured by the engine 102 in future operations.

For example, the workscope quantifier analyzer 415 can calculate the projected AHQ of the booster compressor 114 by calculating a change in the actual AHQ over time based on the forecast utilization and environment plan. For example, the workscope quantifier analyzer 415 can calculate a projected AHQ of 30% useful life remaining for the booster compressor 114 based on (1) an actual AHQ of 70% useful life remaining of the booster compressor 114 and (2) executing one or more of the models 450, 452, 454, 456 for an additional 500 flight cycles in a geographic region in which ambient temperatures range from 25-40 degrees Celsius and salt atmosphere percentages range of 15-35%. For example, the workscope quantifier analyzer 415 can input the above-described parameters into the TOW severity model generation system 800 of FIG. 8A to calculate an estimated AHQ of useful life remaining as a result of the engine 102 executing the additional 500 flight cycles.

In some examples, the workscope quantifier analyzer 415 calculates a projected AHQ of an asset component based on a projected AHQ of sub-components of the asset component. For example, the workscope quantifier analyzer 415 can calculate a projected AHQ for the fan section 108 of FIG. 1 based on calculating a projected AHQ for sub-components of the fan section 108 based on the model inputs 335. For example, the workscope quantifier analyzer 415 can calculate a projected AHQ of sub-components such as a fan blade, a bearing, a speed sensor, etc., of the fan section 108 by executing the physics-based model 452 of the engine 102. In such an example, the workscope quantifier analyzer 415 can generate a projected AHQ of the fan section 108 based on calculating an average (e.g., a weighted average, etc.) of the projected AHQ of the fan blade, the bearing, the speed sensor, etc., of the fan section 108. In some examples, the workscope quantifier analyzer 415 can rank the projected AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the workscope quantifier analyzer 415 calculates the workscope quantifier by calculating a difference between the post-workscope AHQ and the pre-workscope AHQ, and compares the workscope quantifier to the workscope quantifier threshold. In some examples, the pre-workscope AHQ is an estimate AHQ of an asset based on estimating what the AHQ for the asset can be in response to performing a specified workscope on the asset. By comparing a post-workscope AHQ of the engine 102 to the pre-workscope AHQ of the engine 102, the example workscope quantifier analyzer 415 can evaluate an accuracy or an efficiency of the AWGS 220 in improving an operating condition of the engine 102. For example, the workscope quantifier analyzer 415 can compare (1) an estimate AHQ of 95% useful life remaining of the engine 102 based on a prediction of the asset health after completing a workscope to (2) an actual AHQ of 80% useful life remaining after the workscope has been completed on the engine 102. For example, the workscope quantifier analyzer 415 can determine that a significantly large difference (e.g., 10%, 25%, 40%, etc.) between the estimate AHQ and the actual AHQ represents that one or more components of the AWGS 220 of FIGS. 2-3 can be improved to generate more accurate estimate AHQ.

In some examples, the workscope quantifier analyzer 415 calculates the workscope quantifier based on comparing the post-workscope AHQ to the pre-workscope AHQ. In some examples, the workscope quantifier corresponds to a measure of how accurate an estimation, a prediction, etc., capability of the AWGS 220 is in determining how completing a workscope affects a health, an operating condition, etc., of an asset. For example, the workscope quantifier analyzer 415 can calculate a workscope quantifier of 15% by calculating a difference between the estimate AHQ of 95% useful life remaining and the actual AHQ of 80% useful life remaining (e.g., 15%=95%−80%, etc.).

In some examples, the workscope quantifier analyzer 415 compares a workscope quantifier to a workscope quantifier threshold and determines whether the workscope quantifier threshold has been satisfied based on the comparison. In some examples, the workscope quantifier threshold corresponds to whether the AWGS 220 is generating one or more AHQ of the asset that track an actual health, a projected health, etc., of the asset within a tolerance (e.g., within 1%, 5%, 10%, etc., of the actual health, the projected health, etc.). For example, the workscope quantifier analyzer 415 can compare the workscope quantifier of 15% to a workscope quantifier threshold of 10% and determine that the workscope quantifier threshold has been satisfied based on the workscope quantifier being greater than the workscope quantifier threshold. For example, the workscope quantifier analyzer 415 can determine that the AWGS 220 is not calculating one or more AHQ that tracks the actual health, the projected health, etc., of an asset within a tolerance.

In the illustrated example of FIG. 4, the WEC 315 includes the system updater 420 to determine whether to optimize, update, and/or otherwise improve the AWGS 220 based on the operator behavior, a workscope quantifier, etc. In some examples, the system updater 420 can direct the AWGS 220 of FIGS. 2-3 to modify one or more components of the AWGS 220 to optimize and/or otherwise improve workscope recommendations based on the operator behavior.

In some examples, the system updater 420 directs the AWGS 220 to update based on the operator behavior. For example, the system updater 420 can direct the AWGS 220 to update or modify the one or more models 450, 452, 454, 456, update one or more parameters corresponding to a maintenance task included in the task information 350 of FIG. 3 to be used by the task generator 305 of FIG. 3, improve an optimization parameter to be used by the task optimizer 310 for evaluating generated workscopes, etc., and/or a combination thereof to meet a current operator behavior (e.g., an instant operator behavior, an observed operator behavior, etc.), a forecasted operator behavior, etc. For example, the system updater 420 can direct the AWGS 220 to update the physics-based model 452 to be based on a takeoff de-rate parameter used by the operator. In such an example, the AWGS 220 can generate AHQ of assets owned by the operator based on the takeoff de-rate parameter used by the operator to generate improved workscope recommendations for the assets.

In some examples, the system updater 420 directs the AWGS 220 to updated based on comparing a workscope quantifier to a workscope quantifier threshold. For example, the system updater 420 can be used to optimize and/or otherwise improve a predictability of turbine engine maintenance management recommendations of the AWGS 220 based on determining whether the workscope quantifier threshold has been satisfied. For example, in response to determining that the workscope quantifier has been satisfied, the system updater 420 can direct the AWGS 220 to update or modify the one or more models 450, 452, 454, 456, update one or more parameters corresponding to a maintenance task included in the task information 350 of FIG. 3 to be used by the task generator 305 of FIG. 3, improve an optimization parameter to be used by the task optimizer 310 for evaluating generated workscopes, etc., and/or a combination thereof.

While an example implementation of the WEC 315 of FIG. 3 is illustrated in FIG. 4, one or more of the elements, processes and/or devices illustrated in FIG. 4 may be combined, divided, re-arranged, omitted, eliminated and/or implemented in any other way. Further, the example collection engine 400, the example performance model analyzer 405, the example severity model analyzer 410, the example workscope quantifier analyzer 415, the example system updater 420, and/or, more generally, the example WEC 315 of FIG. 3 may be implemented by hardware, software, firmware and/or any combination of hardware, software and/or firmware. Thus, for example, any of the example collection engine 400, the example performance model analyzer 405, the example severity model analyzer 410, the example workscope quantifier analyzer 415, the example system updater 420, and/or, more generally, the example WEC 315 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 400, the example performance model analyzer 405, the example severity model analyzer 410, the example workscope quantifier analyzer 415, and/or the example system updater 420 is/are hereby expressly defined to include a non-transitory computer readable storage device or storage disk such as a memory, a digital versatile disk (DVD), a compact disk (CD), a Blu-ray disk, etc. including the software and/or firmware. Further still, the example WEC 315 of FIG. 3 may include one or more elements, processes and/or devices in addition to, or instead of, those illustrated in FIG. 4, and/or may include more than one of any or all of the illustrated elements, processes and devices.

Figure 5:
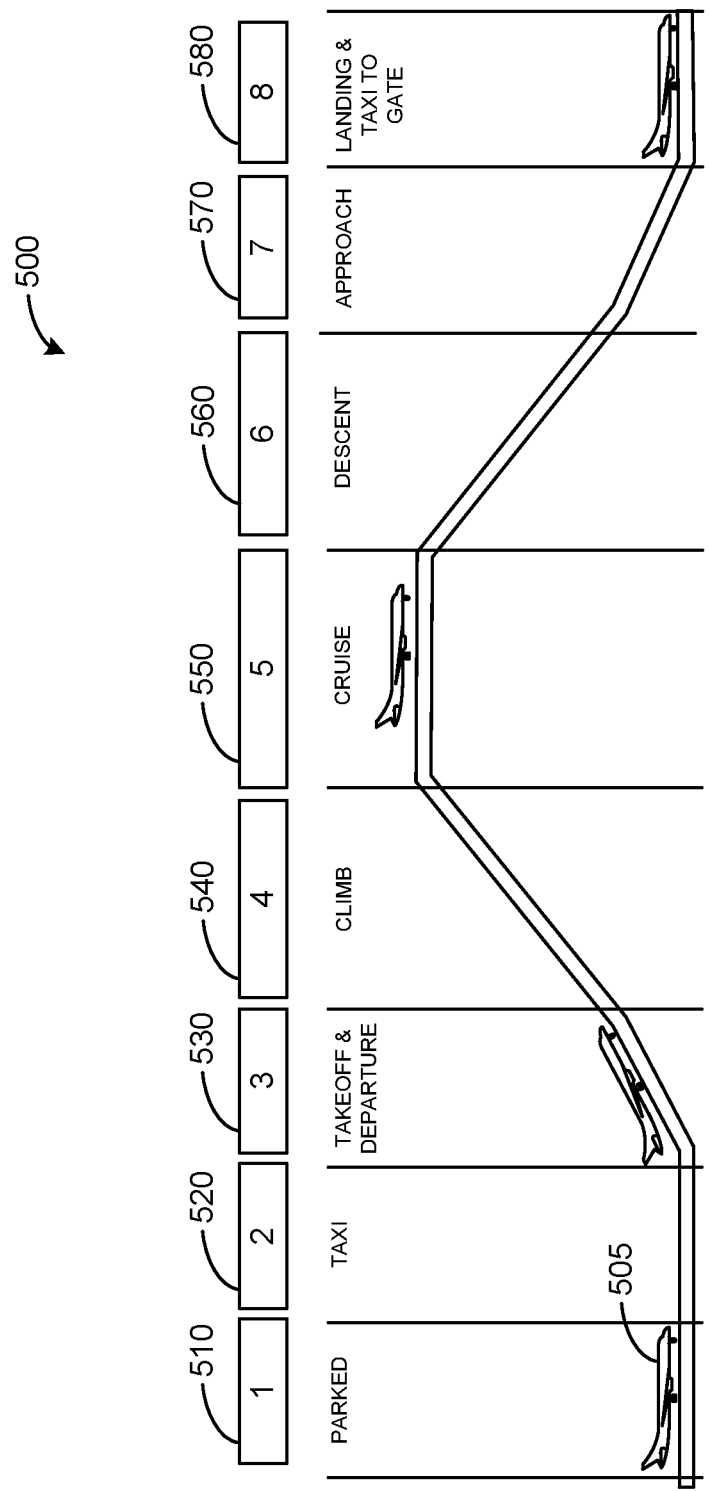
FIG. 5 is a schematic illustration of example flight segments in which the turbine engine of FIG. 1 can be used.

FIG. 5 is a schematic illustration of example flight segments of a flight route 500 in which the turbine engine 102 of FIG. 1 can be used. In the illustrated example, the engine 102 can be coupled to an aircraft 505. The flight route 500 of the illustrated example includes a parked flight segment 510, a taxi flight segment 520, a takeoff and departure flight segment 530, a climb flight segment 540, a cruise flight segment 550, a descent flight segment 560, an approach flight segment 570, and a landing and taxi to gate flight segment 580. Alternatively, there may be fewer or more flight segments in the flight route 500.

In the example flight route 500, the engine 102 can be de-rated during one or more of the flight segments. For example, the engine 102 can be de-rated from a rated maximum capacity when the aircraft 505 is in the takeoff and departure flight segment 530 to conserve fuel, to improve TOW, and to reduce maintenance costs. For example, the engine 102 can be operated using a takeoff de-rate of 25% during the takeoff and departure flight segment 530. In another example, the engine 102 can be operated at the rated maximum capacity when the aircraft 505 is in the takeoff and departure flight segment 530. For example, the engine 102 can be operated using a takeoff de-rate of 0% to reduce the time to get to the cruise flight segment 550.

In some examples, the engine 102 is operated using a takeoff de-rate of 0% during long-haul flights because de-rating the engine 102 during the cruise flight segment 550 can generate greater benefits (e.g., improved fuel consumption, reduced maintenance costs, prolonged engine health, etc.) than drawbacks of not de-rating the engine 102 during the takeoff and departure flight segment 530. For example, efficiently operating the engine 102 (e.g., using a de-rate parameter of 25%, 40%, etc.) during the cruise flight segment 550 for a relatively long period of time (e.g., a long-haul international flight, etc.) can outweigh the drawbacks of inefficiently operating the engine 102 (e.g., using a de-rate parameter of 0%, etc.) during the takeoff and departure flight segment 530 for a relatively short period of time.

FIG. 6A is a schematic illustration of an example performance reference model 600. The performance reference model 600 of the illustrated example includes statistical information corresponding to a fleet of operators including operators A, B, C, D, and E operating turbine engines such as the engine 102 of FIG. 1. For example, the performance model analyzer 405 can direct the historical data model 450 of FIG. 4 to generate the performance reference model 600 by determining an operator behavior parameter such as engine de-rate as a function of an engine performance characteristic (e.g., a characteristic that impacts a performance, an operation, etc., of a turbine engine) such as aircraft weight. In the illustrated example, an x-axis 602 of the performance reference model 600 corresponds to aircraft weight values scaled from zero to one. In the illustrated example, a y-axis 604 of the performance reference model 600 corresponds to engine de-rate values scaled from zero to one. Alternatively, the x-axis 602 and/or the y-axis 604 may be scaled using any other range of values. The example performance model analyzer 405 can direct the historical data model 450 to generate the performance reference model 600 by mapping the historical data engine de-rate parameters to aircraft weight for operators A, B, C, D, and E.

In the illustrated example of FIG. 6A, the performance model analyzer 405 can generate fleet behavior parameters 606 corresponding to an average of historical data de-rate parameters for the operators A, B, C, D, and E as a function of aircraft weight. Alternatively, the example performance model analyzer 405 can generate fleet behavior parameters 606 corresponding to a median, a weighted average, etc., of historical data de-rate parameters for the operators A, B, C, D, and E as a function of aircraft weight.

In the illustrated example of FIG. 6A, the performance model analyzer 405 generates a physics-based performance reference model 608 (long dashed-lines). For example, the performance model analyzer 405 can generate the physics-based performance reference model 608 by directing the physics-based model 452 of FIG. 4 to simulate a de-rate parameter as a function of aircraft weight by executing a digital twin model of the asset. In such an example, the performance model analyzer 405 can direct the physics-based model 452 to hold one or more severity factors constant (e.g., a fixed aircraft weight, a fixed airport elevation, a fixed airborne particulate matter exposure, a fixed airport contamination, one or more fixed weather conditions, etc.). In some examples, the physics-based performance reference model 608 corresponds to a baseline, an optimal, a turbine engine manufacturer specified, etc., engine de-rate operator behavior as a function of aircraft weight. In some examples, the performance model analyzer 405 calculates a difference between the performance reference model 600 based on historical information and the physics-based performance reference model 608 to determine whether an operator is performing better or worse than the physics-based performance model 608.

Figure 6B:
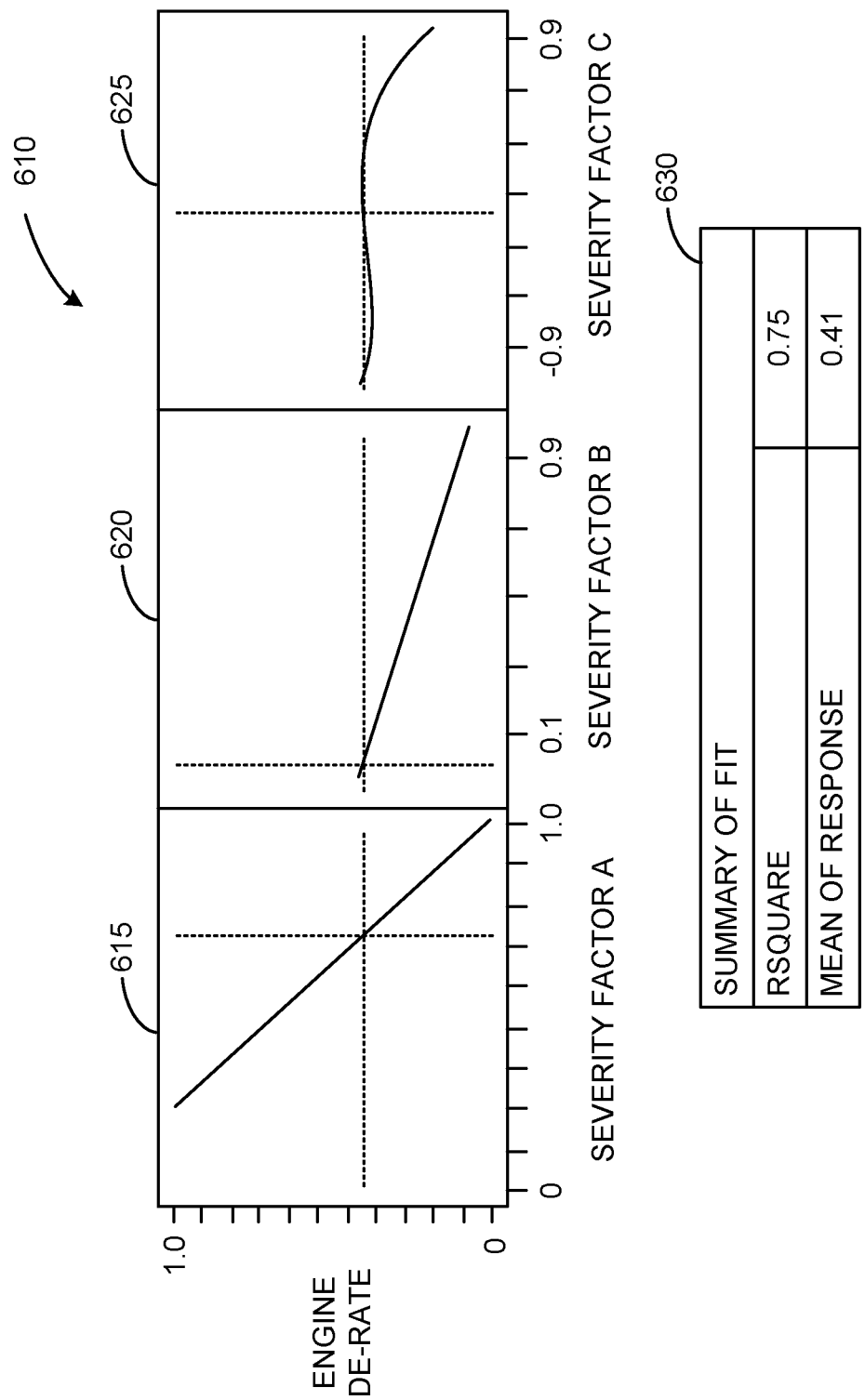
FIG. 6B is a schematic illustration of an example regression reference model corresponding to an operator behavior as a function of a first example severity factor, a second example severity factor, and a third example severity factor.

FIG. 6B is a schematic illustration of an example regression reference model 610 corresponding to an operator behavior such as engine de-rate (e.g., takeoff de-rate, land-based turbine engine de-rate, etc.) as a function of a first example severity factor A, a second example severity factor B, and a third example severity factor C. In the illustrated example of FIG. 6B, the regression reference model 610 is a multi-variable regression model that includes statistical information corresponding to a fleet of operators operating turbine engines such as the engine 102 of FIG. 1. In the illustrated example of FIG. 6B, the performance model analyzer 405 generates the regression reference model 610 using historical data. For example, the performance model analyzer 405 can direct the historical data model 450 to generate the regression reference model 610 based on or in response to the collection engine 400 obtaining engine de-rate behavior from the fleet of operators operating turbine engines. In response to generating the example regression reference models 610, the example performance model analyzer 405 can use the regression reference model 610 to analyze engine de-rate behavior of an operator when the operator experiences or is subject to one or more severity factors.

In the illustrated example of FIG. 6B, the regression reference model 610 includes a first mapping 615 of engine de-rate behavior to severity factor A. For example, the first mapping 615 can include a mapping of engine de-rate behavior of the engine 102 to a severity factor such as an aircraft weight of an aircraft to which the engine 102 is installed, an airport elevation, an ambient temperature, etc., based on historical information. In the illustrated example of FIG. 6B, the regression reference model 610 includes a second mapping 620 of engine de-rate behavior to severity factor B. For example, the second mapping 620 can include a mapping of engine de-rate behavior of the engine 102 to a severity factor such as an aircraft weight, an airport elevation, an ambient temperature, etc. In the illustrated example of FIG. 6B, the regression reference model 610 includes a third mapping 625 of engine de-rate behavior to severity factor C. For example, the third mapping 625 can include a mapping of engine de-rate behavior of the engine 102 to a severity factor such as an aircraft weight, an airport elevation, an ambient temperature, etc.

In the illustrated example of FIG. 6B, the regression reference model 610 can be characterized or represented by an example summary of fit table 630. For example, the performance model analyzer 405 can determine to use the regression reference model 610 based on the fit of the data in first through the third mappings 615, 620, 625 to the regression reference model 605. For example, the performance model analyzer 405 can determine to use the regression reference model 605 when the rsquare value is greater than an rsquare value threshold. For example, the summary of fit table 630 can correspond to the first mapping 615. For example, the rsquare value of 0.75 can represent that 75% of the variation in the engine de-rate values included in the first mapping 615 can be represented by the regression reference model 610. In another example, the mean of response value of 0.41 can represent the mean engine de-rate parameter value of the first mapping 615.

Figure 6C:
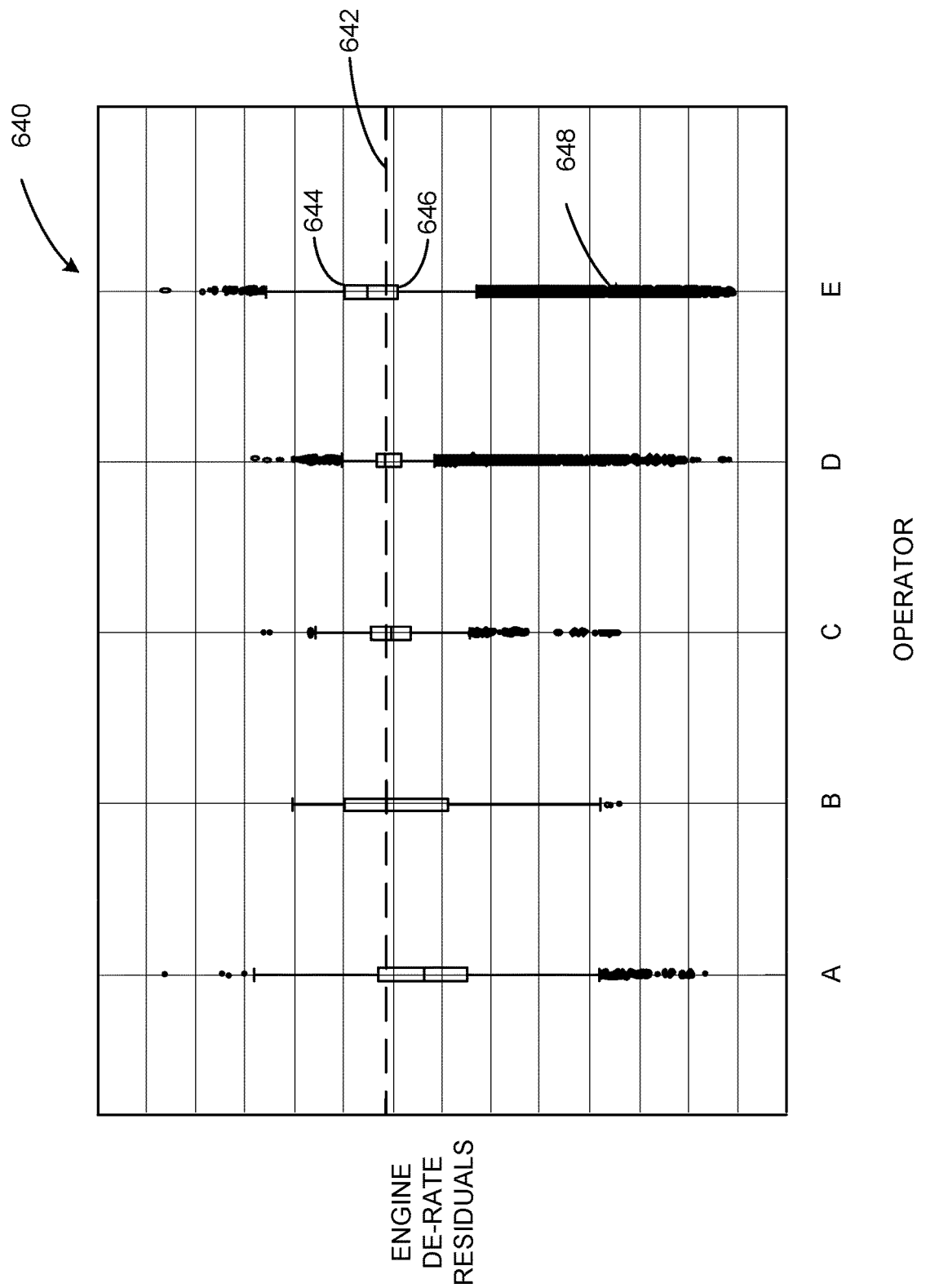
FIG. 6C is a schematic illustration of an example residual model that is used to identify opportunities to improve operator behavior.

FIG. 6C is a schematic illustration of an example residual performance model 640. In some examples, the performance model analyzer 405 generates the residual performance model 640 by comparing the actual, the instant, etc., operator behavior parameters of the operators A, B, C, D, and E to a fleet behavior parameter in a reference model. In the illustrated example of FIG. 6C, the performance model analyzer 405 generates the residual performance model 640 by calculating a difference between the actual engine de-rate operator behavior parameter of the operators A, B, C, D, and E and de-rate operator behavior corresponding to the physics-based performance reference model 608 in the performance reference model 600 of FIG. 6A. Alternatively, the example performance model analyzer 405 can generate the residual performance model 640 by calculating a difference between the actual engine de-rate operator behavior parameter of the operators A, B, C, D, and E and the fleet engine de-rate operator behavior parameter in the regression reference model 610 of FIG. 6B for the fleet of operators that includes the operators A, B, C, D, and E.

In the illustrated example of FIG. 6C, the performance model analyzer 405 calculates a baseline value 642 (solid-dashed line) based on determining a mean difference, a median difference, etc., between an actual operator behavior parameter value and a reference operator behavior parameter value. For example, the baseline value 642 can correspond to a median difference between an actual fleet engine de-rate behavior and the fleet engine de-rate behavior included in the regression reference model 610 of FIG. 6B. In the illustrated example of FIG. 6C, the performance model analyzer 405 determines a 75% median value 644 and a 25% median value 646. For example, the 75% median value 644 can correspond to a top 25% of assets operated by an operator where the corresponding operator behavior is above the baseline value 642. In another example, the 25% median value 646 can correspond to a bottom 25% of assets operated by an operator where the corresponding operator behavior is below the baseline value 642.

In the illustrated example of FIG. 6C, the performance model analyzer 405 generates recommendations to improve an engine de-rate behavior of an operator by analyzing the comparison between the actual engine de-rate operator behavior parameter and the reference engine de-rate operator behavior parameter. For example, the performance model analyzer 405 can determine an adjusted operator behavior parameter for an operator when the operator is identified as a candidate improvement target. For example, operator E includes underperforming assets 648 below the baseline value 642 (e.g., below the fleet average, etc.). For example, the performance model analyzer 405 can generate a recommendation to operator E to adjust an operator behavior parameter (e.g., to use an adjusted operator behavior parameter, etc.) such as a engine de-rate operator behavior parameter, a climb de-rate operator behavior parameter, a turbine engine taper schedule, etc., used by the operator E to improve the performance of the underperforming assets 648 and decrease a difference between the operator E behavior and the operator fleet including the operators A, B, C, D, and E.

Figure 6D:
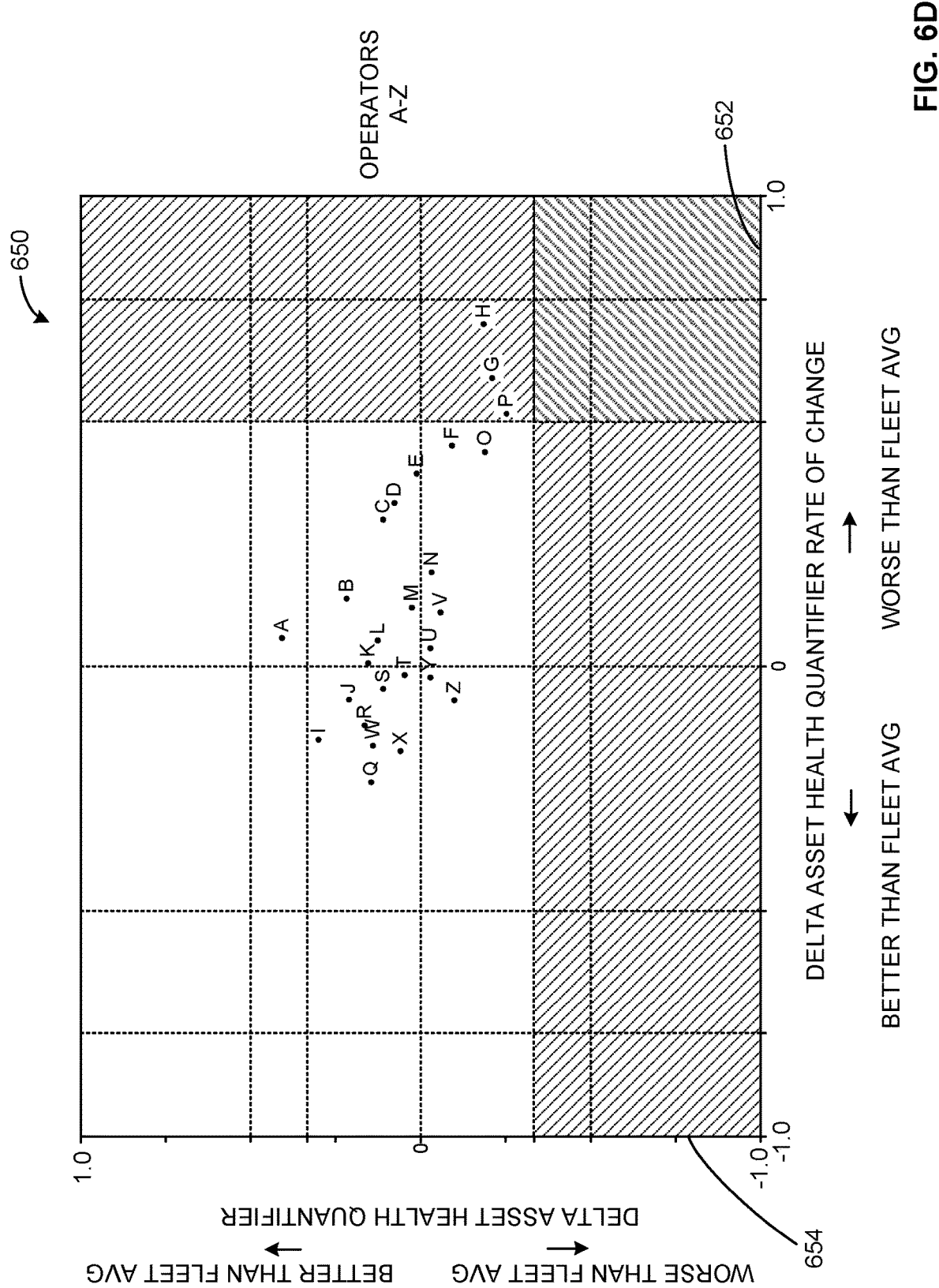
FIG. 6D is a schematic illustration of an example asset health quantifier (AHQ) performance model.

FIG. 6D is a schematic illustration of an example asset health quantifier (AHQ) performance model 650 including statistical information corresponding to a fleet of operators including operators A-Z operating turbine engines such as the engine 102 of FIG. 1. In the illustrated example of FIG. 6D, the AHQ performance model 650 maps a delta asset health quantifier value to a delta asset health quantifier rate of change value. In the illustrated example of FIG. 6D, an x-axis 652 of the AHQ performance model 650 corresponds to delta AHQ rate of change values scaled from zero to one. For example, the delta AHQ rate of change value can correspond to a change of an AHQ over time. In the illustrated example, a y-axis 654 of the AHQ performance model 650 corresponds to delta AHQ values scaled from zero to one. Alternatively, the x-axis 652 and/or the y-axis 654 may be scaled using any other range of values.

For example, the delta asset health quantifier rate of change value represented by the x-axis 652 can correspond to a difference between (1) an exhaust gas-path temperature hot day margin (EGTHDM) rate of change value (e.g., a mean EGTHDM rate of change value, a median EGTHDM rate of change value, etc.) for an operator and (2) a fleet-level EGTHDM rate of change value (e.g., a mean fleet-level EGTHDM rate of change value, a median fleet-level EGTHDM rate of change value, etc.) based on the performance reference model 600 of FIG. 6A, the regression reference model 610 of FIG. 6B, etc. In another example, the delta asset health quantifier value can correspond to a difference between (1) an EGTHDM value (e.g., a mean EGTHDM value, a median EGTHDM value, etc.) for an operator and (2) a fleet-level EGTHDM value (e.g., a mean fleet-level EGTHDM value, a median fleet-level EGTHDM value, etc.) based on the performance reference model 600 of FIG. 6A, the regression reference model 610 of FIG. 6B, etc.

In the illustrated example of FIG. 6D, the performance model analyzer 405 can use the AHQ performance model 650 to generate a recommendation to optimize and/or otherwise improve an operator behavior corresponding to operating an asset of the operator. In the illustrated example of FIG. 6D, the performance model analyzer 405 can determine that operators G, H, and P are using asset behaviors that are detrimental to an AHQ (e.g., an EGTHDM AHQ, etc.) of assets owned by the operators G, H, and P. For example, the performance model analyzer 405 can identify the operators G, H, and P as candidate improvement targets based on the AHQ performance model 650. For example, the performance model analyzer 405 can determine that the operator P has a worse than fleet average AHQ rate of change value based on the AHQ rate of change values of assets owned by operator P being approximately more than 0.5 delta away from the fleet average. In another example, the performance model analyzer 405 can determine that the operator P has a worse than fleet average AHQ based on the AHQ of the assets owned by operator P being approximately more than 0.25 delta away from the fleet average. Alternatively, the example performance model analyzer 405 can determine that the operator A has a better than fleet average AHQ, operator Q has a better than fleet average AHQ rate of change value, etc.

Figure 7:
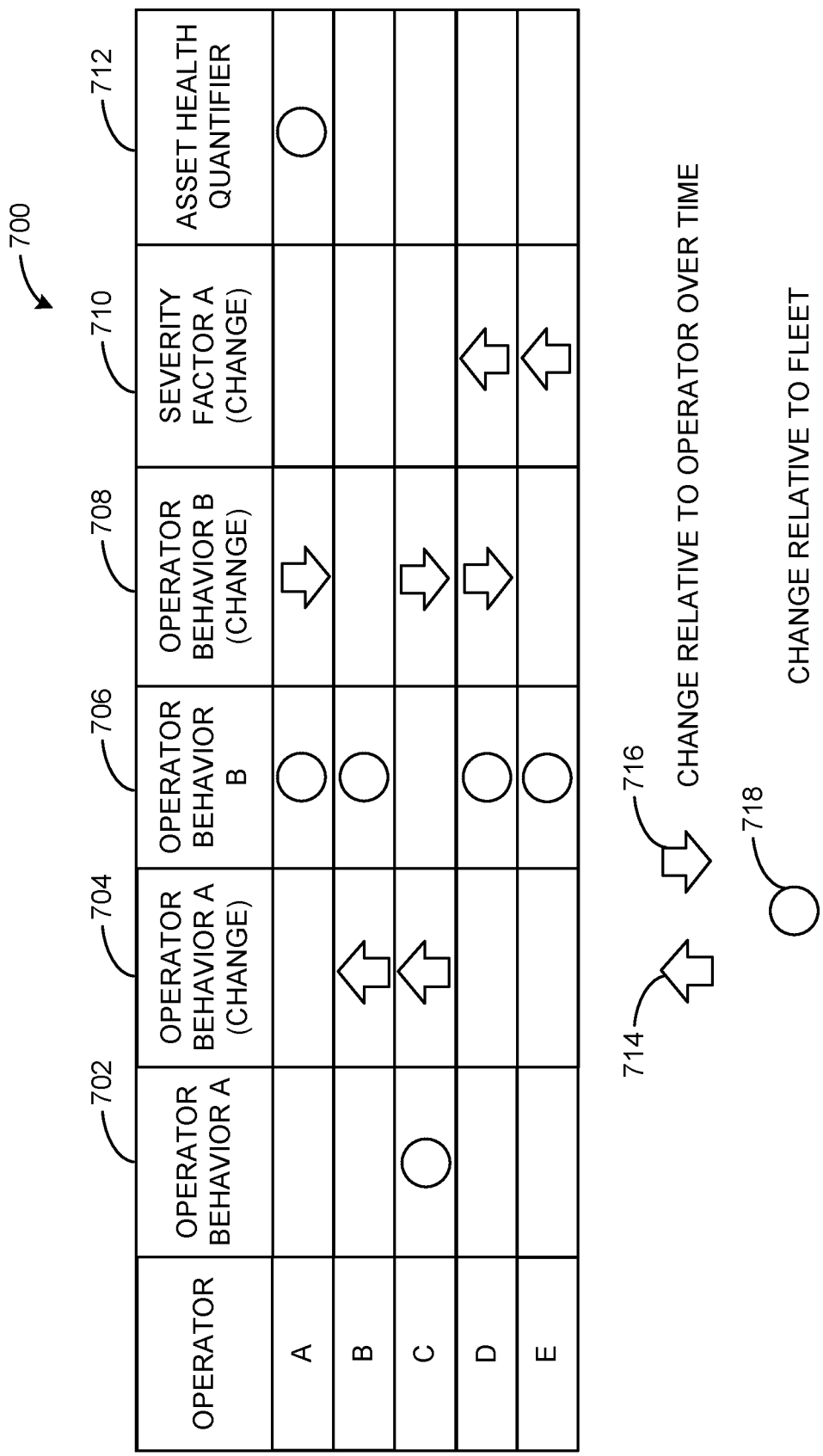
FIG. 7 is an example alert dashboard including recommendations to optimize and/or otherwise improve operator asset behavior.

FIG. 7 is an example alert dashboard 700 including recommendations to optimize and/or otherwise improve operator asset behavior. The example alert dashboard 700 represents a snapshot of potential actions for one or more operators in a fleet of operators. The example alert dashboard 700 represents a fleet management tool based on determined information from one or more performance models. For example, the performance model analyzer 405 can generate the alert dashboard 700. In the illustrated example of FIG. 7, the performance model analyzer 405 can use the alert dashboard 700 to generate recommendations for a fleet of operators including operators A-E based on changes corresponding to operator behavior A 702, operator behavior A (change) 704, operator behavior B 706, operator behavior B (change) 708, severity factor A (change) 710, and asset health quantifier 712. Alternatively, there may be fewer or more operators, operator behaviors, severity factors, and/or asset health quantifiers than depicted in FIG. 7.

In the illustrated example of FIG. 7, the performance model analyzer 405 can use an up-arrow symbol 714 or a down-arrow symbol 716 to represent an identification of a change in a condition corresponding to an operator relative to the operator over time. In the illustrated example of FIG. 7, the performance model analyzer 405 assigns the up-arrow symbol 714 to operator B in the operator behavior A (change) 704 column to identify that operator B has improved corresponding to operator behavior A at a first time period compared to a second time period, where the first time period is after the second time period. For example, the up-arrow 714 can correspond to operator B improving over time corresponding to operator behavior A.

In the illustrated example of FIG. 7, the performance model analyzer 405 can use a circle symbol 718 to represent an identification of a sub-optimal condition corresponding to an operator compared with the fleet of operators. In the illustrated example of FIG. 7, the performance model analyzer 405 assigns the circle symbol 718 to operator C to identify that operator C has a worse than fleet average value corresponding to operator behavior A 702. In some examples, the performance model analyzer 405 assigns the circle symbol 718 to an operator to identify the operator as a candidate improvement target in response to comparing an operator behavior parameter (e.g., the operator behavior A 702, the operator behavior B 706, etc.) of the operator to the fleet of operators. In some examples, the performance model analyzer 405 uses the circle symbol 718 to represent actions that can be triggered corresponding to an operator such as generating a recommendation, a report, adjusting or generating a workscope, etc., based on identifying the operator as a candidate improvement target.

In the illustrated example of FIG. 7, operator behavior A 702 can correspond to an operator behavior such as a percentage of climb overrides. For example, the performance model analyzer 405 can analyze the percentage of climb overrides to identify which operators can benefit from reducing climb de-rate overrides based on obtained asset monitoring information. For example, the performance model analyzer 405 can assign the circle symbol 718 to operator C to identify operator C as an operator that overrides the standard climb de-rate parameter more than a specified percentage of duty cycles (e.g., more than 20%, 30%, 40%, etc., of the time, etc.). For example, the performance model analyzer 405 can identify operator C as a candidate improvement target based on comparing the operator behavior A 702 of operator C compared to the fleet of operators. In such an example, in response to identifying operator C as a candidate improvement target, the performance model analyzer 405 can generate an alert, a recommendation, a report including the alert and/or the recommendation, etc., to improve operator behavior A 702 corresponding to operator C. In some examples, the performance model analyzer 405 generates (e.g., automatically generates, etc.) a workscope or a workscope recommendation for one or more assets attributed to operator C in response to identifying operator C as a candidate improvement target based on the operator behavior.

In the illustrated example of FIG. 7, the operator behavior A (change) column 704 corresponds to a change in operator behavior A 702 for an operator relative to the operator over time. For example, the performance model analyzer 405 can determine whether an operator improved or declined corresponding to operator behavior A 702 over time. For example, the performance model analyzer 405 can identify an improvement (e.g., by assigning the up arrow 714, etc.) or a decline (e.g., by assigning the down arrow 716) corresponding to operator behavior A 702. In the illustrated example of FIG. 7, the performance model analyzer 405 assigns an up arrow 714 to operator B corresponding to operator behavior A (change) 704. For example, the performance model analyzer 405 can determine that operator B improved corresponding to climb de-rate override behavior over time (e.g., reduced a percentage of climb de-rate overrides over a 6-month period, a 1-year period, a 3-year period, etc.).

In the illustrated example of FIG. 7, the operator behavior B 706 corresponds to a quantifiable operator behavior. For example, operator behavior B 706 can correspond to an engine de-rate behavior, an engine takeoff de-rate behavior, etc. In the illustrated example of FIG. 7, operator behavior B (change) 708 corresponds to a change in operator behavior B 708 for an operator relative to the operator over time.

In the illustrated example of FIG. 7, the severity factor A (change) 710 corresponds to a change in a severity factor experienced by an operator relative to the operator over time. For example, the severity factor A (change) 710 can correspond to a change in engine temperature, airborne particulate matter exposure, etc., experienced by assets of an operator over time. In the illustrated example of FIG. 7, the performance model analyzer 405 assigns an up arrow 716 to operators D and E. For example, the severity factor A can correspond to engine temperature of assets corresponding to operators A-E. For example, the performance model analyzer 405 can determine that operator D has improved corresponding to engine temperature of assets operated by operator D. For example, the performance model analyzer 405 can determine that an engine temperature (e.g., a mean engine temperature, a median engine temperature, etc.) corresponding to assets operated by operator D have decreased over time.

In the illustrated example of FIG. 7, the asset health quantifier 712 corresponds to an identification of a suboptimal condition corresponding to an operator compared with the fleet of operators for the asset health quantifier 712. For example, the asset health quantifier can be a TOW, an EGTHDM, an EGTHDM rate of change value, etc. For example, the asset health quantifier 712 can be an EGTHDM corresponding to a margin between an EGT of the engine 102 of FIG. 1 during an operation and an EGT "redline" which is a maximum temperature the engine 102 cannot exceed without running the risk of substantially damaging the engine 102. The EGTHDM rate of change value can correspond to a rate in which the EGTHDM of the engine 102 decreases over time. In the illustrated example of FIG. 7, the performance model analyzer 405 assigns the circle symbol 718 to operator A for the asset health quantifier 712 to identify operator A as a candidate improvement target. For example, the performance model analyzer 405 can identify operator A has a candidate improvement target based on comparing the EGTHDM rate of change values of the assets operated by operator A to the fleet of operators. In response to identifying that operator A is a candidate improvement target based on comparing the operator to the fleet of operators for an asset health quantifier, the example performance model analyzer 405 can generate an alert, a recommendation, a report including the alert and/or the recommendation, etc., to improve the asset health quantifier corresponding to operator A. In some examples, the performance model analyzer 405 generates (e.g., automatically generates, etc.) a workscope or a workscope recommendation for one or more assets attributed to operator A in response to identifying operator A as a candidate improvement target based on the asset health quantifier.

Figure 8A:
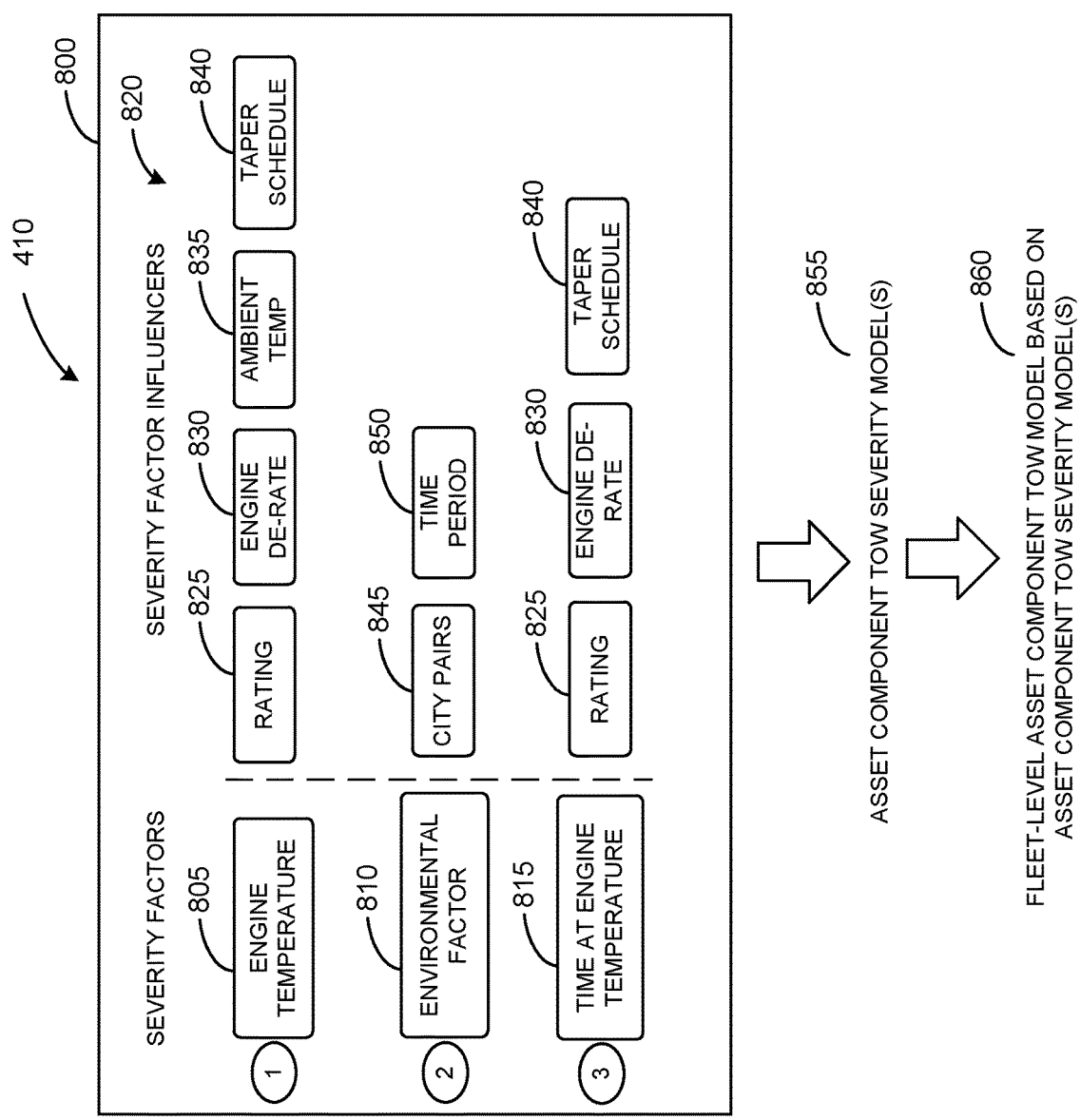
FIG. 8A is an example time on-wing severity model generation system.

FIG. 8A is an example TOW severity model generation system 800 executed by the severity model analyzer 410 of FIG. 4. In the illustrated example of FIG. 8A, the severity model analyzer 410 generates an asset or an asset component TOW severity model by mapping a severity factor such as an engine temperature severity factor 805, an environmental factor severity factor 810, a time at engine temperature severity factor 815, etc., to an asset health quantifier such as TOW. For example, the severity model analyzer 410 can generate a high-pressure turbine blade severity model of the engine 102 that maps a TOW of the high-pressure turbine blade as a function of the environmental factor 810. In some examples, the severity model analyzer 410 generates recommendations to optimize and/or otherwise improve operator behavior based on the asset and/or asset component TOW severity model. Alternatively, there may be fewer or more than the severity factors depicted in FIG. 8A.

In the illustrated example of FIG. 8A, the engine temperature severity factor 805 can be affected, influenced, impacted, etc., by one or more severity factor influencers 820 such as an engine rating 825, an engine de-rate 830, an ambient temperature 835, and a taper schedule 840. Alternatively, there may be fewer or more than the severity factor influencers 820 corresponding to the engine temperature severity factor 805 than depicted in FIG. 8A. For example, the engine temperature severity factor 805 can correspond to an operating temperature of the engine 102. In some examples, the rating 825 corresponds to a rating (e.g., an engine rating, a maximum rated capacity, etc.) of the engine 102. For example, the engine temperature severity factor 805 can be impacted by the rating of the engine 102. For example, a higher rating of the engine 102 can correspond to a higher engine temperature. In another example, the engine temperature severity factor 805 can be influenced by the engine de-rate behavior 830 of an operator. For example, an operator using a lower de-rate when operating the engine 102 can correspond to a higher engine temperature. In yet another example, the engine temperature severity factor 805 can be impacted by the ambient temperature 835. For example, a lower ambient temperature experienced by the engine 102 can correspond to a lower engine temperature. In yet another example, the engine temperature severity factor 805 can be affected by the taper schedule 840 used by an operator. For example, an operator using a taper schedule including lower engine de-rate values can correspond to a higher engine temperature.

In the illustrated example of FIG. 8A, the environmental factor severity factor 810 can be affected, influenced, impacted, etc., by one or more severity factor influencers 820 such as city pairs 845 and a time period 850. Alternatively, there may be fewer or more than the severity factor influencers 820 corresponding to the environmental factor severity factor 810 than depicted in FIG. 8A. For example, the environmental factor severity factor 810 can correspond to an environmental factor experienced by the engine 102. For example, the environmental factor can be an airborne particulate matter (e.g., an exposure to man-made pollution, an exposure to dust, etc.), an ambient temperature, an elevation, etc.

In some examples, the city pairs 845 correspond to pairs of cities included in a flight operation. For example, a flight from London to Paris can generate a city pair of London and Paris. In some examples, the city pairs correspond to environmental factors associated with pairs of cities. For example, the severity model analyzer 410 can map a value (e.g., a mean value, a median value, etc.) of an airborne particulate matter, an ambient temperature, an elevation parameter, etc., to London and Paris to determine an effect of an AHQ on the asset operating in the cities of London and Paris. For example, the environmental factor severity factor 810 can be affected based on a selection of the city pair 845. In another example, the environmental factor severity factor 810 can be affected based on the time period 850 such as a time of day of operation, a time of year of operation, etc.

In the illustrated example of FIG. 8A, the time at engine temperature severity factor 815 can be affected, influenced, impacted, etc., by one or more severity factor influencers 820 such as the engine rating 825, the engine de-rate 830, and the taper schedule 840. Alternatively, there may be fewer or more than the severity factor influencers 820 corresponding to the time at engine temperature severity factor 815 than depicted in FIG. 8A. In some examples, the time at the engine temperature severity factor 815 can correspond to an amount of time the engine 102 of FIG. 1 operates at the engine temperature.

In the illustrated example of FIG. 8A, the severity model analyzer 410 generates one or more asset component TOW severity models 855 by executing the TOW severity model generation system 800 based on the severity factors 805, 810, 815 and the severity factor influencers 820. For example, the severity model analyzer 410 can generate a regression model (e.g., the regression reference models 610 of FIG. 6B, etc.) based on a mapping of an AHQ such as TOW of an asset component to an environmental or an operational factor. For example, the severity model analyzer 410 can generate a high-pressure turbine blade severity model by mapping a TOW of the high-pressure turbine blade to the environmental factor severity factor 810 by executing the TOW severity model generation system 800 based on information obtained by executing the historical data model 450, the physics-based model 452, etc. The example severity model analyzer 410 can generate (e.g., iteratively generate, etc.) a plurality of asset component severity models based on the severity factors 805, 810, 815 and one or more asset components.

In some examples, the TOW severity model generation system 800 generates one or more asset component TOW severity models 855 and generates a fleet-level asset component TOW model 860 based on the one or more asset component TOW severity models 855. For example, the severity model analyzer 410 can generate an asset component severity model 900 as depicted in FIG. 9. The example severity model analyzer 410 can generate a fleet-level model 870 as depicted in FIG. 8B based on one or more asset component severity models such as the asset component severity model 900 of FIG. 9.

Figure 8B:
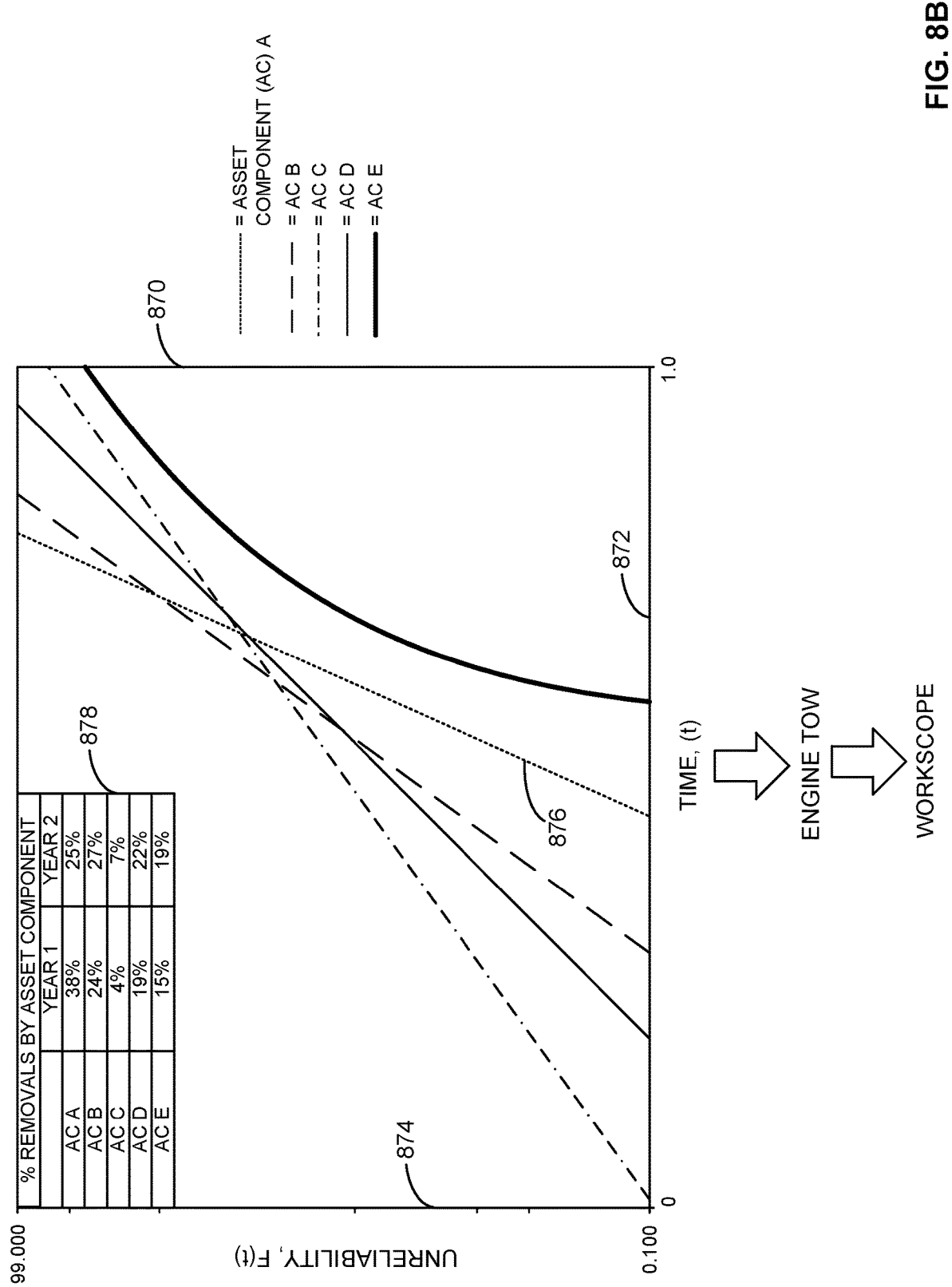
FIG. 8B is a schematic illustration of an example fleet-level model.
Figure 9:
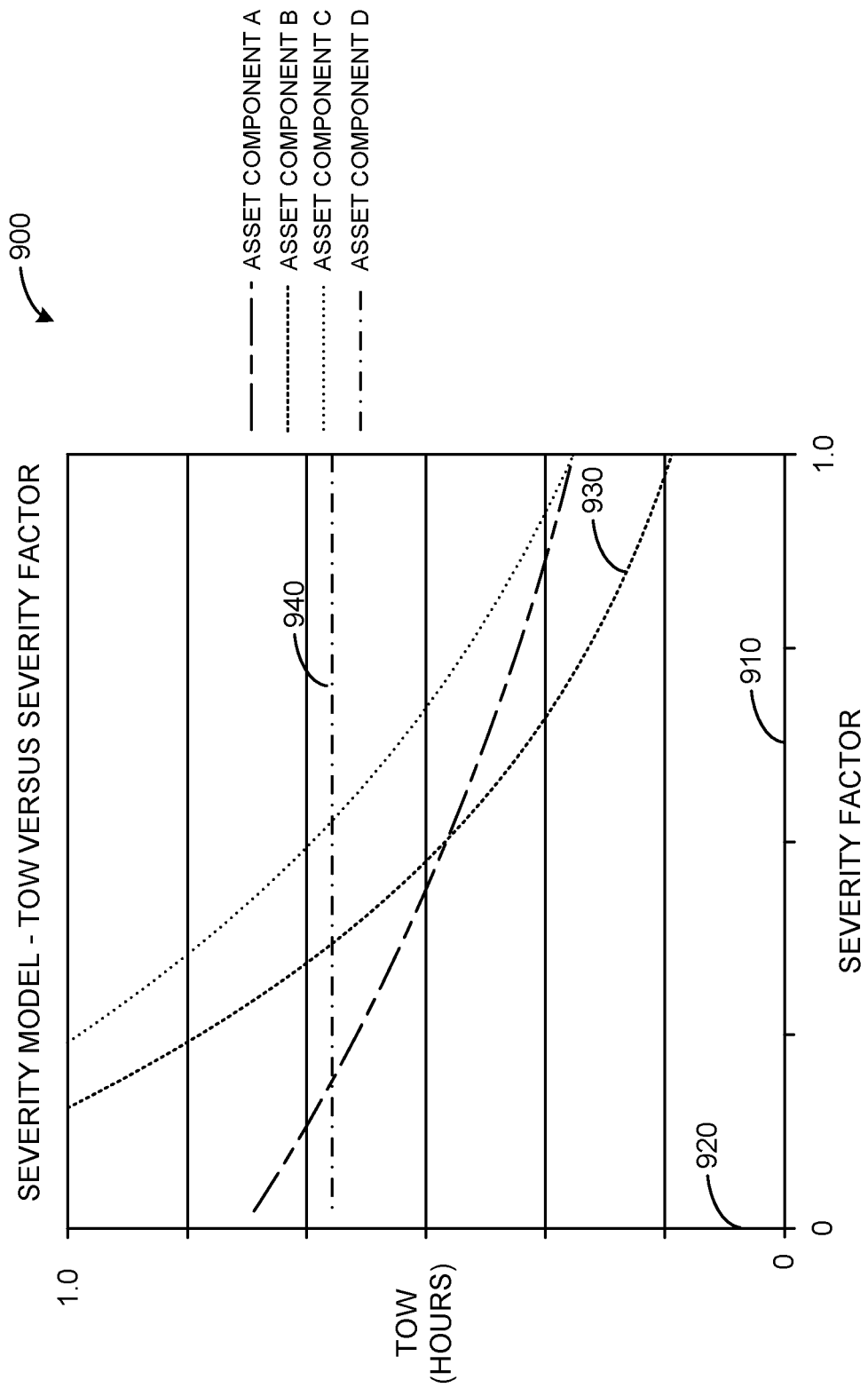
FIG. 9 is a schematic illustration of an example asset component level severity model mapping an AHQ of time on-wing to an AHQ severity factor input.

FIG. 8B is a schematic illustration of the fleet-level model 870. The fleet-level model 870 of FIG. 8B represents a stochastic model of fleet-level asset data. For example, the fleet-level model 870 can correspond to the stochastic model 454 of FIG. 4. For example, the severity model analyzer 410 can direct the stochastic model 454 to generate the fleet-level model 870 based on executing the TOW severity model generation system 800 of FIG. 8A for one or more assets for one or more operators.

In the illustrated example of FIG. 8B, the fleet-level model 870 maps an unreliability factor as a function of time. In the illustrated example of FIG. 8B, an x-axis 872 labeled "TIME, (t)" represents a TOW of an asset component scaled from zero to one. Alternatively, the x-axis 872 can be scaled using any other range of values. In the illustrated example of FIG. 8B, a y-axis 874 labeled "UNRELIABILITY, F(t)" represents a probability value scaled from zero to one that an asset component can become non-responsive at a specified TOW of the asset component. Alternatively, the y-axis 874 can be scaled using any other range of values.

For example, the severity model analyzer 410 can use the fleet-level model 870 to determine an unreliability factor of an asset component based on a number of cycles the asset component has operated or any other time duration. For example, the unreliability factor can correspond to an amount of time an asset component can operate without experiencing a failure mode. For example, at approximately 0.8 scaled TOW hours, the asset component (AC) A (e.g., the fan section 108 of FIG. 1, the booster compressor 114, etc.) has an approximate unreliability value of 99.000 (e.g., 99%, etc.) based on the asset component A unreliability line 876 (dotted line). In such an example, the severity model analyzer 410 can generate a recommendation to remove the asset component A from service as the TOW hours of the asset component A approaches 0.8 scaled TOW hours.

In the illustrated example of FIG. 8B, the fleet-level model 870 depicts an unreliability function for a plurality of asset components such as asset component B, asset component C, asset component D, asset component E, etc. In some examples, the severity model analyzer 410 uses the fleet-level model 870 to calculate a TOW or an anticipated TOW prior to performing maintenance on one or more components of the engine 102 of FIG. 1. By determining the anticipated TOW prior to performing the maintenance, the example severity model analyzer 410 can generate a recommendation to optimize and/or otherwise improve a recommended workscope for an asset of an operator. For example, the severity model analyzer 410 can generate a recommendation for the operator to prepare a workscope including removing the engine 102 from service, ordering spare parts, querying maintenance facility availability to perform the maintenance operation, etc.

In the illustrated example of FIG. 8B, the fleet-level model 870 includes a percentage of removals by asset component table 878. The table 878 of the illustrated example of FIG. 8B includes data representing a percentage of asset removals by asset component. For example, the table 878 represents that 38% of asset removals in Year 1 were in response to identifying asset component A for maintenance. For example, the severity model analyzer 410 can determine an influence of a rate of change value, a health status, etc., of one or more asset components on a probability that an asset is to be removed from service. For example, the severity model analyzer 410 can generate a workscope, adjust a forecasted workscope, etc., for an operator in response to determining that asset component A is a significant influence of a removal rate of operator assets from service. For example, the table 878 represents that 25% of asset removals in Year 2 were in response to identifying asset component A for maintenance. For example, in response to generating forecasted workscopes for assets managed by the operator, the percentage of asset removals due to the asset component A decreased year over year. The example severity model analyzer 410 can improve asset health management for assets included in a fleet of operators by determining an impact of a rate of change value, a health status, etc., of one or more asset components and improve forecasted workscopes for the assets based on the determination.

FIG. 9 is a schematic illustration of an example asset component level severity model 900 mapping an AHQ such as TOW to a severity factor (e.g., the engine temperature severity factor 805 of FIG. 8A, the environmental severity factor 810 of FIG. 8A, etc.). For example, the severity model analyzer 410 can generate the asset component level severity model 900 of FIG. 9 using the TOW severity model generation system 800 of FIG. 8A. In the illustrated example of FIG. 9, the asset component level severity model 900 maps TOW in hours of an asset component to the severity factor for an asset component (e.g., the high-pressure compressor 116 of FIG. 1, the combustor 118 of FIG. 1, etc.) such as asset component A, asset component B, asset component C, and asset component D. Alternatively, there may be fewer or more asset components than depicted in FIG. 9.

In the illustrated example of FIG. 9, a sensitivity of each of the asset components is determined based on the mapping of the TOW to the severity factor in the asset component level severity model 900. In the illustrated example of FIG. 9, the x-axis 910 represents the severity factor scaled from zero to one. Alternatively, the x-axis 910 can be scaled using any other range of values. In the illustrated example of FIG. 9, the y-axis 920 represents a TOW of an asset component scaled from zero to one. Alternatively, the y-axis 920 can be scaled using any other range of values.

In the illustrated example of FIG. 9, the asset component B has one of the highest sensitivities of the depicted asset components as represented by the asset component B sensitivity line 930 (darker-shaded dotted line). For example, the asset component B can have a reduced TOW as the severity factor value increases. In the illustrated example of FIG. 9, alternatively, the asset component D has one of the lowest sensitivities of the depicted asset components based on the asset component D sensitivity line 940. For example, the asset component D has a substantially similar TOW as the severity factor value increases or decreases.

In some examples, the severity model analyzer 410 can generate the asset component level severity model 900 of FIG. 9 to determine an effect of the severity factor on the TOW to determine how severe, significant, etc., of an effect the severity factor has on the TOW AHQ. For example, the severity model analyzer 410 can direct one or more components of the AWGS 220 to update based on the asset component level severity model 900. For example, the severity model analyzer 410 can direct the physics-based model 452 to update a rate of change parameter of a component of the engine 102 based on the severity factor value. For example, in response to updating the physics-based model 452, the workscope quantifier analyzer 415 of FIG. 4 can generate a more accurate AHQ (e.g., a TOW, an asset health, etc.) of an asset of interest based on a severity factor value experienced by or to be experienced by the asset of interest.

Figure 10:
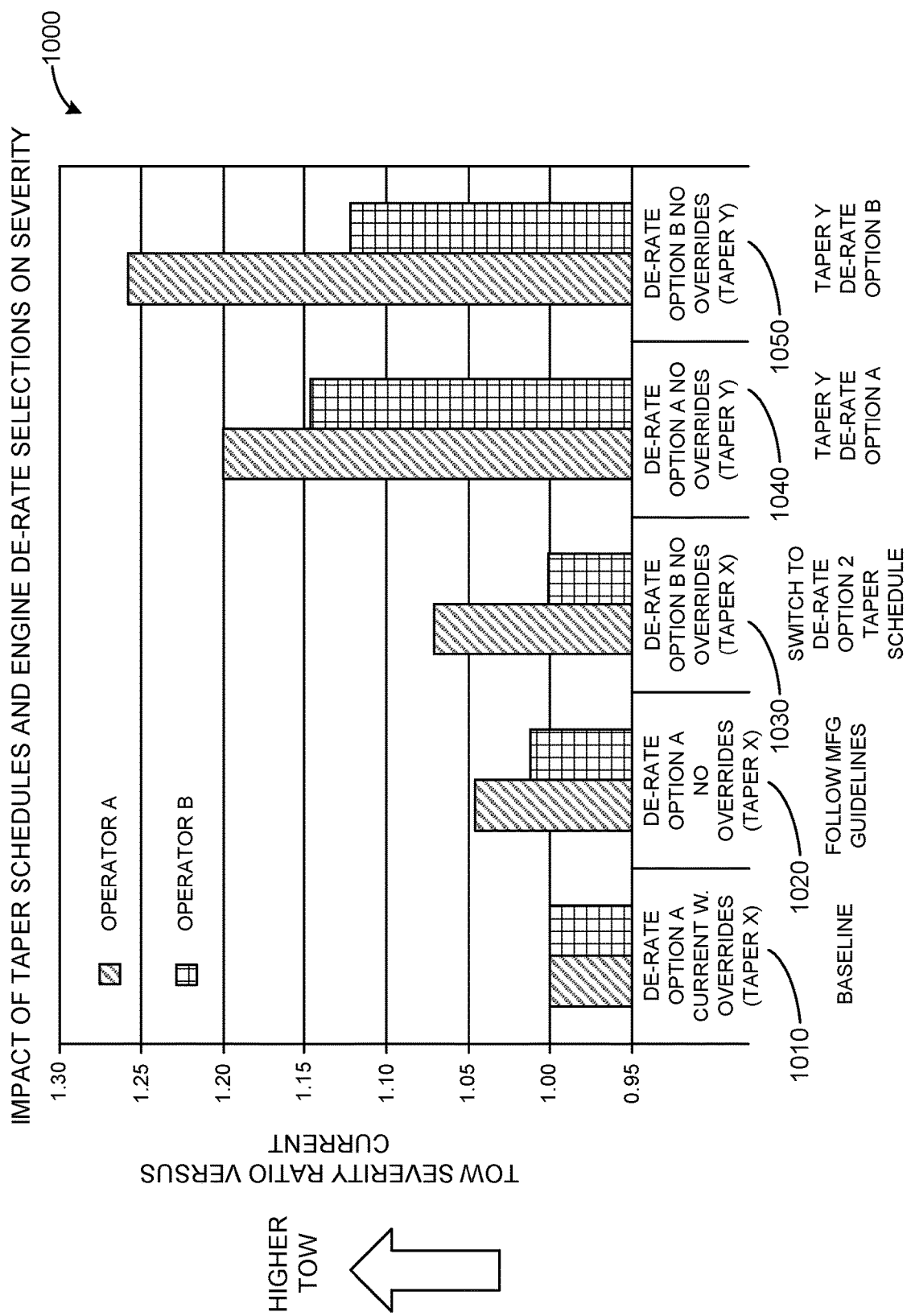
FIG. 10 is a schematic illustration of example effects of implementing example recommendations by the workscope effect calculator of FIGS. 3-4 to optimize and/or otherwise improve operator asset behavior by adjusting an operator behavior.

FIG. 10 is a schematic illustration of effects of implementing a recommendation by the WEC 315 of FIGS. 3-4 to optimize and/or otherwise improve operator asset behavior by adjusting an operator behavior parameter of an asset such as an engine de-rate behavior, a turbine engine taper schedule, etc. In the illustrated example of FIG. 10, a Taper Schedule impact plot 1000 includes a depiction of a TOW severity ratio for operator A and operator B. The TOW severity ratio represents an increase or a decrease in TOW. For example, a TOW severity ratio of 1.05 represents a 5% increase in TOW compared to a baseline TOW severity ratio.

In the illustrated example of FIG. 10, the de-rate option A current with overrides (Taper X) bars 1010 represent the operators A and B currently using a Taper X schedule and allowing pilots to override the engine de-rate option A and normalizing the operators A and B to a baseline TOW severity ratio of 1.00. In the illustrated example of FIG. 10, the de-rate option A with no overrides (Taper X) bars 1020 represent the operators A and B using the Taper X schedule and executing the de-rate option A except without allowing pilots to override the de-ration option A. As depicted in FIG. 10, the operator A previously allowed more overrides compared to operator B and, thus, benefited from a higher TOW severity ratio by not allowing pilots to override the de-rate option A engine behavior.

In the illustrated example of FIG. 10, the de-rate option B with no overrides (Taper X) bars 1030 represent an effect of the operators A and B adjusting de-rate options based on a recommendation by the WEC 315. For example, the severity model analyzer 410 can generate a recommendation for the operator A to adjust from the de-rate option A without overrides using the Taper X schedule 1020 to the de-rate option B without overrides using the Taper X schedule 1030. As a result, the TOW severity ratio increases from a baseline of 1.00 to approximately 1.07 based on the recommended adjustment by the severity model analyzer 410. In another example, the severity model analyzer 410 can generate a recommendation for the operator B to adjust from the de-rate option A without overrides using the Taper X schedule 1020 to the de-rate option B without overrides using the Taper X schedule 1030. As a result, the TOW severity ratio slightly increases from a baseline of 1.00 to negligibly above 1.00 based on the recommended adjustment by the severity model analyzer 410. In such an example, the adjustment did not significantly adjust a TOW severity ratio for the operator B. In some examples, the severity model analyzer 410 directs the system updater 420 to update one or more components of the AWGS 220 of FIGS. 2-3 based on generating an inefficient recommendation.

In some examples, the severity model analyzer 410 generates another recommendation to the operator B to adjust from the de-rate option A without overrides using the Taper X schedule 1020 to a de-rate option A without overrides using the Taper Y schedule 1040, a de-rate option B without overrides using the Taper Y schedule 1050, etc. As a result, the example severity model analyzer 410 can generate a recommendation to direct an adjustment of operator behavior corresponding to one or more assets operated by the operator to affect a health, an operation, etc., of the one or more assets.

Figure 11:
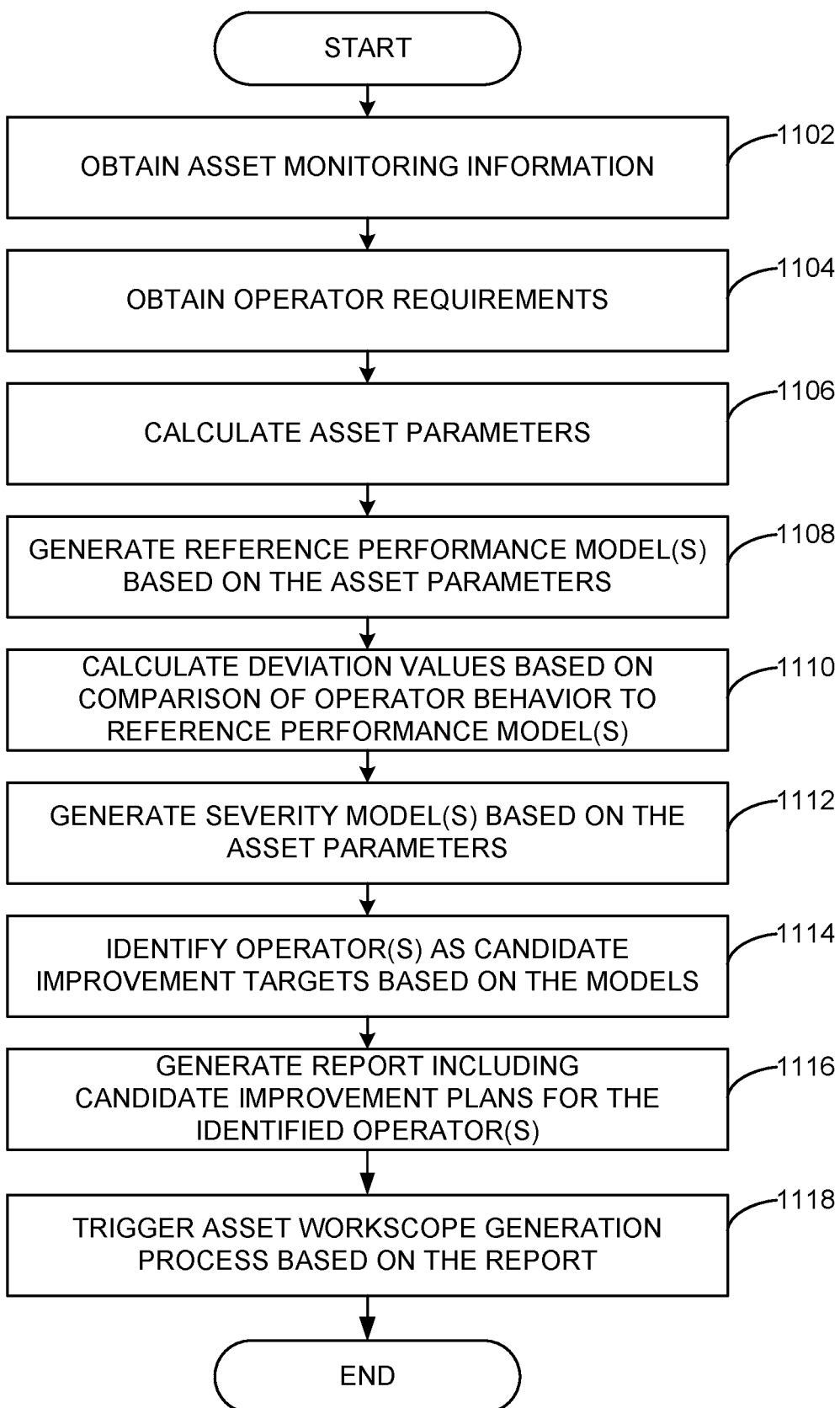
FIGS. 11-13 are flowcharts representative of example methods that can be executed by the example asset workscope generation system of FIGS. 2-3 and/or the example workscope effect calculator apparatus of FIGS. 3-4 to implement the examples disclosed herein.
Figure 12:
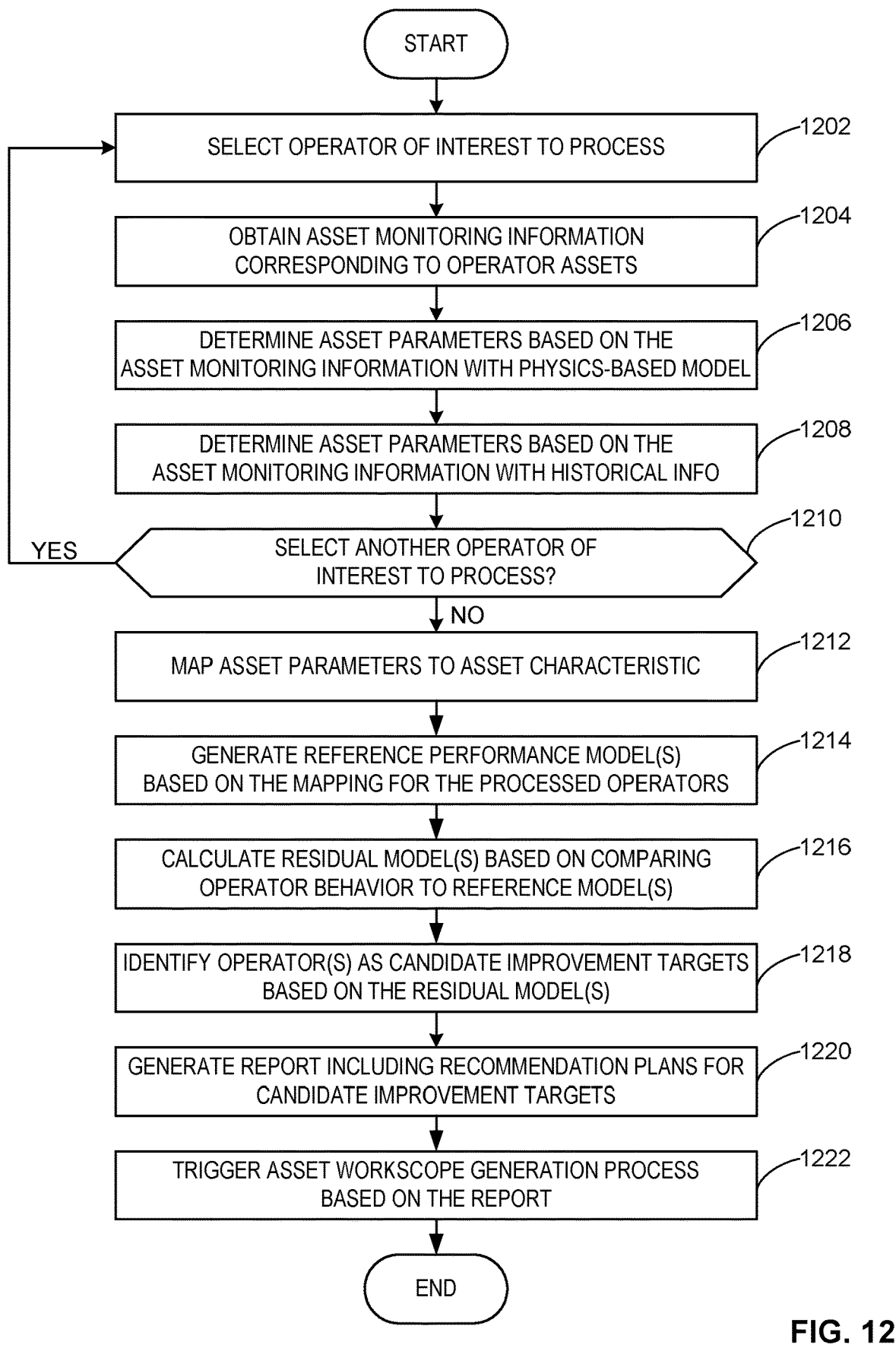
Figure 13:
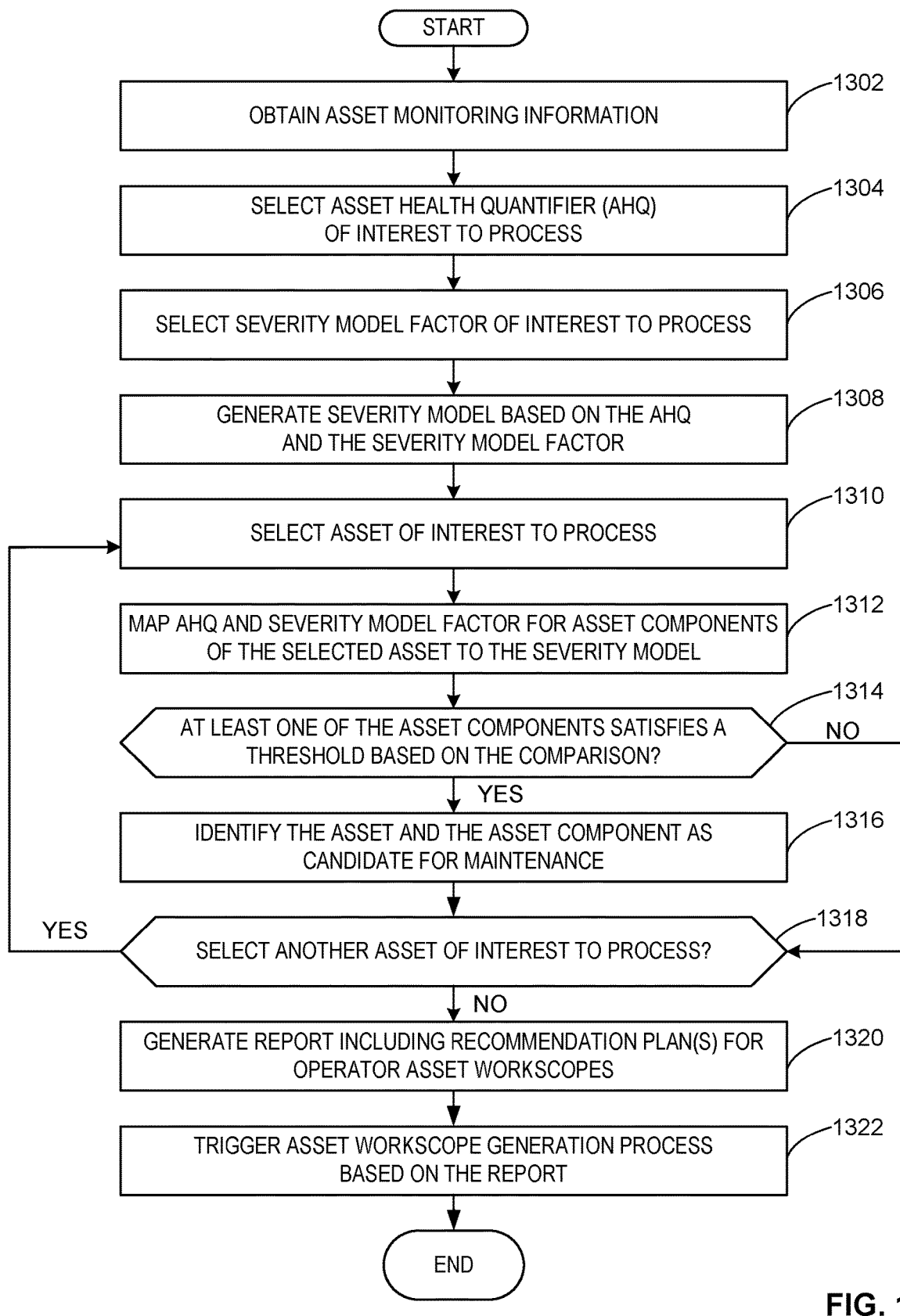

Flowcharts representative of example machine readable instructions for implementing the WEC 315 of FIGS. 3-4 are shown in FIGS. 11-13. In these examples, the machine readable instructions comprise a program for execution by a processor such as a processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 11-13, many other methods of implementing the example WEC 315 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 11-13 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 11 is a flowchart representative of an example method that can be performed by the example WEC 315 of FIGS. 3-4 to generate a report including recommendation plans for candidate improvement plans. The example method begins at block 1102 at which the example WEC 315 obtains asset monitoring information. For example, the collection engine 400 of FIG. 4 can obtain the inputs 325 of FIGS. 3-4 such as the asset sensor data 430, the asset environmental data 432, etc., of FIG. 4.

At block 1104, the example WEC 315 obtains operator requirements. For example, the collection engine 400 can obtain the requirements 340 of FIG. 3 from the database 345 of FIG. 3. For example, the collection engine 400 can obtain TOW requirements, contractual requirements corresponding to asset maintenance operations, asset de-rate parameters, etc., from the database 345.

At block 1106, the example WEC 315 calculates asset parameters. For example, the performance model analyzer 405 can direct the historical data model 450, the physics-based model 452, etc., to calculate an engine de-rate parameter (e.g., a takeoff de-rate parameter, a climb de-rate parameter, a land-based turbine engine de-rate parameter, etc.) of the engine 102 based on the inputs 325 of FIGS. 3-4. In another example, the performance model analyzer 405 can direct the historical data model 450, the physics-based model 452, etc., to calculate an engine de-rate parameter for a plurality of assets for a plurality of operators.

At block 1108, the example WEC 315 generates reference performance model(s) based on the asset parameters. For example, the performance model analyzer 405 can generate the physics-based performance reference model 608 of FIG. 6A, the regression reference model 610 of FIG. 6B, etc., based on asset parameters calculated by the historical data model 450, the physics-based model 452, etc.

At block 1110, the example WEC 315 calculates deviation values based on a comparison of operator behavior to reference performance model(s). For example, the performance model analyzer 405 can generate the residual performance model 640 of FIG. 6C by calculating deviation values by calculating differences between actual asset parameters of operators and asset parameters included in the reference performance models.

At block 1112, the example WEC 315 generates severity model(s) based on the asset parameters. For example, the severity model analyzer 410 can generate the fleet-level model 870 of FIG. 8B based on one or more asset component level severity models such as the asset component level severity model 900 of FIG. 9.

At block 1114, the example WEC 315 identifies operator(s) as candidate improvement targets based on the models. For example, the performance model analyzer 405 can identify the operator E in the residual performance model 640 of FIG. 6C as a candidate improvement target. In another example, the performance model analyzer 405 can identify the operators P, G, and H in the AHQ performance model 650 of FIG. 6D as candidate improvement targets.

At block 1116, the example WEC 315 generates a report including recommendation plans for candidate improvement plans. For example, the performance model analyzer 405 can generate a report including a recommendation to optimize and/or otherwise improve asset operator behavior of the operator E based on analyzing the residual performance model 640 of FIG. 6C. In another example, the severity model analyzer 410 can generate a report including a recommendation to optimize and/or otherwise improve asset operator behavior of an operator based on analyzing the fleet-level model 870 of FIG. 8B, the asset component level severity model 900 of FIG. 9, etc.

At block 1118, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the performance model analyzer 405 identifying operator E as a candidate improvement target based on the residual performance model 640 of FIG. 6C, the performance model analyzer 405 can direct the asset health calculator 300 of FIG. 3 to generate one or more AHQ of the engine 102 and/or other assets operated by the operator E using the recommended operator behavior parameter (e.g., the recommended engine de-rate parameter, takeoff de-rate parameter, climb de-rate parameter, etc.). In response to the example asset health calculator 300 being activated by the example performance model analyzer 405, the asset health calculator 300 can execute one or more of the models 450, 452, 454, 456 of FIG. 4 using the recommended engine de-rate parameter included in the report.

In response to the asset health calculator 300 generating the one or more AHQ, the asset health calculator 300 can (1) identify one or more assets operated by the operator E as candidate assets for removal from service and (2) generate a removal schedule to remove the one or more assets. In response to generating the removal schedule, the example task generator 305 can generate one or more maintenance tasks to be performed on the removed assets and the example task optimizer 310 can select a workscope based on the maintenance tasks. In response to the example task optimizer 310 selecting the workscope, the selected workscope can be performed on the one or more removed assets to improve a health and/or operation of the one or more removed assets. In response to triggering the asset workscope generation process, the example method concludes.

FIG. 12 is a flowchart representative of an example method that can be performed by the example WEC 315 of FIGS. 3-4 to generate a report including recommendation plans for candidate improvement plans based on generating a performance model. The example process of FIG. 12 can be used to implement the operation of blocks 1108 and/or 1116 of FIG. 11. The example method begins at block 1202 at which the example WEC 315 selects an operator of interest to process. For example, the collection engine 400 can select an operator of interest to process.

At block 1204, the example WEC 315 obtains asset monitoring information corresponding to operator assets. For example, the collection engine 400 can obtain engine de-rate information from the engine 102 associated with an operator and/or from a plurality of engines associated with the operator. For example, the collection engine 400 of FIG. 4 can obtain the inputs 325 of FIGS. 3-4 such as the asset sensor data 430, the asset environmental data 432, etc., of FIG. 4 when the engine 102 is operating in the flight route 500 of FIG. 5, while the engine 102 is in service, etc.

At block 1206, the example WEC 315 determines asset parameters based on the asset monitoring information with a physics-based model. For example, the performance model analyzer 405 can calculate an engine de-rate parameter for the engine 102 based on the inputs 325 of FIGS. 3-4 for the engine 102 and/or for the plurality of engines associated with the operator of interest using the physics-based model 452 of FIG. 4.

At block 1208, the example WEC 315 determines asset parameters based on the asset monitoring information with historical information. For example, the performance model analyzer 405 can calculate an engine de-rate parameter for the engine 102 based on the inputs 325 of FIGS. 3-4 for the engine 102 and/or for the plurality of engines associated with the operator of interest using the historical data model 450 of FIG. 4.

At block 1210, the example WEC 315 determines whether to select another operator of interest to process. For example, the collection engine 400 can determine to select another operator of interest to process. If, at block 1210, the example WEC 315 determines to select another operator of interest to process, control returns to block 1202 to select another operator of interest to process.

If, at block 1210, the example WEC 315 determines not to select another operator of interest to process, then, at block 1212, the WEC 315 maps the asset parameters to an engine performance characteristic. For example, the performance model analyzer 405 can map the engine de-rate parameters generated by the physics-based model 452 to an aircraft weight. In another example, the performance model analyzer 405 can map the engine de-rate parameters generated by the historical data model 450 to an aircraft weight.

At block 1214, the example WEC 315 generates reference performance model(s) based on the mapping for the processed operators. For example, the performance model analyzer 405 can generate the performance reference model 600 of FIG. 6A based on mapping engine de-rate parameters for one or more operators to an aircraft weight. In another example, the performance model analyzer 405 can generate the regression reference model 610 of FIG. 6B based on mapping engine de-rate parameters for one or more operators to an aircraft weight, an airport elevation, and an ambient temperature.

At block 1216, the example WEC 315 calculates residual model(s) based on comparing operator behavior to the reference model(s). For example, the performance model analyzer 405 can generate the residual performance model 640 of FIG. 6C by calculating a difference between an actual operator behavior (e.g., an actual engine de-rate behavior, an instant takeoff de-rate behavior, a current takeoff de-rate behavior, etc.) and the operator behavior included in the performance reference model 600 of FIG. 6A. In another example, the performance model analyzer 405 can generate the residual performance model 640 of FIG. 6C by calculating a difference between an actual operator behavior (e.g., an actual engine de-rate behavior, a takeoff de-rate behavior, a current takeoff de-rate behavior, etc.) and the operator behavior included in the regression reference model 610 of FIG. 6B.

At block 1218, the example WEC 315 identifies operator(s) as candidate improvement targets based on the residual model(s). For example, the performance model analyzer 405 can identify operators D and/or E in FIG. 6C based on the residual performance model 640 of FIG. 6C as a candidate improvement targets based on operating a plurality of underperforming and/or inefficiently utilized turbine engines compared to the fleet average.

At block 1220, the example WEC 315 generates a report including recommendation plans for candidate improvement targets. For example, the performance model analyzer 405 can generate a report including a recommendation for the operators C and/or E in FIG. 6C to adjust an engine de-rate parameter when operating the underperforming assets.

At block 1222, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the performance model analyzer 405 identifying operator E as a candidate improvement target based on the residual performance model 640 of FIG. 6C, the performance model analyzer 405 can direct the asset health calculator 300 of FIG. 3 to generate AHQ of the engine 102 and/or other assets operated by the operator E using the recommended operator behavior parameter (e.g., the recommended engine de-rate parameter, etc.). In response to the example asset health calculator 300 being activated by the example performance model analyzer 405, the asset health calculator 300 can activate the example task generator 305 and trigger the task generator 305 to activate the task optimizer 310 to select and direct a workscope to be performed on an asset to improve a health and/or an operation of the asset. In response to triggering the asset workscope generation process, the example method concludes.

FIG. 13 is a flowchart representative of an example method that can be performed by the example WEC 315 of FIGS. 3-4 to generate a report including recommendation plans for candidate improvement plans based on generating a severity model. The example process of FIG. 13 can be used to implement the operation of blocks 1112 and/or 1116 of FIG. 11. The example method begins at block 1302 at which the example WEC 315 obtains asset monitoring information. For example, the collection engine 400 of FIG.

4 can obtain the inputs 325 of FIGS. 3-4 such as the asset sensor data 430, the asset environmental data 432, etc., of FIG. 4.

At block 1304, the example WEC 315 selects an asset health quantifier (AHQ) of interest to process. For example, the severity model analyzer 410 can select a TOW AHQ to process. At block 1306, the example WEC 315 selects a severity model factor of interest to process. For example, the severity model analyzer 410 can select an engine temperature severity factor corresponding to the engine temperature severity factor 805 of FIG. 8A to process.

At block 1308, the example WEC 315 generates a severity model based on the AHQ and the severity model factor. For example, the severity model analyzer 410 can generate the asset component level severity model 900 of FIG. 9 based on mapping TOW of asset components to engine temperature. At block 1310, the example WEC 315 selects an asset of interest to process. For example, the severity model analyzer 410 can select the engine 102 of FIG. 1 to process.

At block 1312, the example WEC 315 maps an AHQ and a severity model factor for asset components of the selected asset to the severity model. For example, the severity model analyzer 410 can map a severity factor value of 0.5 currently or previously experienced by the asset component B of the engine 102 to the severity factor value of the asset component level severity model 900 of FIG. 9 to generate an anticipated TOW of the asset component B of approximately 0.5 scaled TOW hours. In such an example, the severity model analyzer 410 can compare the anticipated TOW of 0.5 scaled TOW hours to an example actual TOW of the asset component B of 0.6 scaled TOW hours to calculate an AHQ difference of 0.1 scaled TOW hours based on the comparison. The example severity model analyzer 410 can compare (e.g., iteratively compare, etc.) the actual TOW and the severity factor values for other components of the engine 102.

At block 1314, the example WEC 315 determines whether at least one of the asset components satisfies a threshold based on the comparison. For example, the severity model analyzer 410 can determine that an anticipated AHQ threshold of 0.5 scaled TOW hours has been satisfied based on the actual AHQ of 0.6 scaled TOW hours being greater than the anticipated AHQ threshold of 0.5 scaled TOW hours. In another example, the severity model analyzer 410 can compare the AHQ difference of 0.1 scaled TOW hours to an AHQ difference threshold of 0.08 scaled TOW hours and determine that the AHQ difference threshold has been satisfied based on the AHQ difference being greater than the AHQ difference threshold.

If, at block 1314, the example WEC 315 determines that at least one of the asset components does not satisfy a threshold based on the comparison, control proceeds to block 1318 to select another asset of interest to process. If, at block 1314, the example WEC 315 determines that at least one of the asset components satisfies a threshold, then, at block 1316, the WEC 315 identifies the asset and the asset component as a candidate for maintenance. For example, the severity model analyzer 410 can identify a component of the engine 102 corresponding to asset component B as a candidate for removal from operation to perform a maintenance operation.

At block 1318, the example WEC 315 determines whether to select another asset of interest to process. For example, the collection engine 400 can determine to select another asset operated by a specific operator, another asset in the fleet, etc., to process. If, at block 1318, the example WEC 315 determines to select another asset of interest to process, control returns to block 1310 to select another asset of interest to process.

If, at block 1318, the example WEC 315 determines not to select another asset of interest to process, then, at block 1320, the WEC 315 generates a report including recommendation plan(s) for operator asset workscopes. For example, the severity model analyzer 410 can generate a report including a recommendation identifying the engine 102 is a candidate target to be removed from service to perform maintenance on the combustor 118.

At block 1322, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the severity model analyzer 410 identifying the engine 102 as a candidate for removal from service based on the fleet-level model 870 of FIG. 8B, the asset component level severity model 900 of FIG. 9, etc. For example, the severity model analyzer 410 can direct the asset health calculator 300 of FIG. 3 to generate AHQ of the engine 102 and/or other assets operated by the same operator as the engine 102. In response to the example asset health calculator 300 being activated by the example severity model analyzer 410, the asset health calculator 300 can activate the example task generator 305 and the task generator 305 can activate the task optimizer 310 to select and direct a workscope to be performed on the engine 102 and/or other operator assets to improve a health and/or an operation of the assets. In response to triggering the asset workscope generation process, the example method concludes.

Figure 14:
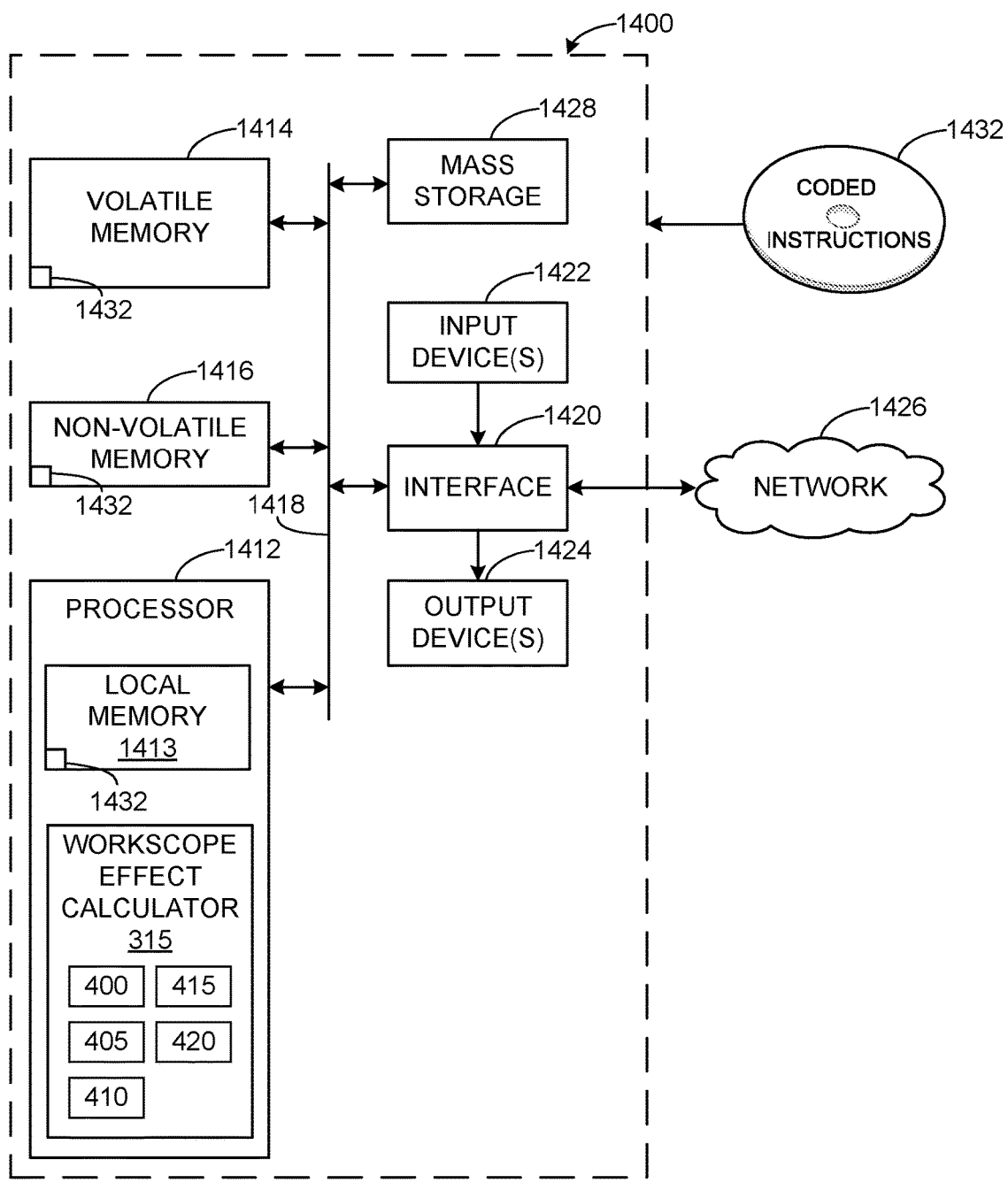
FIG. 14 is a block diagram of an example processing platform structured to execute machine-readable instructions to implement the methods of FIGS. 11-13 and/or the example workscope effect calculator apparatus of FIGS. 3-4.

FIG. 14 is a block diagram of an example processor platform 1400 capable of executing the instructions of FIGS. 11-13 to implement the WEC 315 of FIGS. 3-4. The processor platform 1400 can be, for example, a server or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The hardware processor may be a semiconductor based (e.g., silicon based) device. In this example, the processor 1012 implements the example collection engine 400, the example performance model analyzer 405, the example severity model analyzer 410, the example workscope quantifier analyzer 415, and the example system updater 420.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a peripheral component interconnect (PCI) express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and DVD drives.

The coded instructions 1432 of FIGS. 11-13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus, systems, and articles of manufacture have been disclosed that generate a predictive asset health quantifier of a turbine engine. The above-described example workscope effect calculator identifies deficient operator behavior of turbine engines managed by operators. The example workscope effect calculator can identify operators as candidate improvement targets by generating reference performance models using one or more computer-based models such as a physics-based model, a historical data model, etc. The example workscope effect calculator can compare a current operator behavior of an operator to the reference performance models based on determining if the operator is better or worse than a fleet average for the operator behavior.

The example workscope effect calculator can generate a recommendation to adjust the operator behavior by changing an operator behavior parameter such as a takeoff de-rate parameter, a climb de-rate parameter, a taper schedule, etc., corresponding to an operation of assets by the operator. The example workscope effect calculator can trigger an asset workscope generation system process based on the recommendation by activating one or more components of the AWGS such as the asset health calculator. The example workscope effect calculator can activate the asset health calculator to generate an AHQ of one or more assets using the recommended operator behavior parameter and determine whether the one or more assets operated by the operator can be identified as candidate assets for removal from service based on the generated AHQ.

The example workscope effect calculator can identify an asset as a candidate asset for removal from service by generating a severity model. The example workscope effect calculator can execute a historical data model to generate a regression model that maps an operator behavior to an engine performance characteristic. The example workscope effect calculator can generate a fleet-level severity model by incorporating one or more asset component level severity models. The example workscope effect calculator can identify an asset for removal from service by applying an actual TOW of an asset component of the asset to the fleet-level severity model and comparing an anticipated TOW to the actual TOW. The example workscope effect calculator can trigger the asset workscope generation system process based on the identified assets for removal by activating one or more components of the AWGS such as the asset health calculator. The example workscope effect calculator can activate the asset health calculator to generate an AHQ of one or more assets using the fleet-level severity model and determine whether the one or more assets operated by the operator can be identified as candidate assets for removal from service based on the generated AHQ.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
    a performance model analyzer to:
        determine a fleet behavior parameter as a function of an engine performance characteristic by generating a reference performance model using historical information for a fleet of operators using turbine engines, wherein the engine performance characteristic is a characteristic that impacts a performance or an operation of a turbine engine;
        generate a residual performance model based on calculating a difference between the fleet behavior parameter and a plurality of operator behavior parameters corresponding to an operation of turbine engines operated by the fleet;
        identify an operator as a candidate improvement target based on comparing the operator behavior parameters corresponding to the operator to the fleet in the residual performance model; and
        determine an adjusted operator behavior parameter for the candidate improvement target, wherein the adjusted operator behavior parameter represents an adjusted manner in which the candidate improvement target is to operate a turbine engine, and wherein the fleet behavior parameter, the operator behavior parameters, and the adjusted operator behavior parameter is an engine de-rate parameter or a turbine engine taper schedule;
    a system updater to update a computer-based model to replace the operator behavior parameter with the adjusted operator behavior parameter to calculate an asset health quantifier of the turbine engine operated by the candidate improvement target; and
    a task optimizer to determine a workscope for the turbine engine based on calculating the asset health quantifier using the adjusted operator behavior parameter, the workscope to be performed on the turbine engine to improve an operation of the turbine engine.

2. The apparatus of claim 1, wherein the engine performance characteristic is at least one of an aircraft weight, an airport elevation, or an ambient temperature.

3. The apparatus of claim 1, wherein the reference performance model is a multi-variable regression model including a mapping of the fleet behavior parameter to the engine performance characteristic.

4. The apparatus of claim 1, further including the performance model analyzer to:
determine the fleet behavior parameter as a function of the engine performance characteristic by generating a physics-based reference model using simulated operator behavior parameters for the fleet; and
generate the residual performance model based on calculating a difference between the fleet behavior parameter and an operator behavior parameter for the fleet.

5. The apparatus of claim 4, wherein the simulated operator behavior parameters are calculated using a digital twin model of a turbine engine.

6. The apparatus of claim 1, further including to performance model analyzer to generate an alert dashboard including trend information corresponding to the operation behavior parameters for the fleet.

7. A method comprising:
determining a fleet behavior parameter as a function of an engine performance characteristic by generating a reference performance model using historical information for a fleet of operators using turbine engines, wherein the engine performance characteristic is a characteristic that impacts a performance or an operation of a turbine engine;
generating a residual performance model based on calculating a difference between the fleet behavior parameter and a plurality of operator behavior parameters corresponding to an operation of turbine engines operated by the fleet;
identifying an operator as a candidate improvement target based on comparing the operator behavior parameters corresponding to the operator to the fleet in the residual performance model;
determining an adjusted operator behavior parameter for the candidate improvement target, wherein the adjusted operator behavior parameter represents an adjusted manner in which the candidate improvement target is to operate a turbine engine, and wherein the fleet behavior parameter, the operator behavior parameters, and the adjusted operator behavior parameter is an engine de-rate parameter or a turbine engine taper schedule;
updating a computer-based model to replace the operator behavior parameter with the adjusted operator behavior parameter to calculate an asset health quantifier of the turbine engine operated by the candidate improvement target;
determining a workscope for the turbine engine based on calculating the asset health quantifier using the adjusted operator behavior parameter; and
performing the workscope on the turbine engine to improve an operation of the turbine engine.

8. The method of claim 7, wherein the engine performance characteristic is at least one of an aircraft weight, an airport elevation, or an ambient temperature.

9. The method of claim 7, wherein the reference performance model is a linear regression model including a mapping of the fleet behavior parameter to the engine performance characteristic.

10. The method of claim 7, further including:
determining the fleet behavior parameter as a function of the engine performance characteristic by generating a physics-based reference model using simulated operator behavior parameters for the fleet; and
generating the residual performance model based on calculating a difference between the fleet behavior parameter and an operator behavior parameter for the fleet.

11. The method of claim 10, wherein the simulated operator behavior parameters are calculated using a digital twin model of a turbine engine included in the fleet.

12. The method of claim 7, further including generating an alert dashboard including trend information corresponding to the operation behavior parameters for the fleet.

13. A non-transitory computer readable storage medium comprising instructions which when executed, cause a machine to at least:
determine a fleet behavior parameter as a function of an asset characteristic by generating a reference performance model using historical information for a fleet of operators using turbine engines, wherein the engine performance characteristic is a characteristic that impacts a performance or an operation of a turbine engine;
generate a residual performance model based on calculating a difference between the fleet behavior parameter and a plurality of operator behavior parameters corresponding to an operation of turbine engines operated by the fleet;
identify an operator as a candidate improvement target based on comparing the operator behavior parameters corresponding to the operator to the fleet in the residual performance model;
determine an adjusted operator behavior parameter for the candidate improvement target, wherein the adjusted operator behavior parameter represents an adjusted manner in which the candidate improvement target is to operate a turbine engine, and wherein the fleet behavior parameter, the operator behavior parameters, and the adjusted operator behavior parameter is an engine de-rate parameter or a turbine engine taper schedule;
update a computer-based model to replace the operator behavior parameter with the adjusted operator behavior parameter to calculate an asset health quantifier of the turbine engine operated by the candidate improvement target; and
determine a workscope for the turbine engine based on calculating the asset health quantifier using the adjusted operator behavior parameter, the workscope to be performed on the turbine engine to improve an operation of the turbine engine.

14. The non-transitory computer readable storage medium of claim 13, wherein the engine performance characteristic is at least one of an aircraft weight, an airport elevation, or an ambient temperature.

15. The non-transitory computer readable storage medium of claim 13, wherein the reference performance model is a linear regression model including a mapping of the fleet behavior parameter to the engine performance characteristic.

16. The non-transitory computer readable storage medium of claim 13, further including instructions which when executed, cause the machine to at least:
determine the fleet behavior parameter as a function of the engine performance characteristic by generating a physics-based reference model using simulated operator behavior parameters for the fleet; and generate the residual performance model based on calculating a difference between the fleet behavior parameter and an operator behavior parameter for the fleet.

17. The non-transitory computer readable storage medium of claim 16, wherein the simulated operator behavior parameters are calculated using a digital twin model of a turbine engine included in the fleet.

18. The non-transitory computer readable storage medium of claim 13, further including instructions which when executed, cause the machine to at least generate an alert dashboard including trend information corresponding to the operation behavior parameters for the fleet.

* * * * *